(12) United States Patent
Vandertook et al.

(10) Patent No.: US 12,467,559 B2
(45) Date of Patent: Nov. 11, 2025

(54) AIR, ACOUSTIC AND/OR FIRE SEALING SLEEVE INSERT AND AIR, ACOUSTIC AND/OR FIRE SEALING DEVICE

(71) Applicant: Hilti Aktiengesellschaft, Schaan (IL)

(72) Inventors: Joshua Vandertook, Frisco, TX (US); Herbert Münzenberger, Wiesbaden (DE); Tamara Sarg, Dallas, TX (US); Chad Stroike, Tulsa, OK (US); Lukas Schwaiger, The Colony, TX (US); Kejriwal Akhil, Dallas, TX (US)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 17/348,952

(22) Filed: Jun. 16, 2021

(65) Prior Publication Data
US 2021/0310586 A1     Oct. 7, 2021

Related U.S. Application Data

(63) Continuation of application No. 14/811,168, filed on Jul. 28, 2015, now abandoned.

(51) Int. Cl.
*F16L 5/10* (2006.01)
*A62C 2/06* (2006.01)
*F16J 15/06* (2006.01)
*F16L 5/04* (2006.01)
*H02G 3/22* (2006.01)

(52) U.S. Cl.
CPC ............... *F16L 5/10* (2013.01); *A62C 2/065* (2013.01); *F16J 15/065* (2013.01); *F16L 5/04* (2013.01); *H02G 3/22* (2013.01)

(58) Field of Classification Search
CPC . F16L 5/10; F16L 5/04; F16L 5/06–14; F16L 5/00–14; F16L 55/0336; F16L 59/16; F16L 59/141; F16L 59/143; F16L 59/145; F16L 59/147; F16L 5/02; F16L 1/06; F16L 57/04; F16L 3/123; A62C 3/16; A62C 2/065; A62C 2/06; A62C 3/00; A62C 35/68; F16J 15/065; H02G 3/22; H02G 3/0412
USPC ......................................................... 169/48
See application file for complete search history.

(56) References Cited

U.S. PATENT DOCUMENTS

| 546,909 A | 9/1895 | Spencer |
| 563,680 A | 7/1896 | Nott |
| 694,670 A | 3/1902 | Schiek |

(Continued)

FOREIGN PATENT DOCUMENTS

| AU | B-30326/95 | 3/1996 |
| CA | 2 787 642 | 3/2013 |

(Continued)

OTHER PUBLICATIONS

CP 653 BA—Firestop Speed Sleeve, Hilti Aktiengesellschaft, https://www.us.hilti.com/firestop-%26-fire-protection-systems/fire-stop-cast-in-%26-sleeve-devices/r3143561, printed Jul. 17, 2015.

(Continued)

*Primary Examiner* — Arthur O. Hall
*Assistant Examiner* — Juan C Barrera
(74) *Attorney, Agent, or Firm* — Grüneberg and Myers PLLC

(57) ABSTRACT

A fire-protection apparatus contains a housing with a passage, and an insert containing a plurality of sections made of a flexible material.

19 Claims, 13 Drawing Sheets

(56) References Cited

U.S. PATENT DOCUMENTS

| | | | |
|---|---|---|---|
| 1,192,989 A | 8/1916 | Clifford | |
| 3,143,208 A | 8/1964 | Sizemore, Jr. | |
| 3,188,686 A | 6/1965 | Orcutt | |
| 3,232,786 A | 2/1966 | Kellman | |
| 4,303,158 A | 12/1981 | Perkins | |
| 4,364,210 A * | 12/1982 | Fleming | E04B 1/947 |
| | | | 52/220.8 |
| 4,401,716 A | 8/1983 | Tschudin-Mahrer | |
| 4,460,804 A | 7/1984 | Svejkovský | |
| 4,538,389 A | 9/1985 | Heinen | |
| 4,807,805 A | 2/1989 | Rutkowski | |
| 4,848,043 A | 7/1989 | Harbeke | |
| 4,854,009 A | 8/1989 | Brockhaus | |
| 4,901,488 A | 2/1990 | Murota et al. | |
| 5,058,341 A | 10/1991 | Harbeke, Jr. | |
| 5,090,710 A | 2/1992 | Flower | |
| 5,174,077 A | 12/1992 | Murota | |
| 5,309,688 A | 5/1994 | Robertson | |
| 5,331,946 A | 7/1994 | Yamini et al. | |
| 5,347,767 A | 9/1994 | Roth | |
| 5,351,448 A | 10/1994 | Gohlke et al. | |
| 5,390,458 A | 2/1995 | Menchetti | |
| 5,421,127 A | 6/1995 | Stefely | |
| 5,452,551 A | 9/1995 | Charland et al. | |
| 5,456,050 A | 10/1995 | Ward | |
| 5,475,948 A | 12/1995 | Parke | |
| 5,498,466 A | 3/1996 | Navarro et al. | |
| 5,548,934 A | 8/1996 | Israelson | |
| 5,765,318 A | 6/1998 | Michelson | |
| 5,836,424 A | 11/1998 | Allen | |
| 6,018,126 A | 1/2000 | Castellani et al. | |
| 6,114,623 A | 9/2000 | Bonilla et al. | |
| 6,125,608 A | 10/2000 | Charlson | |
| 6,172,052 B1 | 1/2001 | Cook et al. | |
| 6,176,052 B1 | 1/2001 | Takahashi | |
| 6,336,297 B1 | 1/2002 | Cornwall | |
| 6,360,502 B1 | 3/2002 | Stahl, Jr. | |
| 6,426,463 B2 | 7/2002 | Münzenberger et al. | |
| 6,479,119 B1 | 11/2002 | Simpson | |
| 6,572,948 B1 | 6/2003 | Dykhoff | |
| 6,632,999 B2 | 10/2003 | Sempliner et al. | |
| 6,718,100 B2 | 4/2004 | Morris | |
| 6,725,615 B1 | 4/2004 | Porter | |
| 6,732,481 B2 | 5/2004 | Stahl, Sr. | |
| 6,783,345 B2 | 8/2004 | Morgan et al. | |
| D502,147 S | 2/2005 | Stahl, Sr. | |
| 6,848,227 B2 | 2/2005 | Whitty | |
| 6,862,852 B1 * | 3/2005 | Beele | F16L 5/04 |
| | | | 52/220.8 |
| 6,928,777 B2 | 8/2005 | Cordts | |
| 6,935,080 B2 | 8/2005 | Allwein et al. | |
| 7,240,905 B1 | 7/2007 | Stahl, Sr. | |
| 7,373,761 B2 | 5/2008 | Stahl, Sr. | |
| 7,375,277 B1 | 5/2008 | Skinner et al. | |
| 7,427,050 B2 | 9/2008 | Stahl, Sr. et al. | |
| 7,465,888 B2 | 12/2008 | Fischer et al. | |
| 7,478,503 B2 | 1/2009 | Milani et al. | |
| 7,523,590 B2 | 4/2009 | Stahl, Sr. | |
| 7,560,644 B2 | 7/2009 | Ford et al. | |
| 7,596,914 B2 | 10/2009 | Stahl, Sr. et al. | |
| 7,642,461 B2 | 1/2010 | Klein et al. | |
| 7,681,365 B2 | 3/2010 | Klein | |
| 7,685,792 B2 | 3/2010 | Stahl, Sr. et al. | |
| 7,694,474 B1 | 4/2010 | Stahl, Sr. et al. | |
| 7,797,893 B2 | 9/2010 | Stahl, Sr. et al. | |
| 7,856,775 B2 | 12/2010 | Stahl, Jr. | |
| 7,866,108 B2 | 1/2011 | Klein | |
| 7,867,591 B2 | 1/2011 | Sieber et al. | |
| 7,950,198 B2 | 5/2011 | Pilz et al. | |
| 8,051,614 B1 | 11/2011 | Peck et al. | |
| D657,232 S | 4/2012 | Stahl, Sr. et al. | |
| 8,188,382 B2 | 5/2012 | Monden et al. | |
| 8,266,854 B2 | 9/2012 | Reddicliffe | |
| 8,349,426 B2 | 1/2013 | Deiss | |
| 8,375,666 B2 | 2/2013 | Stahl, Jr. et al. | |
| 8,397,451 B2 | 3/2013 | Pirner | |
| 8,397,452 B2 | 3/2013 | Stahl, Sr. et al. | |
| 8,584,415 B2 | 11/2013 | Stahl, Jr. et al. | |
| 8,590,231 B2 | 11/2013 | Pilz | |
| 8,595,999 B1 | 12/2013 | Pilz et al. | |
| 8,671,632 B2 | 3/2014 | Pilz et al. | |
| 8,672,275 B2 | 3/2014 | Van Walraven et al. | |
| 8,683,762 B2 | 4/2014 | Rodriquez et al. | |
| 8,739,482 B1 | 6/2014 | Feil, III et al. | |
| 8,793,946 B2 | 8/2014 | Stahl, Jr. et al. | |
| 8,826,599 B2 | 9/2014 | Stahl, Jr. | |
| 8,833,478 B2 | 9/2014 | Zernach et al. | |
| 8,869,475 B2 | 10/2014 | Lopes | |
| 8,887,458 B2 | 11/2014 | Lopes | |
| 8,910,949 B2 | 12/2014 | Åkesson | |
| 8,911,206 B2 | 12/2014 | Campbell et al. | |
| 8,955,275 B2 | 2/2015 | Stahl, Jr. | |
| 8,967,438 B2 | 3/2015 | Russell et al. | |
| 9,046,194 B2 | 6/2015 | Gandolfo et al. | |
| 9,157,232 B2 | 10/2015 | Stahl, Jr. | |
| 9,162,093 B2 | 10/2015 | Foerg et al. | |
| 11,591,790 B2 | 2/2023 | Deiss | |
| 2005/0133242 A1 | 6/2005 | Kreutz | |
| 2005/0139126 A1 | 6/2005 | Khan et al. | |
| 2006/0037264 A1 | 2/2006 | Paetow et al. | |
| 2006/0060369 A1 | 3/2006 | Hemingway et al. | |
| 2006/0138251 A1 * | 6/2006 | Stahl, Sr. | A62C 3/16 |
| | | | 239/271 |
| 2007/0125018 A1 | 6/2007 | Stahl, Sr. | |
| 2007/0151183 A1 | 7/2007 | Stahl, Sr. et al. | |
| 2007/0175125 A1 | 8/2007 | Stahl, Sr. et al. | |
| 2007/0204540 A1 | 9/2007 | Stahl, Sr. et al. | |
| 2007/0212495 A1 | 9/2007 | Nuzzo | |
| 2007/0261339 A1 | 11/2007 | Stahl, Sr. et al. | |
| 2007/0261343 A1 | 11/2007 | Stahl, Sr. et al. | |
| 2008/0134584 A1 | 6/2008 | McGhee | |
| 2008/0309017 A1 | 12/2008 | Mattice | |
| 2009/0049781 A1 | 2/2009 | Pilz et al. | |
| 2009/0075539 A1 | 3/2009 | Dimanshteyn et al. | |
| 2009/0126297 A1 | 5/2009 | Stahl, Jr. | |
| 2010/0223878 A1 | 9/2010 | Lipka et al. | |
| 2010/0326678 A1 | 12/2010 | Monden et al. | |
| 2011/0011019 A1 | 1/2011 | Stahl, Jr. et al. | |
| 2011/0018210 A1 | 1/2011 | Beele | |
| 2011/0030281 A1 | 2/2011 | Vulpitta | |
| 2011/0088342 A1 | 4/2011 | Stahl, Sr. et al. | |
| 2011/0094759 A1 | 4/2011 | Lopes | |
| 2011/0143121 A1 | 6/2011 | Deiss | |
| 2012/0012347 A1 * | 1/2012 | Zernach | H02G 3/0412 |
| | | | 169/48 |
| 2012/0216791 A1 | 8/2012 | Münzenberger | |
| 2012/0304979 A1 | 12/2012 | Munzenberger et al. | |
| 2013/0061544 A1 | 3/2013 | Stahl, Jr. et al. | |
| 2013/0068487 A1 * | 3/2013 | Klein | A62C 2/065 |
| | | | 169/48 |
| 2013/0091790 A1 | 4/2013 | Stahl, Jr. et al. | |
| 2013/0097948 A1 | 4/2013 | Burgess | |
| 2013/0161030 A1 | 6/2013 | Münzenberger et al. | |
| 2013/0205694 A1 | 8/2013 | Stahl, Jr. | |
| 2013/0277918 A1 | 10/2013 | Fitzgerald et al. | |
| 2013/0307225 A1 | 11/2013 | Boyd | |
| 2014/0020915 A1 | 1/2014 | Lopes | |
| 2014/0077043 A1 | 3/2014 | Foerg | |
| 2014/0137494 A1 | 5/2014 | Stahl, Jr. et al. | |
| 2014/0260015 A1 | 9/2014 | McConnell et al. | |
| 2014/0360115 A1 | 12/2014 | Stahl, Jr. | |
| 2014/0367127 A1 | 12/2014 | Zernach et al. | |
| 2015/0007515 A1 | 1/2015 | Stahl, Jr. | |
| 2015/0047276 A1 | 2/2015 | Gandolfo et al. | |
| 2015/0135622 A1 | 5/2015 | Muenzenberger et al. | |
| 2015/0251028 A1 | 9/2015 | Klein et al. | |
| 2015/0298155 A1 | 10/2015 | Sackler | |
| 2016/0123002 A1 | 5/2016 | Münzenberger et al. | |
| 2017/0354836 A1 | 12/2017 | Lopes et al. | |

FOREIGN PATENT DOCUMENTS

| | | |
|---|---|---|
| CA | 2 841 523 | 9/2014 |
| CA | 2 849 597 | 12/2014 |

(56) References Cited

FOREIGN PATENT DOCUMENTS

| | | |
|---|---|---|
| DE | 216225 | 11/1909 |
| DE | 2 043 784 | 4/1971 |
| DE | 94 11 293 U1 | 9/1994 |
| DE | 198 18 769 | 11/1999 |
| DE | 100 43 430 | 3/2002 |
| DE | 103 26 775 | 4/2004 |
| DE | 20 2005 004 339 U1 | 10/2005 |
| DE | 20 2006 019 593 U1 | 4/2007 |
| DE | 20 2009 005 996 | 8/2009 |
| DE | 20 2011 100 855 | 7/2011 |
| DE | 10 2010 054 621 | 6/2012 |
| DE | 10 2011 105 576 | 12/2012 |
| DE | 20 2013 004 376 | 6/2013 |
| DE | 20 2013 103 170 U1 | 9/2013 |
| EP | 0 869 303 | 10/1998 |
| EP | 0 988 873 | 3/2000 |
| EP | 1 313 192 | 5/2003 |
| EP | 2 273 639 | 1/2011 |
| EP | 2 339 708 | 6/2011 |
| EP | 2 493 041 | 8/2012 |
| EP | 2 827 465 | 1/2015 |
| ES | 2 312 276 | 2/2009 |
| FR | 2501926 | 9/1982 |
| FR | 2 675 532 | 10/1992 |
| FR | 2 787 825 | 6/2000 |
| GB | 2 111 624 | 7/1983 |
| GB | 2 216 220 | 10/1989 |
| GB | 2 233 725 | 1/1991 |
| GB | 2 255 121 | 10/1992 |
| GB | 2 281 859 | 3/1995 |
| GB | 2 334 770 | 9/1999 |
| GB | 2 444 400 | 6/2008 |
| GB | 2 457 152 | 8/2009 |
| IE | 902358 | 6/1991 |
| JP | 2-286990 | 11/1990 |
| JP | 2000-240854 | 9/2000 |
| JP | 2003-056098 | 2/2003 |
| JP | 2007-032631 | 2/2007 |
| JP | 2008-121413 | 5/2008 |
| JP | 2010-57757 | 3/2010 |
| JP | 2011-074969 | 4/2011 |
| JP | 4753850 | 8/2011 |
| JP | 2011-190614 | 9/2011 |
| JP | 2012-92644 | 5/2012 |
| JP | 2014-148998 | 8/2014 |
| JP | 2014-212617 | 11/2014 |
| JP | 2015-057560 | 3/2015 |
| KR | 2002-0083301 | 11/2002 |
| KR | 10-2012-0139936 | 12/2012 |
| NL | 8700459 | 9/1988 |
| WO | 96/24549 | 8/1996 |
| WO | 97/04838 | 2/1997 |
| WO | 2002/037011 | 5/2002 |
| WO | 2004/015319 | 2/2004 |
| WO | 2007/061572 | 5/2007 |
| WO | 2008/140399 | 11/2008 |
| WO | 2013/160776 | 10/2013 |
| WO | 2014/056865 | 4/2014 |
| WO | 2014/071362 | 5/2014 |
| WO | 2014/081446 | 5/2014 |
| WO | 2015/023313 | 2/2015 |
| WO | 2015/055855 | 4/2015 |
| WO | 2015/155492 | 10/2015 |
| WO | 2016/089290 | 6/2016 |

OTHER PUBLICATIONS

Document 1, Filed Sep. 22, 2022, "Complaint for Patent Infringement" in Case 1:22-cv-01248-CFC (in the U.S. District Court for the District of Delaware).
Exhibit 1 to Document 1, Filed Sep. 22, 2022, "Complaint for Patent Infringement" in Case 1:22-cv-01248-CFC (in the U.S. District Court for the District of Delaware).
Exhibit 2 to Document 1, Filed Sep. 22, 2022, "Complaint for Patent Infringement" in Case 1:22-cv-01248-CFC (in the U.S. District Court for the District of Delaware).
Exhibit 3 to Document 1, Filed Sep. 22, 2022, "Complaint for Patent Infringement" in Case 1:22-cv-01248-CFC (in the U.S. District Court for the District of Delaware).
Exhibit 4 to Document 1, Filed Sep. 22, 2022, "Complaint for Patent Infringement" in Case 1:22-cv-01248-CFC (in the U.S. District Court for the District of Delaware).
Exhibit 5 to Document 1, Filed Sep. 22, 2022, "Complaint for Patent Infringement" in Case 1:22-cv-01248-CFC (in the U.S. District Court for the District of Delaware).
Exhibit 6 to Document 1, Filed Sep. 22, 2022, "Complaint for Patent Infringement" in Case 1:22-cv-01248-CFC (in the U.S. District Court for the District of Delaware).
Exhibit 7 to Document 1, Filed Sep. 22, 2022, "Complaint for Patent Infringement" in Case 1:22-cv-01248-CFC (in the U.S. District Court for the District of Delaware).
Exhibit 8 to Document 1, Filed Sep. 22, 2022, "Complaint for Patent Infringement" in Case 1:22-cv-01248-CFC (in the U.S. District Court for the District of Delaware).
Exhibit 9 to Document 1, Filed Sep. 22, 2022, "Complaint for Patent Infringement" in Case 1:22-cv-01248-CFC (in the U.S. District Court for the District of Delaware).
Exhibit 10 to Document 1, Filed Sep. 22, 2022, "Complaint for Patent Infringement" in Case 1:22-cv-01248-CFC (in the U.S. District Court for the District of Delaware).
Exhibit 11 to Document 1, Filed Sep. 22, 2022, "Complaint for Patent Infringement" in Case 1:22-cv-01248-CFC (in the U.S. District Court for the District of Delaware).
Exhibit 12 to Document 1, Filed Sep. 22, 2022, "Complaint for Patent Infringement" in Case 1:22-cv-01248-CFC (in the U.S. District Court for the District of Delaware).
Exhibit 13 to Document 1, Filed Sep. 22, 2022, "Complaint for Patent Infringement" in Case 1:22-cv-01248-CFC (in the U.S. District Court for the District of Delaware).
Exhibit 14 to Document 1, Filed Sep. 22, 2022, "Complaint for Patent Infringement" in Case 1:22-cv-01248-CFC (in the U.S. District Court for the District of Delaware).
Exhibit 15 to Document 1, Filed Sep. 22, 2022, "Complaint for Patent Infringement" in Case 1:22-cv-01248-CFC (in the U.S. District Court for the District of Delaware).
Exhibit 16 to Document 1, Filed Sep. 22, 2022, "Complaint for Patent Infringement" in Case 1:22-cv-01248-CFC (in the U.S. District Court for the District of Delaware).
Exhibit 17 to Document 1, Filed Sep. 22, 2022, "Complaint for Patent Infringement" in Case 1:22-cv-01248-CFC (in the U.S. District Court for the District of Delaware).
Exhibit 18 to Document 1, Filed Sep. 22, 2022, "Complaint for Patent Infringement" in Case 1:22-cv-01248-CFC (in the U.S. District Court for the District of Delaware).
Exhibit 19 to Document 1, Filed Sep. 22, 2022, "Complaint for Patent Infringement" in Case 1:22-cv-01248-CFC (in the U.S. District Court for the District of Delaware).
Exhibit 20 to Document 1, Filed Sep. 22, 2022, "Complaint for Patent Infringement" in Case 1:22-cv-01248-CFC (in the U.S. District Court for the District of Delaware).
Exhibit 21 to Document 1, Filed Sep. 22, 2022, "Complaint for Patent Infringement" in Case 1:22-cv-01248-CFC (in the U.S. District Court for the District of Delaware).
Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 1 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 2 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).

(56) References Cited

OTHER PUBLICATIONS

Exhibit 3 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 4 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 5 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 6 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 7 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 8 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 9 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 10 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 11 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 12 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 13 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 14 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 15 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 16 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 17 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 18 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 19 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 20 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 21 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 22 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 23 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 24 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 25 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 26 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 27 to Document 13, Filed Nov. 21, 2022, "Specified Technologies, Inc.'S Answer To Complaint for Patent Infringement, Defenses, and Counterclaims" in Case 1:22-cv-01248- CFC (in the U.S. District Court for the District of Delaware).
Exhibit 28 to Document 13, Filed Nov. 21, 2022, "Specified Technologies, Inc.'S Answer To Complaint for Patent Infringement, Defenses, and Counterclaims" in Case 1:22-cv-01248- CFC (in the U.S. District Court for the District of Delaware).
Exhibit 29 to Document 13, Filed Nov. 21, 2022, "Specified Technologies, Inc.'S Answer To Complaint for Patent Infringement, Defenses, and Counterclaims" in Case 1:22-cv-01248- CFC (in the U.S. District Court for the District of Delaware).
Exhibit 30 to Document 13, Filed Nov. 21, 2022, "Specified Technologies, Inc.'S Answer To Complaint for Patent Infringement, Defenses, and Counterclaims" in Case 1:22-cv-01248- CFC (in the U.S. District Court for the District of Delaware).
Exhibit 31 to Document 13, Filed Nov. 21, 2022, "Specified Technologies, Inc.'S Answer To Complaint for Patent Infringement, Defenses, and Counterclaims" in Case 1:22-cv-01248- CFC (in the U.S. District Court for the District of Delaware).
Exhibit 32 to Document 13, Filed Nov. 21, 2022, "Specified Technologies, Inc.'S Answer To Complaint for Patent Infringement, Defenses, and Counterclaims" in Case 1:22-cv-01248- CFC (in the U.S. District Court for the District of Delaware).
Exhibit 33 to Document 13, Filed Nov. 21, 2022, "Specified Technologies, Inc.'S Answer To Complaint for Patent Infringement, Defenses, and Counterclaims" in Case 1:22-cv-01248- CFC (in the U.S. District Court for the District of Delaware).
Exhibit 34 to Document 13, Filed Nov. 21, 2022, "Specified Technologies, Inc.'S Answer To Complaint for Patent Infringement, Defenses, and Counterclaims" in Case 1:22-cv-01248- CFC (in the U.S. District Court for the District of Delaware).
Exhibit 35 to Document 13, Filed Nov. 21, 2022, "Specified Technologies, Inc.'S Answer To Complaint for Patent Infringement, Defenses, and Counterclaims" in Case 1:22-cv-01248- CFC (in the U.S. District Court for the District of Delaware).
Exhibit 36 to Document 13, Filed Nov. 21, 2022, "Specified Technologies, Inc.'S Answer To Complaint for Patent Infringement, Defenses, and Counterclaims" in Case 1:22-cv-01248- CFC (in the U.S. District Court for the District of Delaware).
Exhibit 37 to Document 13, Filed Nov. 21, 2022, "Specified Technologies, Inc.'S Answer To Complaint for Patent Infringement, Defenses, and Counterclaims" in Case 1:22-cv-01248- CFC (in the U.S. District Court for the District of Delaware).

(56) References Cited

OTHER PUBLICATIONS

Exhibit 38 to Document 13, Filed Nov. 21, 2022, "Specified Technologies, Inc.'S Answer To Complaint for Patent Infringement, Defenses, and Counterclaims" in Case 1:22-cv-01248- CFC (in the U.S. District Court for the District of Delaware).
Exhibit 39 to Document 13, Filed Nov. 21, 2022, "Specified Technologies, Inc.'S Answer To Complaint for Patent Infringement, Defenses, and Counterclaims" in Case 1:22-cv-01248- CFC (in the U.S. District Court for the District of Delaware).
Exhibit 40 to Document 13, Filed Nov. 21, 2022, "Specified Technologies, Inc.'S Answer To Complaint for Patent Infringement, Defenses, and Counterclaims" in Case 1:22-cv-01248- CFC (in the U.S. District Court for the District of Delaware).
Exhibit 41 to Document 13, Filed Nov. 21, 2022, "Specified Technologies, Inc.'S Answer To Complaint for Patent Infringement, Defenses, and Counterclaims" in Case 1:22-cv-01248- CFC (in the U.S. District Court for the District of Delaware).
Exhibit 42 to Document 13, Filed Nov. 21, 2022, "Specified Technologies, Inc.'S Answer To Complaint for Patent Infringement, Defenses, and Counterclaims" in Case 1:22-cv-01248- CFC (in the U.S. District Court for the District of Delaware).
Exhibit 43 to Document 13, Filed Nov. 21, 2022, "Specified Technologies, Inc.'S Answer To Complaint for Patent Infringement, Defenses, and Counterclaims" in Case 1:22-cv-01248- CFC (in the U.S. District Court for the District of Delaware).
Exhibit 44 to Document 13, Filed Nov. 21, 2022, "Specified Technologies, Inc.'S Answer To Complaint for Patent Infringement, Defenses, and Counterclaims" in Case 1:22-cv-01248- CFC (in the U.S. District Court for the District of Delaware).
Exhibit 45 to Document 13, Filed Nov. 21, 2022, "Specified Technologies, Inc.'S Answer To Complaint for Patent Infringement, Defenses, and Counterclaims" in Case 1:22-cv-01248- CFC (in the U.S. District Court for the District of Delaware).
Document filed Jun. 30, 2023, "Plaintiff Hilti Aktiengesellschaft 's Invalidity Contentions" in Case 1:22-cv-01248-CJB (in the U.S. District Court for the District of Delaware).
Exhibit 1 to Document filed Jun. 30, 2023, "Plaintiff Hilti Aktiengesellschaft 's Invalidity Contentions" in Case 1:22-cv-01248-CJB (in the U.S. District Court for the District of Delaware).
Exhibit 2 to Document filed Jun. 30, 2023, "Plaintiff Hilti Aktiengesellschaft 's Invalidity Contentions" in Case 1:22-cv-01248-CJB (in the U.S. District Court for the District of Delaware).
Exhibit 3 to Document filed Jun. 30, 2023, "Plaintiff Hilti Aktiengesellschaft 's Invalidity Contentions" in Case 1:22-cv-01248-CJB (in the U.S. District Court for the District of Delaware).
Exhibit 4 to Document filed Jun. 30, 2023, "Plaintiff Hilti Aktiengesellschaft 's Invalidity Contentions" in Case 1:22-cv-01248-CJB (in the U.S. District Court for the District of Delaware).
Exhibit 5 to Document filed Jun. 30, 2023, "Plaintiff Hilti Aktiengesellschaft 's Invalidity Contentions" in Case 1:22-cv-01248-CJB (in the U.S. District Court for the District of Delaware).
Exhibit 6 to Document filed Jun. 30, 2023, "Plaintiff Hilti Aktiengesellschaft 's Invalidity Contentions" in Case 1:22-cv-01248-CJB (in the U.S. District Court for the District of Delaware).
Exhibit 7 to Document filed Jun. 30, 2023, "Plaintiff Hilti Aktiengesellschaft 's Invalidity Contentions" in Case 1:22-cv-01248-CJB (in the U.S. District Court for the District of Delaware).
Exhibit 8 to Document filed Jun. 30, 2023, "Plaintiff Hilti Aktiengesellschaft 's Invalidity Contentions" in Case 1:22-cv-01248-CJB (in the U.S. District Court for the District of Delaware).
Exhibit 9 to Document filed Jun. 30, 2023, "Plaintiff Hilti Aktiengesellschaft 's Invalidity Contentions" in Case 1:22-cv-01248-CJB (in the U.S. District Court for the District of Delaware).
Exhibit 10 to Document filed Jun. 30, 2023, "Plaintiff Hilti Aktiengesellschaft 's Invalidity Contentions" in Case 1:22-cv-01248-CJB (in the U.S. District Court for the District of Delaware).
Exhibit 11 to Document filed Jun. 30, 2023, "Plaintiff Hilti Aktiengesellschaft 's Invalidity Contentions" in Case 1:22-cv-01248-CJB (in the U.S. District Court for the District of Delaware).
Exhibit 12 to Document filed Jun. 30, 2023, "Plaintiff Hilti Aktiengesellschaft 's Invalidity Contentions" in Case 1:22-cv-01248-CJB (in the U.S. District Court for the District of Delaware).
Exhibit 13 to Document filed Jun. 30, 2023, "Plaintiff Hilti Aktiengesellschaft 's Invalidity Contentions" in Case 1:22-cv-01248-CJB (in the U.S. District Court for the District of Delaware).
Exhibit 14 to Document filed Jun. 30, 2023, "Plaintiff Hilti Aktiengesellschaft 's Invalidity Contentions" in Case 1:22-cv-01248-CJB (in the U.S. District Court for the District of Delaware).
Exhibit 15 to Document filed Jun. 30, 2023, "Plaintiff Hilti Aktiengesellschaft 's Invalidity Contentions" in Case 1:22-cv-01248-CJB (in the U.S. District Court for the District of Delaware).
Exhibit 16 to Document filed Jun. 30, 2023, "Plaintiff Hilti Aktiengesellschaft 's Invalidity Contentions" in Case 1:22-cv-01248-CJB (in the U.S. District Court for the District of Delaware).
Exhibit 17 to Document filed Jun. 30, 2023, "Plaintiff Hilti Aktiengesellschaft 's Invalidity Contentions" in Case 1:22-cv-01248-CJB (in the U.S. District Court for the District of Delaware).
Exhibit 18 to Document filed Jun. 30, 2023, "Plaintiff Hilti Aktiengesellschaft 's Invalidity Contentions" in Case 1:22-cv-01248-CJB (in the U.S. District Court for the District of Delaware).
Exhibit 19 to Document filed Jun. 30, 2023, "Plaintiff Hilti Aktiengesellschaft 's Invalidity Contentions" in Case 1:22-cv-01248-CJB (in the U.S. District Court for the District of Delaware).
Exhibit 20 to Document filed Jun. 30, 2023, "Plaintiff Hilti Aktiengesellschaft 's Invalidity Contentions" in Case 1:22-cv-01248-CJB (in the U.S. District Court for the District of Delaware).
Document 1248HILTI0003902-0003907 filed with Document filed Jun. 30, 2023, "Plaintiff Hilti Aktiengesellschaft 's Invalidity Contentions" in Case 1:22-cv-01248-CJB (in the U.S. District Court for the District of Delaware).
Document 1248HILTI0003908-0003915 filed with Document filed Jun. 30, 2023, "Plaintiff Hilti Aktiengesellschaft 's Invalidity Contentions" in Case 1:22-cv-01248-CJB (in the U.S. District Court for the District of Delaware).
Document 1248HILTI0003916-0003920 filed with Document filed Jun. 30, 2023, "Plaintiff Hilti Aktiengesellschaft 's Invalidity Contentions" in Case 1:22-cv-01248-CJB (in the U.S. District Court for the District of Delaware).
Document 1248HILTI0003921-0003930 filed with Document filed Jun. 30, 2023, "Plaintiff Hilti Aktiengesellschaft 's Invalidity Contentions" in Case 1:22-cv-01248-CJB (in the U.S. District Court for the District of Delaware).
Document 1248HILTI0003931-0003934 filed with Document filed Jun. 30, 2023, "Plaintiff Hilti Aktiengesellschaft 's Invalidity Contentions" in Case 1:22-cv-01248-CJB (in the U.S. District Court for the District of Delaware).
Document 1248HILTI0003935-0003940 filed with Document filed Jun. 30, 2023, "Plaintiff Hilti Aktiengesellschaft 's Invalidity Contentions" in Case 1:22-cv-01248-CJB (in the U.S. District Court for the District of Delaware).
Document 1248HILTI0003941-0003946 filed with Document filed Jun. 30, 2023, "Plaintiff Hilti Aktiengesellschaft 's Invalidity Contentions" in Case 1:22-cv-01248-CJB (in the U.S. District Court for the District of Delaware).
Document 1248HILTI0003947-0003957 filed with Document filed Jun. 30, 2023, "Plaintiff Hilti Aktiengesellschaft 's Invalidity Contentions" in Case 1:22-cv-01248-CJB (in the U.S. District Court for the District of Delaware).
Document 1248HILTI0003958-0003962 filed with Document filed Jun. 30, 2023, "Plaintiff Hilti Aktiengesellschaft 's Invalidity Contentions" in Case 1:22-cv-01248-CJB (in the U.S. District Court for the District of Delaware).
Document 1248HILTI0003963-0003978 filed with Document filed Jun. 30, 2023, "Plaintiff Hilti Aktiengesellschaft 's Invalidity Contentions" in Case 1:22-cv-01248-CJB (in the U.S. District Court for the District of Delaware).
Document 1248HILTI0003983-0003986 filed with Document filed Jun. 30, 2023, "Plaintiff Hilti Aktiengesellschaft 's Invalidity Contentions" in Case 1:22-cv-01248-CJB (in the U.S. District Court for the District of Delaware).

(56) References Cited

OTHER PUBLICATIONS

Document 1248HILTI0003987-0003993 filed with Document filed Jun. 30, 2023, "Plaintiff Hilti Aktiengesellschaft 's Invalidity Contentions" in Case 1:22-cv-01248-CJB (in the U.S. District Court for the District of Delaware).
Document 1248HILTI0003994-0003997 filed with Document filed Jun. 30, 2023, "Plaintiff Hilti Aktiengesellschaft 's Invalidity Contentions" in Case 1:22-cv-01248-CJB (in the U.S. District Court for the District of Delaware).
Document 1248HILTI0003998-0004008 filed with Document filed Jun. 30, 2023, "Plaintiff Hilti Aktiengesellschaft 's Invalidity Contentions" in Case 1:22-cv-01248-CJB (in the U.S. District Court for the District of Delaware).
Document 1248HILTI0004009-0004014 filed with Document filed Jun. 30, 2023, "Plaintiff Hilti Aktiengesellschaft 's Invalidity Contentions" in Case 1:22-cv-01248-CJB (in the U.S. District Court for the District of Delaware).
Document 1248HILTI0004015-0004021 filed with Document filed Jun. 30, 2023, "Plaintiff Hilti Aktiengesellschaft 's Invalidity Contentions" in Case 1:22-cv-01248-CJB (in the U.S. District Court for the District of Delaware).
Document 1248HILTI0004022-0004042 filed with Document filed Jun. 30, 2023, "Plaintiff Hilti Aktiengesellschaft 's Invalidity Contentions" in Case 1:22-cv-01248-CJB (in the U.S. District Court for the District of Delaware).
Document 1248HILTI0004043-0004067 filed with Document filed Jun. 30, 2023, "Plaintiff Hilti Aktiengesellschaft 's Invalidity Contentions" in Case 1:22-cv-01248-CJB (in the U.S. District Court for the District of Delaware).
Document 1248HILTI0004094-0004115 filed with Document filed Jun. 30, 2023, "Plaintiff Hilti Aktiengesellschaft 's Invalidity Contentions" in Case 1:22-cv-01248-CJB (in the U.S. District Court for the District of Delaware).
Document 1248HILTI0004116-0004128 filed with Document filed Jun. 30, 2023, "Plaintiff Hilti Aktiengesellschaft 's Invalidity Contentions" in Case 1:22-cv-01248-CJB (in the U.S. District Court for the District of Delaware).
Document 1248HILTI0004129-0004143 filed with Document filed Jun. 30, 2023, "Plaintiff Hilti Aktiengesellschaft 's Invalidity Contentions" in Case 1:22-cv-01248-CJB (in the U.S. District Court for the District of Delaware).
Document 1248HILTI0004144-0004155 filed with Document filed Jun. 30, 2023, "Plaintiff Hilti Aktiengesellschaft 's Invalidity Contentions" in Case 1:22-cv-01248-CJB (in the U.S. District Court for the District of Delaware).
Document 1248HILTI0004156-0004165 filed with Document filed Jun. 30, 2023, "Plaintiff Hilti Aktiengesellschaft 's Invalidity Contentions" in Case 1:22-cv-01248-CJB (in the U.S. District Court for the District of Delaware).
Document 1248HILTI0004166-0004172 filed with Document filed Jun. 30, 2023, "Plaintiff Hilti Aktiengesellschaft 's Invalidity Contentions" in Case 1:22-cv-01248-CJB (in the U.S. District Court for the District of Delaware).
Document 1248HILTI0004173-0004197 filed with Document filed Jun. 30, 2023, "Plaintiff Hilti Aktiengesellschaft 's Invalidity Contentions" in Case 1:22-cv-01248-CJB (in the U.S. District Court for the District of Delaware).
Document 1248HILTI0004217-0004232 filed with Document filed Jun. 30, 2023, "Plaintiff Hilti Aktiengesellschaft 's Invalidity Contentions" in Case 1:22-cv-01248-CJB (in the U.S. District Court for the District of Delaware).
Document 1248HILTI0004233-0004242 filed with Document filed Jun. 30, 2023, "Plaintiff Hilti Aktiengesellschaft 's Invalidity Contentions" in Case 1:22-cv-01248-CJB (in the U.S. District Court for the District of Delaware).
Document 1248HILTI0004243-0004265 filed with Document filed Jun. 30, 2023, "Plaintiff Hilti Aktiengesellschaft 's Invalidity Contentions" in Case 1:22-cv-01248-CJB (in the U.S. District Court for the District of Delaware).
Document 1248HILTI0004266-0004297 filed with Document filed Jun. 30, 2023, "Plaintiff Hilti Aktiengesellschaft 's Invalidity Contentions" in Case 1:22-cv-01248-CJB (in the U.S. District Court for the District of Delaware).
Document 1248HILTI0004298-0004318 filed with Document filed Jun. 30, 2023, "Plaintiff Hilti Aktiengesellschaft 's Invalidity Contentions" in Case 1:22-cv-01248-CJB (in the U.S. District Court for the District of Delaware).
Document 1248HILTI0004340-0004376 filed with Document filed Jun. 30, 2023, "Plaintiff Hilti Aktiengesellschaft 's Invalidity Contentions" in Case 1:22-cv-01248-CJB (in the U.S. District Court for the District of Delaware).
Document 1248HILTI0003900-003901 filed with Document filed Jun. 30, 2023, "Plaintiff Hilti Aktiengesellsschafts Invalidity Contentions"in Case 1:22-cv-01248-CJB (in the U.S. District Court for the District of Deleware).
Document 1248HILTI0003979-003982 filed with Document filed Jun. 30, 2023, "Plaintiff Hilti Aktiengesellsschafts Invalidity Contentions"in Case 1:22-cv-01248-CJB (in the U.S. District Court for the District of Deleware).
Document 1248HILTI0004068-004069 filed with Document filed Jun. 30, 2023, "Plaintiff Hilti Aktiengesellsschafts Invalidity Contentions"in Case 1:22-cv-01248-CJB (in the U.S. District Court for the District of Deleware).
Document 1248HILTI0004070-004081 filed with Document filed Jun. 30, 2023, "Plaintiff Hilti Aktiengesellsschafts Invalidity Contentions"in Case 1:22-cv-01248-CJB (in the U.S. District Court for the District of Deleware).
Document 1248HILTI0004082-004093 filed with Document filed Jun. 30, 2023, "Plaintiff Hilti Aktiengesellsschafts Invalidity Contentions"in Case 1:22-cv-01248-CJB (in the U.S. District Court for the District of Deleware).
Document 1248HILTI0004377-004378 filed with Document filed Jun. 30, 2023, "Plaintiff Hilti Aktiengesellsschafts Invalidity Contentions"in Case 1:22-cv-01248-CJB (in the U.S. District Court for the District of Deleware).
Document 1248HILTI0004379 filed with Document filed Jun. 30, 2023, "Plaintiff Hilti Aktiengesellsschafts Invalidity Contentions"in Case 1:22-cv-01248-CJB (in the U.S. District Court for the District of Deleware).
Document 1248HILTI0004380-00483 filed with Document filed Jun. 30, 2023, "Plaintiff Hilti Aktiengesellsschafts Invalidity Contentions"in Case 1:22-cv-01248-CJB (in the U.S. District Court for the District of Deleware).
Document 1248HILTI0004384 filed with Document filed Jun. 30, 2023, "Plaintiff Hilti Aktiengesellsschafts Invalidity Contentions"in Case 1:22-cv-01248-CJB (in the U.S. District Court for the District of Deleware).
Document 1248HILTI0004385 filed with Document filed Jun. 30, 2023, "Plaintiff Hilti Aktiengesellsschafts Invalidity Contentions"in Case 1:22-cv-01248-CJB (in the U.S. District Court for the District of Deleware).
Document 1248HILTI0004386 filed with Document filed Jun. 30, 2023, "Plaintiff Hilti Aktiengesellsschafts Invalidity Contentions"in Case 1:22-cv-01248-CJB (in the U.S. District Court for the District of Deleware).
Document 1248HILTI0004387 filed with Document filed Jun. 30, 2023, "Plaintiff Hilti Aktiengesellsschafts Invalidity Contentions"in Case 1:22-cv-01248-CJB (in the U.S. District Court for the District of Deleware).
Document 1248HILTI0004388 filed with Document filed Jun. 30, 2023, "Plaintiff Hilti Aktiengesellsschafts Invalidity Contentions"in Case 1:22-cv-01248-CJB (in the U.S. District Court for the District of Deleware).
Document 1248HILTI0004389 filed with Document filed Jun. 30, 2023, "Plaintiff Hilti Aktiengesellsschafts Invalidity Contentions"in Case 1:22-cv-01248-CJB (in the U.S. District Court for the District of Deleware).
Document 1248HILTI0004390 filed with Document filed Jun. 30, 2023, "Plaintiff Hilti Aktiengesellsschafts Invalidity Contentions"in Case 1:22-cv-01248-CJB (in the U.S. District Court for the District of Deleware).

(56) References Cited

OTHER PUBLICATIONS

Document 1248HILTI0004393 filed with Document filed Jun. 30, 2023, "Plaintiff Hilti Aktiengesellsschafts Invalidity Contentions"in Case 1:22-cv-01248-CJB (in the U.S. District Court for the District of Deleware).

Document 1248HILTI0004394 filed with Document filed Jun. 30, 2023, "Plaintiff Hilti Aktiengesellsschafts Invalidity Contentions"in Case 1:22-cv-01248-CJB (in the U.S. District Court for the District of Deleware).

Document 1248HILTI0004395 filed with Document filed Jun. 30, 2023, "Plaintiff Hilti Aktiengesellsschafts Invalidity Contentions"in Case 1:22-cv-01248-CJB (in the U.S. District Court for the District of Deleware).

Document 1248HILTI0004396 filed with Document filed Jun. 30, 2023, "Plaintiff Hilti Aktiengesellsschafts Invalidity Contentions"in Case 1:22-cv-01248-CJB (in the U.S. District Court for the District of Deleware).

Document 1248HILTI0004397 filed with Document filed Jun. 30, 2023, "Plaintiff Hilti Aktiengesellsschafts Invalidity Contentions"in Case 1:22-cv-01248-CJB (in the U.S. District Court for the District of Deleware).

Document 1248HILTI0004398 filed with Document filed Jun. 30, 2023, "Plaintiff Hilti Aktiengesellsschafts Invalidity Contentions"in Case 1:22-cv-01248-CJB (in the U.S. District Court for the District of Deleware).

Document 1248HILTI0004399 filed with Document filed Jun. 30, 2023, "Plaintiff Hilti Aktiengesellsschafts Invalidity Contentions"in Case 1:22-cv-01248-CJB (in the U.S. District Court for the District of Deleware).

Document 1248HILTI0004400 filed with Document filed Jun. 30, 2023, "Plaintiff Hilti Aktiengesellsschafts Invalidity Contentions"in Case 1:22-cv-01248-CJB (in the U.S. District Court for the District of Deleware).

Document 1248HILTI0004401 filed with Document filed Jun. 30, 2023, "Plaintiff Hilti Aktiengesellsschafts Invalidity Contentions"in Case 1:22-cv-01248-CJB (in the U.S. District Court for the District of Deleware).

Document 1248HILTI0004402 filed with Document filed Jun. 30, 2023, "Plaintiff Hilti Aktiengesellsschafts Invalidity Contentions"in Case 1:22-cv-01248-CJB (in the U.S. District Court for the District of Deleware).

Document 1248HILTI0004403 filed with Document filed Jun. 30, 2023, "Plaintiff Hilti Aktiengesellsschafts Invalidity Contentions"in Case 1:22-cv-01248-CJB (in the U.S. District Court for the District of Deleware).

Document 1248HILTI0004404 filed with Document filed Jun. 30, 2023, "Plaintiff Hilti Aktiengesellschaft 's Invalidity Contentions" in Case 1:22-cv-01248-CJB (in the U.S. District Court for the District of Delaware).

Document 1248HILTI0004405-0004406 filed with Document filed Jun. 30, 2023, "Plaintiff Hilti Aktiengesellschaft 's Invalidity Contentions" in Case 1:22-cv-01248-CJB (in the U.S. District Court for the District of Delaware).

Document 1248HILTI0004407-0004433 filed with Document filed Jun. 30, 2023, "Plaintiff Hilti Aktiengesellschaft 's Invalidity Contentions" in Case 1:22-cv-01248-CJB (in the U.S. District Court for the District of Delaware).

Document 1248HILTI0004459-0004460 filed with Document filed Jun. 30, 2023, "Plaintiff Hilti Aktiengesellschaft 's Invalidity Contentions" in Case 1:22-cv-01248-CJB (in the U.S. District Court for the District of Delaware).

Document 1248HILTI0004461-0004465 filed with Document filed Jun. 30, 2023, "Plaintiff Hilti Aktiengesellschaft 's Invalidity Contentions" in Case 1:22-cv-01248-CJB (in the U.S. District Court for the District of Delaware).

Document 1248HILTI0004466-0004469 filed with Document filed Jun. 30, 2023, "Plaintiff Hilti Aktiengesellschaft 's Invalidity Contentions" in Case 1:22-cv-01248-CJB (in the U.S. District Court for the District of Delaware).

Document 1248HILTI0004470-0004471 filed with Document filed Jun. 30, 2023, "Plaintiff Hilti Aktiengesellschaft 's Invalidity Contentions" in Case 1:22-cv-01248-CJB (in the U.S. District Court for the District of Delaware).

Document 1248HILTI0004472 filed with Document filed Jun. 30, 2023, "Plaintiff Hilti Aktiengesellschaft 's Invalidity Contentions" in Case 1:22-cv-01248-CJB (in the U.S. District Court for the District of Delaware).

Document 1248HILTI0004473 filed with Document filed Jun. 30, 2023, "Plaintiff Hilti Aktiengesellschaft 's Invalidity Contentions" in Case 1:22-cv-01248-CJB (in the U.S. District Court for the District of Delaware).

Document 1248HILTI0004474-0004485 filed with Document filed Jun. 30, 2023, "Plaintiff Hilti Aktiengesellschaft 's Invalidity Contentions" in Case 1:22-cv-01248-CJB (in the U.S. District Court for the District of Delaware).

Document 1248HILTI0004486-0004487 filed with Document filed Jun. 30, 2023, "Plaintiff Hilti Aktiengesellschaft 's Invalidity Contentions" in Case 1:22-cv-01248-CJB (in the U.S. District Court for the District of Delaware).

Document 1248HILTI0004491-0004493 filed with Document filed Jun. 30, 2023, "Plaintiff Hilti Aktiengesellschaft 's Invalidity Contentions" in Case 1:22-cv-01248-CJB (in the U.S. District Court for the District of Delaware).

Document 1248HILTI0004494-0004534 filed with Document filed Jun. 30, 2023, "Plaintiff Hilti Aktiengesellschaft 's Invalidity Contentions" in Case 1:22-cv-01248-CJB (in the U.S. District Court for the District of Delaware).

Document 1248HILTI0004391 filed with Document filed Jun. 30, 2023, "Plaintiff Hilti Aktiengesellsschafts Invalidity Contentions"in Case 1:22-cv-01248-CJB (in the U.S. District Court for the District of Deleware).

Document 1248HILTI0004392 filed with Document filed Jun. 30, 2023, "Plaintiff Hilti Aktiengesellsschafts Invalidity Contentions"in Case 1:22-cv-01248-CJB (in the U.S. District Court for the District of Deleware).

Document filed Jun. 30, 2023, "Specified Technologies Inc.'s Invalidity Contentions"in Case 1:22-cv-01248-CJB (in the U.S. District Court for the District of Deleware).

Exhibit D-1 to Document filed Jun. 30, 2023, "Specified Technologies Inc.'s Invalidity Contentions"in Case 1:22-cv-01248-CJB (in the U.S. District Court for the District of Deleware).

Exhibit D-2 to Document filed Jun. 30, 2023, "Specified Technologies Inc.'s Invalidity Contentions"in Case 1:22-cv-01248-CJB (in the U.S. District Court for the District of Deleware).

Exhibit D-3 to Document filed Jun. 30, 2023, "Specified Technologies Inc.'s Invalidity Contentions"in Case 1:22-cv-01248-CJB (in the U.S. District Court for the District of Deleware).

Exhibit D-4 to Document filed Jun. 30, 2023, "Specified Technologies Inc.'s Invalidity Contentions"in Case 1:22-cv-01248-CJB (in the U.S. District Court for the District of Deleware).

Exhibit D-5 to Document filed Jun. 30, 2023, "Specified Technologies Inc.'s Invalidity Contentions"in Case 1:22-cv-01248-CJB (in the U.S. District Court for the District of Deleware).

Exhibit D-6 to Document filed Jun. 30, 2023, "Specified Technologies Inc.'s Invalidity Contentions"in Case 1:22-cv-01248-CJB (in the U.S. District Court for the District of Deleware).

Exhibit D-7 to Document filed Jun. 30, 2023, "Specified Technologies Inc.'s Invalidity Contentions"in Case 1:22-cv-01248-CJB (in the U.S. District Court for the District of Deleware).

Exhibit D-8 to Document filed Jun. 30, 2023, "Specified Technologies Inc.'s Invalidity Contentions"in Case 1:22-cv-01248-CJB (in the U.S. District Court for the District of Deleware).

Exhibit D-9 to Document filed Jun. 30, 2023, "Specified Technologies Inc.'s Invalidity Contentions"in Case 1:22-cv-01248-CJB (in the U.S. District Court for the District of Deleware).

Exhibit D-10 to Document filed Jun. 30, 2023, "Specified Technologies Inc.'s Invalidity Contentions"in Case 1:22-cv-01248-CJB (in the U.S. District Court for the District of Deleware).

Exhibit D-11 to Document filed Jun. 30, 2023, "Specified Technologies Inc.'s Invalidity Contentions"in Case 1:22-cv-01248-CJB (in the U.S. District Court for the District of Delaware).

(56) References Cited

OTHER PUBLICATIONS

Exhibit D-12 to Document filed Jun. 30, 2023, "Specified Technologies Inc.'s Invalidity Contentions"in Case 1:22-cv-01248-CJB (in the U.S. District Court for the District of Deleware).
Exhibit D-13 to Document filed Jun. 30, 2023, "Specified Technologies Inc.'s Invalidity Contentions"in Case 1:22-cv-01248-CJB (in the U.S. District Court for the District of Deleware).
Exhibit D-14 to Document filed Jun. 30, 2023, "Specified Technologies Inc.'s Invalidity Contentions"in Case 1:22-cv-01248-CJB (in the U.S. District Court for the District of Deleware).
Exhibit D-15 to Document filed Jun. 30, 2023, "Specified Technologies Inc.'s Invalidity Contentions"in Case 1:22-cv-01248-CJB (in the U.S. District Court for the District of Deleware).
Exhibit D-16 to Document filed Jun. 30, 2023, "Specified Technologies Inc.'s Invalidity Contentions"in Case 1:22-cv-01248-CJB (in the U.S. District Court for the District of Deleware).
Exhibit A-1 to Document filed Jun. 30, 2023, "Specified Technologies Inc.'s Invalidity Contentions"in Case 1:22-cv-01248-CJB (in the U.S. District Court for the District of Deleware).
Exhibit A-2 to Document filed Jun. 30, 2023, "Specified Technologies Inc.'s Invalidity Contentions"in Case 1:22-cv-01248-CJB (in the U.S. District Court for the District of Deleware).
Exhibit A-3 to Document filed Jun. 30, 2023, "Specified Technologies Inc.'s Invalidity Contentions"in Case 1:22-cv-01248-CJB (in the U.S. District Court for the District of Deleware).
Exhibit A-4 to Document filed Jun. 30, 2023, "Specified Technologies Inc.'s Invalidity Contentions"in Case 1:22-cv-01248-CJB (in the U.S. District Court for the District of Deleware).
Exhibit A-5 to Document filed Jun. 30, 2023, "Specified Technologies Inc.'s Invalidity Contentions"in Case 1:22-cv-01248-CJB (in the U.S. District Court for the District of Deleware).
Exhibit A-6 to Document filed Jun. 30, 2023, "Specified Technologies Inc.'s Invalidity Contentions"in Case 1:22-cv-01248-CJB (in the U.S. District Court for the District of Deleware).
Exhibit A-7 to Document filed Jun. 30, 2023, "Specified Technologies Inc.'s Invalidity Contentions"in Case 1:22-cv-01248-CJB (in the U.S. District Court for the District of Deleware).
Exhibit A-8 to Document filed Jun. 30, 2023, "Specified Technologies Inc.'s Invalidity Contentions"in Case 1:22-cv-01248-CJB (in the U.S. District Court for the District of Deleware).
Exhibit A-9 to Document filed Jun. 30, 2023, "Specified Technologies Inc.'s Invalidity Contentions"in Case 1:22-cv-01248-CJB (in the U.S. District Court for the District of Deleware).
Exhibit A-10 to Document filed Jun. 30, 2023, "Specified Technologies Inc.'s Invalidity Contentions"in Case 1:22-cv-01248-CJB (in the U.S. District Court for the District of Deleware).
Exhibit A-11 to Document filed Jun. 30, 2023, "Specified Technologies Inc.'s Invalidity Contentions"in Case 1:22-cv-01248-CJB (in the U.S. District Court for the District of Deleware).
Exhibit A-12 to Document filed Jun. 30, 2023, "Specified Technologies Inc.'s Invalidity Contentions"in Case 1:22-cv-01248-CJB (in the U.S. District Court for the District of Deleware).
Exhibit A-13 to Document filed Jun. 30, 2023, "Specified Technologies Inc.'s Invalidity Contentions"in Case 1:22-cv-01248-CJB (in the U.S. District Court for the District of Deleware).
Exhibit A-14 to Document filed Jun. 30, 2023, "Specified Technologies Inc.'s Invalidity Contentions"in Case 1:22-cv-01248-CJB (in the U.S. District Court for the District of Deleware).
Exhibit A-15 to Document filed Jun. 30, 2023, "Specified Technologies Inc.'s Invalidity Contentions"in Case 1:22-cv-01248-CJB (in the U.S. District Court for the District of Deleware).
Exhibit A-16 to Document filed Jun. 30, 2023, "Specified Technologies Inc.'s Invalidity Contentions"in Case 1:22-cv-01248-CJB (in the U.S. District Court for the District of Deleware).
Exhibit A-17 to Document filed Jun. 30, 2023, "Specified Technologies Inc.'s Invalidity Contentions"in Case 1:22-cv-01248-CJB (in the U.S. District Court for the District of Deleware).
Exhibit A-18 to Document filed Jun. 30, 2023, "Specified Technologies Inc.'s Invalidity Contentions"in Case 1:22-cv-01248-CJB (in the U.S. District Court for the District of Deleware).
Exhibit B-1 to Document filed Jun. 30, 2023, "Specified Technologies Inc.'s Invalidity Contentions"in Case 1:22-cv-01248-CJB (in the U.S. District Court for the District of Deleware).
Exhibit B-2 to Document filed Jun. 30, 2023, "Specified Technologies Inc.'s Invalidity Contentions"in Case 1:22-cv-01248-CJB (in the U.S. District Court for the District of Deleware).
Exhibit B-3 to Document filed Jun. 30, 2023, "Specified Technologies Inc.'s Invalidity Contentions"in Case 1:22-cv-01248-CJB (in the U.S. District Court for the District of Deleware).
Exhibit B-4 to Document filed Jun. 30, 2023, "Specified Technologies Inc.'s Invalidity Contentions"in Case 1:22-cv-01248-CJB (in the U.S. District Court for the District of Deleware).
Exhibit B-5 to Document filed Jun. 30, 2023, "Specified Technologies Inc.'s Invalidity Contentions"in Case 1:22-cv-01248-CJB (in the U.S. District Court for the District of Deleware).
Exhibit B-6 to Document filed Jun. 30, 2023, "Specified Technologies Inc.'s Invalidity Contentions"in Case 1:22-cv-01248-CJB (in the U.S. District Court for the District of Deleware).
Exhibit B-7 to Document filed Jun. 30, 2023, "Specified Technologies Inc.'s Invalidity Contentions"in Case 1:22-cv-01248-CJB (in the U.S. District Court for the District of Deleware).
Exhibit B-8 to Document filed Jun. 30, 2023, "Specified Technologies Inc.'s Invalidity Contentions"in Case 1:22-cv-01248-CJB (in the U.S. District Court for the District of Deleware).
Exhibit B-9 to Document filed Jun. 30, 2023, "Specified Technologies Inc.'s Invalidity Contentions"in Case 1:22-cv-01248-CJB (in the U.S. District Court for the District of Deleware).
Exhibit B-10 to Document filed Jun. 30, 2023, "Specified Technologies Inc.'s Invalidity Contentions"in Case 1:22-cv-01248-CJB (in the U.S. District Court for the District of Deleware).
Exhibit B-11 to Document filed Jun. 30, 2023, "Specified Technologies Inc.'s Invalidity Contentions"in Case 1:22-cv-01248-CJB (in the U.S. District Court for the District of Deleware).
Exhibit B-12 to Document filed Jun. 30, 2023, "Specified Technologies Inc.'s Invalidity Contentions"in Case 1:22-cv-01248-CJB (in the U.S. District Court for the District of Deleware).
Exhibit B-13 to Document filed Jun. 30, 2023, "Specified Technologies Inc.'s Invalidity Contentions"in Case 1:22-cv-01248-CJB (in the U.S. District Court for the District of Deleware).
Exhibit B-14 to Document filed Jun. 30, 2023, "Specified Technologies Inc.'s Invalidity Contentions"in Case 1:22-cv-01248-CJB (in the U.S. District Court for the District of Deleware)
Exhibit B-15 to Document filed Jun. 30, 2023, "Specified Technologies Inc.'s Invalidity Contentions"in Case 1:22-cv-01248-CJB (in the U.S. District Court for the District of Deleware).
Exhibit B-16 to Document filed Jun. 30, 2023, "Specified Technologies Inc.'s Invalidity Contentions"in Case 1:22-cv-01248-CJB (in the U.S. District Court for the District of Deleware).
Exhibit B-17 to Document filed Jun. 30, 2023, "Specified Technologies Inc.'s Invalidity Contentions"in Case 1:22-cv-01248-CJB (in the U.S. District Court for the District of Deleware).
Exhibit B-18 to Document filed Jun. 30, 2023, "Specified Technologies Inc.'s Invalidity Contentions"in Case 1:22-cv-01248-CJB (in the U.S. District Court for the District of Deleware).
Exhibit I to Document filed Jun. 30, 2023, "Specified Technologies Inc.'s Invalidity Contentions"in Case 1:22-cv-01248-CJB (in the U.S. District Court for the District of Deleware).
Exhibit F to Document filed Jun. 30, 2023, "Specified Technologies Inc.'s Invalidity Contentions"in Case 1:22-cv-01248-CJB (in the U.S. District Court for the District of Deleware).
Exhibit H to Document filed Jun. 30, 2023, "Specified Technologies Inc.'s Invalidity Contentions"in Case 1:22-cv-01248-CJB (in the U.S. District Court for the District of Deleware).
Exhibit G to Document filed Jun. 30, 2023, "Specified Technologies Inc.'s Invalidity Contentions"in Case 1:22-cv-01248-CJB (in the U.S. District Court for the District of Deleware).
Exhibit E-1 to Document filed Jun. 30, 2023, "Specified Technologies Inc.'s Invalidity Contentions"in Case 1:22-cv-01248-CJB (in the U.S. District Court for the District of Deleware).
Exhibit E-2 to Document filed Jun. 30, 2023, "Specified Technologies Inc.'s Invalidity Contentions"in Case 1:22-cv-01248-CJB (in the U.S. District Court for the District of Deleware).

(56) References Cited

OTHER PUBLICATIONS

Exhibit E-3 to Document filed Jun. 30, 2023, "Specified Technologies Inc.'s Invalidity Contentions"in Case 1:22-cv-01248-CJB (in the U.S. District Court for the District of Deleware).
Exhibit E-4 to Document filed Jun. 30, 2023, "Specified Technologies Inc.'s Invalidity Contentions"in Case 1:22-cv-01248-CJB (in the U.S. District Court for the District of Deleware).
Exhibit E-5 to Document filed Jun. 30, 2023, "Specified Technologies Inc.'s Invalidity Contentions"in Case 1:22-cv-01248-CJB (in the U.S. District Court for the District of Deleware).
Exhibit E-6 to Document filed Jun. 30, 2023, "Specified Technologies Inc.'s Invalidity Contentions"in Case 1:22-cv-01248-CJB (in the U.S. District Court for the District of Deleware).
Exhibit E-7 to Document filed Jun. 30, 2023, "Specified Technologies Inc.'s Invalidity Contentions"in Case 1:22-cv-01248-CJB (in the U.S. District Court for the District of Deleware).
Exhibit E-8 to Document filed Jun. 30, 2023, "Specified Technologies Inc.'s Invalidity Contentions"in Case 1:22-cv-01248-CJB (in the U.S. District Court for the District of Deleware).
Exhibit E-9 to Document filed Jun. 30, 2023, "Specified Technologies Inc.'s Invalidity Contentions"in Case 1:22-cv-01248-CJB (in the U.S. District Court for the District of Deleware).
Exhibit E-10 to Document filed Jun. 30, 2023, "Specified Technologies Inc.'s Invalidity Contentions"in Case 1:22-cv-01248-CJB (in the U.S. District Court for the District of Deleware).
Exhibit E-11 to Document filed Jun. 30, 2023, "Specified Technologies Inc.'s Invalidity Contentions"in Case 1:22-cv-01248-CJB (in the U.S. District Court for the District of Deleware).
Exhibit E-12 to Document filed Jun. 30, 2023, "Specified Technologies Inc.'s Invalidity Contentions"in Case 1:22-cv-01248-CJB (in the U.S. District Court for the District of Deleware).
Exhibit E-13 to Document filed Jun. 30, 2023, "Specified Technologies Inc.'s Invalidity Contentions"in Case 1:22-cv-01248-CJB (in the U.S. District Court for the District of Deleware).
Exhibit E-14 to Document filed Jun. 30, 2023, "Specified Technologies Inc.'s Invalidity Contentions"in Case 1:22-cv-01248-CJB (in the U.S. District Court for the District of Deleware).
Exhibit E-15 to Document filed Jun. 30, 2023, "Specified Technologies Inc.'s Invalidity Contentions"in Case 1:22-cv-01248-CJB (in the U.S. District Court for the District of Deleware).
Exhibit E-16 to Document filed Jun. 30, 2023, "Specified Technologies Inc.'s Invalidity Contentions"in Case 1:22-cv-01248-CJB (in the U.S. District Court for the District of Deleware).
Exhibit E-17 to Document filed Jun. 30, 2023, "Specified Technologies Inc.'s Invalidity Contentions"in Case 1:22-cv-01248-CJB (in the U.S. District Court for the District of Deleware).
Exhibit E-18 to Document filed Jun. 30, 2023, "Specified Technologies Inc.'s Invalidity Contentions"in Case 1:22-cv-01248-CJB (in the U.S. District Court for the District of Deleware).
Exhibit E-19 to Document filed Jun. 30, 2023, "Specified Technologies Inc.'s Invalidity Contentions"in Case 1:22-cv-01248-CJB (in the U.S. District Court for the District of Deleware).
Exhibit E-20 to Document filed Jun. 30, 2023, "Specified Technologies Inc.'s Invalidity Contentions"in Case 1:22-cv-01248-CJB (in the U.S. District Court for the District of Deleware).
Exhibit E-21 to Document filed Jun. 30, 2023, "Specified Technologies Inc.'s Invalidity Contentions"in Case 1:22-cv-01248-CJB (in the U.S. District Court for the District of Deleware).
Exhibit E-22 to Document filed Jun. 30, 2023, "Specified Technologies Inc.'s Invalidity Contentions"in Case 1:22-cv-01248-CJB (in the U.S. District Court for the District of Deleware).
Exhibit C-1 to Document filed Jun. 30, 2023, "Specified Technologies Inc.'s Invalidity Contentions"in Case 1:22-cv-01248-CJB (in the U.S. District Court for the District of Deleware).
Exhibit C-2 to Document filed Jun. 30, 2023, "Specified Technologies Inc.'s Invalidity Contentions"in Case 1:22-cv-01248-CJB (in the U.S. District Court for the District of Deleware).
Exhibit C-3 to Document filed Jun. 30, 2023, "Specified Technologies Inc.'s Invalidity Contentions"in Case 1:22-cv-01248-CJB (in the U.S. District Court for the District of Deleware).
Exhibit C-4 to Document filed Jun. 30, 2023, "Specified Technologies Inc.'s Invalidity Contentions"in Case 1:22-cv-01248-CJB (in the U.S. District Court for the District of Deleware).
Exhibit C-5 to Document filed Jun. 30, 2023, "Specified Technologies Inc.'s Invalidity Contentions"in Case 1:22-cv-01248-CJB (in the U.S. District Court for the District of Deleware).
Exhibit C-6 to Document filed Jun. 30, 2023, "Specified Technologies Inc.'s Invalidity Contentions"in Case 1:22-cv-01248-CJB (in the U.S. District Court for the District of Deleware).
Exhibit C-7 to Document filed Jun. 30, 2023, "Specified Technologies Inc.'s Invalidity Contentions"in Case 1:22-cv-01248-CJB (in the U.S. District Court for the District of Deleware).
Exhibit C-8 to Document filed Jun. 30, 2023, "Specified Technologies Inc.'s Invalidity Contentions"in Case 1:22-cv-01248-CJB (in the U.S. District Court for the District of Deleware).
Exhibit C-9 to Document filed Jun. 30, 2023, "Specified Technologies Inc.'s Invalidity Contentions"in Case 1:22-cv-01248-CJB (in the U.S. District Court for the District of Deleware).
Exhibit C-10 to Document filed Jun. 30, 2023, "Specified Technologies Inc.'s Invalidity Contentions"in Case 1:22-cv-01248-CJB (in the U.S. District Court for the District of Deleware).
Exhibit C-11 to Document filed Jun. 30, 2023, "Specified Technologies Inc.'s Invalidity Contentions"in Case 1:22-cv-01248-CJB (in the U.S. District Court for the District of Deleware).
Exhibit C-12 to Document filed Jun. 30, 2023, "Specified Technologies Inc.'s Invalidity Contentions"in Case 1:22-cv-01248-CJB (in the U.S. District Court for the District of Deleware).
Exhibit C-13 to Document filed Jun. 30, 2023, "Specified Technologies Inc.'s Invalidity Contentions"in Case 1:22-cv-01248-CJB (in the U.S. District Court for the District of Deleware).
Exhibit C-14 to Document filed Jun. 30, 2023, "Specified Technologies Inc.'s Invalidity Contentions"in Case 1:22-cv-01248-CJB (in the U.S. District Court for the District of Deleware).
Exhibit C-15 to Document filed Jun. 30, 2023, "Specified Technologies Inc.'s Invalidity Contentions"in Case 1:22-cv-01248-CJB (in the U.S. District Court for the District of Deleware).
Exhibit C-16 to Document filed Jun. 30, 2023, "Specified Technologies Inc.'s Invalidity Contentions"in Case 1:22-cv-01248-CJB (in the U.S. District Court for the District of Deleware).
Exhibit C-17 to Document filed Jun. 30, 2023, "Specified Technologies Inc.'s Invalidity Contentions"in Case 1:22-cv-01248-CJB (in the U.S. District Court for the District of Deleware).
Exhibit C-18 to Document filed Jun. 30, 2023, "Specified Technologies Inc.'s Invalidity Contentions"in Case 1:22-cv-01248-CJB (in the U.S. District Court for the District of Deleware).
Exhibit C-19 to Document filed Jun. 30, 2023, "Specified Technologies Inc.'s Invalidity Contentions"in Case 1:22-cv-01248-CJB (in the U.S. District Court for the District of Deleware).
Exhibit C-20 to Document filed Jun. 30, 2023, "Specified Technologies Inc.'s Invalidity Contentions"in Case 1:22-cv-01248-CJB (in the U.S. District Court for the District of Deleware).
Exhibit C-21 to Document filed Jun. 30, 2023, "Specified Technologies Inc.'s Invalidity Contentions"in Case 1:22-cv-01248-CJB (in the U.S. District Court for the District of Deleware).
Exhibit C-22 to Document filed Jun. 30, 2023, "Specified Technologies Inc.'s Invalidity Contentions"in Case 1:22-cv-01248-CJB (in the U.S. District Court for the District of Deleware).
Exhibit C-23 to Document filed Jun. 30, 2023, "Specified Technologies Inc.'s Invalidity Contentions"in Case 1:22-cv-01248-CJB (in the U.S. District Court for the District of Deleware).
Exhibit C-24 to Document filed Jun. 30, 2023, "Specified Technologies Inc.'s Invalidity Contentions"in Case 1:22-cv-01248-CJB (in the U.S. District Court for the District of Deleware).
Exhibit J to Document filed Jun. 30, 2023, "Specified Technologies Inc.'s Invalidity Contentions"in Case 1:22-cv-01248-CJB (in the U.S. District Court for the District of Deleware).
Exhibit K to Document filed Jun. 30, 2023, "Specified Technologies Inc.'s Invalidity Contentions"in Case 1:22-cv-01248-CJB (in the U.S. District Court for the District of Deleware).
Exhibit L to Document filed Jun. 30, 2023, "Specified Technologies Inc.'s Invalidity Contentions"in Case 1:22-cv-01248-CJB (in the U.S. District Court for the District of Deleware).

(56) References Cited

OTHER PUBLICATIONS

Exhibit M to Document filed Jun. 30, 2023, "Specified Technologies Inc.'s Invalidity Contentions"in Case 1:22-cv-01248-CJB (in the U.S. District Court for the District of Deleware).
Exhibit N to Document filed Jun. 30, 2023, "Specified Technologies Inc.'s Invalidity Contentions"in Case 1:22-cv-01248-CJB (in the U.S. District Court for the District of Deleware).
Exhibit O to Document filed Jun. 30, 2023, "Specified Technologies Inc.'s Invalidity Contentions"in Case 1:22-cv-01248-CJB (in the U.S. District Court for the District of Deleware).
Exhibit P to Document filed Jun. 30, 2023, "Specified Technologies Inc.'s Invalidity Contentions"in Case 1:22-cv-01248-CJB (in the U.S. District Court for the District of Deleware).
Exhibit Q to Document filed Jun. 30, 2023, "Specified Technologies Inc.'s Invalidity Contentions"in Case 1:22-cv-01248-CJB (in the U.S. District Court for the District of Deleware).
Document 1248HILTI0000473-000118 filed Jun. 30, 2023, "Specified Technologies Inc.'s Invalidity Contentions"in Case 1:22-cv-01248-CJB (in the U.S. District Court for the District of Deleware).
Document STI-1248-000018-000019 filed Jun. 30, 2023, "Specified Technologies Inc.'s Invalidity Contentions"in Case 1:22-cv-01248-CJB (in the U.S. District Court for the District of Deleware).
Document STI-1248-000025 filed Jun. 30, 2023, "Specified Technologies Inc.'s Invalidity Contentions"in Case 1:22-cv-01248-CJB (in the U.S. District Court for the District of Deleware).
Document STI-1248-000081 filed Jun. 30, 2023, "Specified Technologies Inc.'s Invalidity Contentions"in Case 1:22-cv-01248-CJB (in the U.S. District Court for the District of Deleware).
Document STI-1248-000855-000862 filed Jun. 30, 2023, "Specified Technologies Inc.'s Invalidity Contentions"in Case 1:22-cv-01248-CJB (in the U.S. District Court for the District of Deleware).
Document STI-1248-004141-004145 filed Jun. 30, 2023, "Specified Technologies Inc.'s Invalidity Contentions"in Case 1:22-cv-01248-CJB (in the U.S. District Court for the District of Deleware).
Screen shots from STI-1248-004160 filed Jun. 30, 2023, "Specified Technologies Inc.'s Invalidity Contentions"in Case 1:22-cv-01248-CJB (in the U.S. District Court for the District of Deleware).
Document STI-1248-004161-004168 filed Jun. 30, 2023, "Specified Technologies Inc.'s Invalidity Contentions"in Case 1:22-cv-01248-CJB (in the U.S. District Court for the District of Deleware).
Document STI-1248-004270-004273 filed Jun. 30, 2023, "Specified Technologies Inc.'s Invalidity Contentions"in Case 1:22-cv-01248-CJB (in the U.S. District Court for the District of Deleware).
Document STI-1248-004274-004311 filed Jun. 30, 2023, "Specified Technologies Inc.'s Invalidity Contentions"in Case 1:22-cv-01248-CJB (in the U.S. District Court for the District of Deleware).
Document STI-1248-004312-004323 filed Jun. 30, 2023, "Specified Technologies Inc.'s Invalidity Contentions"in Case 1:22-cv-01248-CJB (in the U.S. District Court for the District of Deleware).
Document STI-1248-004415-004420 filed Jun. 30, 2023, "Specified Technologies Inc.'s Invalidity Contentions"in Case 1:22-cv-01248-CJB (in the U.S. District Court for the District of Deleware).
Document STI-1248-004421-004427 filed Jun. 30, 2023, "Specified Technologies Inc.'s Invalidity Contentions"in Case 1:22-cv-01248-CJB (in the U.S. District Court for the District of Deleware).
Document STI-1248-004435-004436 filed Jun. 30, 2023, "Specified Technologies Inc.'s Invalidity Contentions"in Case 1:22-cv-01248-CJB (in the U.S. District Court for the District of Deleware).
Document STI-1248-004491-004494 filed Jun. 30, 2023, "Specified Technologies Inc.'s Invalidity Contentions"in Case 1:22-cv-01248-CJB (in the U.S. District Court for the District of Deleware).
Document STI-1248-004502-004545 filed Jun. 30, 2023, "Specified Technologies Inc.'s Invalidity Contentions"in Case 1:22-cv-01248-CJB (in the U.S. District Court for the District of Deleware).
Document STI-1248-004546-004548 filed Jun. 30, 2023, "Specified Technologies Inc.'s Invalidity Contentions"in Case 1:22-cv-01248-CJB (in the U.S. District Court for the District of Deleware).
Document STI-1248-004549-004592 filed with Document filed Jun. 30, 2023, "Specified Technologies Inc.'s Invalidity Contentions" in Case 1:22-cv-01248-CJB (in the U.S. District Court for the District of Delaware).
Document STI-1248-004593-004625 filed with Document filed Jun. 30, 2023, "Specified Technologies Inc.'s Invalidity Contentions" in Case 1:22-cv-01248-CJB (in the U.S. District Court for the District of Delaware).
Document STI-1248-004626-004634 filed with Document filed Jun. 30, 2023, "Specified Technologies Inc.'s Invalidity Contentions" in Case 1:22-cv-01248-CJB (in the U.S. District Court for the District of Delaware).
Document STI-1248-004635-004645 filed with Document filed Jun. 30, 2023, "Specified Technologies Inc.'s Invalidity Contentions" in Case 1:22-cv-01248-CJB (in the U.S. District Court for the District of Delaware).
Document STI-1248-004646-004652 filed with Document filed Jun. 30, 2023, "Specified Technologies Inc.'s Invalidity Contentions" in Case 1:22-cv-01248-CJB (in the U.S. District Court for the District of Delaware).
Document STI-1248-004653-004663 filed with Document filed Jun. 30, 2023, "Specified Technologies Inc.'s Invalidity Contentions" in Case 1:22-cv-01248-CJB (in the U.S. District Court for the District of Delaware).
Document STI-1248-004664-004682 filed with Document filed Jun. 30, 2023, "Specified Technologies Inc.'s Invalidity Contentions" in Case 1:22-cv-01248-CJB (in the U.S. District Court for the District of Delaware).
Document STI-1248-004683-004695 filed with Document filed Jun. 30, 2023, "Specified Technologies Inc.'s Invalidity Contentions" in Case 1:22-cv-01248-CJB (in the U.S. District Court for the District of Delaware).
Document STI-1248-004696-004700 filed with Document filed Jun. 30, 2023, "Specified Technologies Inc.'s Invalidity Contentions" in Case 1:22-cv-01248-CJB (in the U.S. District Court for the District of Delaware).
Document STI-1248-004701-004714 filed with Document filed Jun. 30, 2023, "Specified Technologies Inc.'s Invalidity Contentions" in Case 1:22-cv-01248-CJB (in the U.S. District Court for the District of Delaware).
Document STI-1248-004715-004720 filed with Document filed Jun. 30, 2023, "Specified Technologies Inc.'s Invalidity Contentions" in Case 1:22-cv-01248-CJB (in the U.S. District Court for the District of Delaware).
Document STI-1248-004721-004730 filed with Document filed Jun. 30, 2023, "Specified Technologies Inc.'s Invalidity Contentions" in Case 1:22-cv-01248-CJB (in the U.S. District Court for the District of Delaware).
Document STI-1248-004731-004738 filed with Document filed Jun. 30, 2023, "Specified Technologies Inc.'s Invalidity Contentions" in Case 1:22-cv-01248-CJB (in the U.S. District Court for the District of Delaware).
Document STI-1248-004739-004744 filed with Document filed Jun. 30, 2023, "Specified Technologies Inc.'s Invalidity Contentions" in Case 1:22-cv-01248-CJB (in the U.S. District Court for the District of Delaware).
Document STI-1248-004745-004752 filed with Document filed Jun. 30, 2023, "Specified Technologies Inc.'s Invalidity Contentions" in Case 1:22-cv-01248-CJB (in the U.S. District Court for the District of Delaware).
Document STI-1248-004753-004765 filed with Document filed Jun. 30, 2023, "Specified Technologies Inc.'s Invalidity Contentions" in Case 1:22-cv-01248-CJB (in the U.S. District Court for the District of Delaware).
Document STI-1248-004766-004772 filed with Document filed Jun. 30, 2023, "Specified Technologies Inc.'s Invalidity Contentions" in Case 1:22-cv-01248-CJB (in the U.S. District Court for the District of Delaware).
Document STI-1248-004773-004789 filed with Document filed Jun. 30, 2023, "Specified Technologies Inc.'s Invalidity Contentions" in Case 1:22-cv-01248-CJB (in the U.S. District Court for the District of Delaware).

(56) References Cited

OTHER PUBLICATIONS

Document STI-1248-004790-004818 filed with Document filed Jun. 30, 2023, "Specified Technologies Inc.'s Invalidity Contentions" in Case 1:22-cv-01248-CJB (in the U.S. District Court for the District of Delaware).
Document STI-1248-004819-004827 filed with Document filed Jun. 30, 2023, "Specified Technologies Inc.'s Invalidity Contentions" in Case 1:22-cv-01248-CJB (in the U.S. District Court for the District of Delaware).
Document STI-1248-004828-004836 filed with Document filed Jun. 30, 2023, "Specified Technologies Inc.'s Invalidity Contentions" in Case 1:22-cv-01248-CJB (in the U.S. District Court for the District of Delaware).
Document STI-1248-004837-004850 filed with Document filed Jun. 30, 2023, "Specified Technologies Inc.'s Invalidity Contentions" in Case 1:22-cv-01248-CJB (in the U.S. District Court for the District of Delaware).
Document STI-1248-004851-004858 filed with Document filed Jun. 30, 2023, "Specified Technologies Inc.'s Invalidity Contentions" in Case 1:22-cv-01248-CJB (in the U.S. District Court for the District of Delaware).
Document STI-1248-004859-004867 filed with Document filed Jun. 30, 2023, "Specified Technologies Inc.'s Invalidity Contentions" in Case 1:22-cv-01248-CJB (in the U.S. District Court for the District of Delaware).
Document STI-1248-004868-004873 filed with Document filed Jun. 30, 2023, "Specified Technologies Inc.'s Invalidity Contentions" in Case 1:22-cv-01248-CJB (in the U.S. District Court for the District of Delaware).
Document STI-1248-004874-004878 filed with Document filed Jun. 30, 2023, "Specified Technologies Inc.'s Invalidity Contentions" in Case 1:22-cv-01248-CJB (in the U.S. District Court for the District of Delaware).
Document STI-1248-004879-004890 filed with Document filed Jun. 30, 2023, "Specified Technologies Inc.'s Invalidity Contentions" in Case 1:22-cv-01248-CJB (in the U.S. District Court for the District of Delaware).
Document STI-1248-004891-004901 filed with Document filed Jun. 30, 2023, "Specified Technologies Inc.'s Invalidity Contentions" in Case 1:22-cv-01248-CJB (in the U.S. District Court for the District of Delaware).
Document STI-1248-004902-004908 filed with Document filed Jun. 30, 2023, "Specified Technologies Inc.'s Invalidity Contentions" in Case 1:22-cv-01248-CJB (in the U.S. District Court for the District of Delaware).
Document STI-1248-004909-004919 filed with Document filed Jun. 30, 2023, "Specified Technologies Inc.'s Invalidity Contentions" in Case 1:22-cv-01248-CJB (in the U.S. District Court for the District of Delaware).
Document STI-1248-004920-004932 filed with Document filed Jun. 30, 2023, "Specified Technologies Inc.'s Invalidity Contentions" in Case 1:22-cv-01248-CJB (in the U.S. District Court for the District of Delaware).
Document STI-1248-004933-004943 filed with Document filed Jun. 30, 2023, "Specified Technologies Inc.'s Invalidity Contentions" in Case 1:22-cv-01248-CJB (in the U.S. District Court for the District of Delaware).
Document STI-1248-004944-004954 filed with Document filed Jun. 30, 2023, "Specified Technologies Inc.'s Invalidity Contentions" in Case 1:22-cv-01248-CJB (in the U.S. District Court for the District of Delaware).
Document STI-1248-004955-004977 filed with Document filed Jun. 30, 2023, "Specified Technologies Inc.'s Invalidity Contentions" in Case 1:22-cv-01248-CJB (in the U.S. District Court for the District of Delaware).
Document STI-1248-004978-004981 filed with Document filed Jun. 30, 2023, "Specified Technologies Inc.'s Invalidity Contentions" in Case 1:22-cv-01248-CJB (in the U.S. District Court for the District of Delaware).
Document STI-1248-004982-005000 filed with Document filed Jun. 30, 2023, "Specified Technologies Inc.'s Invalidity Contentions" in Case 1:22-cv-01248-CJB (in the U.S. District Court for the District of Delaware).
Document STI-1248-005001-005012 filed with Document filed Jun. 30, 2023, "Specified Technologies Inc.'s Invalidity Contentions" in Case 1:22-cv-01248-CJB (in the U.S. District Court for the District of Delaware).
Document STI-1248-005013-005037 filed with Document filed Jun. 30, 2023, "Specified Technologies Inc.'s Invalidity Contentions" in Case 1:22-cv-01248-CJB (in the U.S. District Court for the District of Delaware).
Document STI-1248-005038-005062 filed with Document filed Jun. 30, 2023, "Specified Technologies Inc.'s Invalidity Contentions" in Case 1:22-cv-01248-CJB (in the U.S. District Court for the District of Delaware).
Document STI-1248-005063-005075 filed with Document filed Jun. 30, 2023, "Specified Technologies Inc.'s Invalidity Contentions" in Case 1:22-cv-01248-CJB (in the U.S. District Court for the District of Delaware).
Document STI-1248-005076-005080 filed with Document filed Jun. 30, 2023, "Specified Technologies Inc.'s Invalidity Contentions" in Case 1:22-cv-01248-CJB (in the U.S. District Court for the District of Delaware).
Document STI-1248-005081-005083 filed with Document filed Jun. 30, 2023, "Specified Technologies Inc.'s Invalidity Contentions" in Case 1:22-cv-01248-CJB (in the U.S. District Court for the District of Delaware).
Document STI-1248-005084-005089 filed with Document filed Jun. 30, 2023, "Specified Technologies Inc.'s Invalidity Contentions" in Case 1:22-cv-01248-CJB (in the U.S. District Court for the District of Delaware).
Document STI-1248-005090-005120 filed with Document filed Jun. 30, 2023, "Specified Technologies Inc.'s Invalidity Contentions" in Case 1:22-cv-01248-CJB (in the U.S. District Court for the District of Delaware).
Document STI-1248-005121-005137 filed with Document filed Jun. 30, 2023, "Specified Technologies Inc.'s Invalidity Contentions" in Case 1:22-cv-01248-CJB (in the U.S. District Court for the District of Delaware).
Document STI-1248-005138-005158 filed with Document filed Jun. 30, 2023, "Specified Technologies Inc.'s Invalidity Contentions" in Case 1:22-cv-01248-CJB (in the U.S. District Court for the District of Delaware).
Document STI-1248-005159-005164 filed with Document filed Jun. 30, 2023, "Specified Technologies Inc.'s Invalidity Contentions" in Case 1:22-cv-01248-CJB (in the U.S. District Court for the District of Delaware).
Document STI-1248-005165-005183 filed with Document filed Jun. 30, 2023, "Specified Technologies Inc.'s Invalidity Contentions" in Case 1:22-cv-01248-CJB (in the U.S. District Court for the District of Delaware).
Document STI-1248-005184-005203 filed with Document filed Jun. 30, 2023, "Specified Technologies Inc.'s Invalidity Contentions" in Case 1:22-cv-01248-CJB (in the U.S. District Court for the District of Delaware).
Document STI-1248-005204-005210 filed with Document filed Jun. 30, 2023, "Specified Technologies Inc.'s Invalidity Contentions" in Case 1:22-cv-01248-CJB (in the U.S. District Court for the District of Delaware).
Document STI-1248-005211-005224 filed with Document filed Jun. 30, 2023, "Specified Technologies Inc.'s Invalidity Contentions" in Case 1:22-cv-01248-CJB (in the U.S. District Court for the District of Delaware).
Document STI-1248-005225-005229 filed with Document filed Jun. 30, 2023, "Specified Technologies Inc.'s Invalidity Contentions" in Case 1:22-cv-01248-CJB (in the U.S. District Court for the District of Delaware).
Document STI-1248-005230-005253 filed with Document filed Jun. 30, 2023, "Specified Technologies Inc.'s Invalidity Contentions" in Case 1:22-cv-01248-CJB (in the U.S. District Court for the District of Delaware).

(56) References Cited

OTHER PUBLICATIONS

Document STI-1248-005254-005262 filed with Document filed Jun. 30, 2023, "Specified Technologies Inc.'s Invalidity Contentions" in Case 1:22-cv-01248-CJB (in the U.S. District Court for the District of Delaware).
Document STI-1248-005263-005275 filed with Document filed Jun. 30, 2023, "Specified Technologies Inc.'s Invalidity Contentions" in Case 1:22-cv-01248-CJB (in the U.S. District Court for the District of Delaware).
Document STI-1248-005276-005286 filed with Document filed Jun. 30, 2023, "Specified Technologies Inc.'s Invalidity Contentions" in Case 1:22-cv-01248-CJB (in the U.S. District Court for the District of Delaware).
Document STI-1248-005287-005309 filed with Document filed Jun. 30, 2023, "Specified Technologies Inc.'s Invalidity Contentions" in Case 1:22-cv-01248-CJB (in the U.S. District Court for the District of Delaware).
Document STI-1248-005310-005320 filed with Document filed Jun. 30, 2023, "Specified Technologies Inc.'s Invalidity Contentions" in Case 1:22-cv-01248-CJB (in the U.S. District Court for the District of Delaware).
Document STI-1248-005321-005329 filed with Document filed Jun. 30, 2023, "Specified Technologies Inc.'s Invalidity Contentions" in Case 1:22-cv-01248-CJB (in the U.S. District Court for the District of Delaware).
Document STI-1248-005330-005335 filed with Document filed Jun. 30, 2023, "Specified Technologies Inc.'s Invalidity Contentions" in Case 1:22-cv-01248-CJB (in the U.S. District Court for the District of Delaware).
Document STI-1248-005336-005339 filed with Document filed Jun. 30, 2023, "Specified Technologies Inc.'s Invalidity Contentions" in Case 1:22-cv-01248-CJB (in the U.S. District Court for the District of Delaware).
Document STI-1248-005340-005345 filed with Document filed Jun. 30, 2023, "Specified Technologies Inc.'s Invalidity Contentions" in Case 1:22-cv-01248-CJB (in the U.S. District Court for the District of Delaware).
Document STI-1248-005346-005353 filed with Document filed Jun. 30, 2023. "Specified Technologies Inc.'s Invalidity Contentions" in Case 1:22-cv-01248-CJB (in the U.S. District Court for the District of Delaware).
Document STI-1248-005354-005356 filed with Document filed Jun. 30, 2023, "Specified Technologies Inc.'s Invalidity Contentions" in Case 1:22-cv-01248-CJB (in the U.S. District Court for the District of Delaware).
Document STI-1248-005357-005359 filed with Document filed Jun. 30, 2023, "Specified Technologies Inc.'s Invalidity Contentions" in Case 1:22-cv-01248-CJB (in the U.S. District Court for the District of Delaware).
Document STI-1248-005360-005361 filed with Document filed Jun. 30, 2023, "Specified Technologies Inc.'s Invalidity Contentions" in Case 1:22-cv-01248-CJB (in the U.S. District Court for the District of Delaware).
Document STI-1248-005755 filed with Document filed Jun. 30, 2023, "Specified Technologies Inc.'s Invalidity Contentions" in Case 1:22-cv-01248-CJB (in the U.S. District Court for the District of Delaware).
Document STI-1248-005759-005765 filed with Document filed Jun. 30, 2023, "Specified Technologies Inc.'s Invalidity Contentions" in Case 1:22-cv-01248-CJB (in the U.S. District Court for the District of Delaware).
Document STI-1248-000018-000019, filed with Document filed Jun. 30, 2023, "Specified Technologies Inc.'s Invalidity Contentions" in Case 1:22-cv-01248-CJB (in the U.S. District Court for the District of Delaware).
Document STI-1248-000025, filed with Document filed Jun. 30, 2023, "Specified Technologies Inc.'s Invalidity Contentions" in Case 1:22-cv-01248-CJB (in the U.S. District Court for the District of Delaware).
Document STI-1248-000075-000077, filed with Document filed Jun. 30, 2023, "Specified Technologies Inc.'s Invalidity Contentions" in Case 1:22-cv-01248-CJB (in the U.S. District Court for the District of Delaware).
Document STI-1248-000081, filed with Document filed Jun. 30, 2023, "Specified Technologies Inc.'s Invalidity Contentions" in Case 1:22-cv-01248-CJB (in the U.S. District Court for the District of Delaware).
Screen shots from STI-1248-004160, filed with Document filed Jun. 30, 2023, "Specified Technologies Inc.'s Invalidity Contentions" in Case 1:22-cv-01248-CJB (in the U.S. District Court for the District of Delaware).
Document STI-1248-004161-004168, filed with Document filed Jun. 30, 2023, "Specified Technologies Inc.'s Invalidity Contentions" in Case 1:22-cv-01248-CJB (in the U.S. District Court for the District of Delaware).
Document STI-1248-004270-004273, filed with Document filed Jun. 30, 2023, "Specified Technologies Inc.'s Invalidity Contentions" in Case 1:22-cv-01248-CJB (in the U.S. District Court for the District of Delaware).
Document STI-1248-004312-004323, filed with Document filed Jun. 30, 2023, "Specified Technologies Inc.'s Invalidity Contentions" in Case 1:22-cv-01248-CJB (in the U.S. District Court for the District of Delaware).
Document STI-1248-004415-004420, filed with Document filed Jun. 30, 2023, "Specified Technologies Inc.'s Invalidity Contentions" in Case 1:22-cv-01248-CJB (in the U.S. District Court for the District of Delaware).
Document STI-1248-004491-004494, filed with Document filed Jun. 30, 2023, "Specified Technologies Inc.'s Invalidity Contentions" in Case 1:22-cv-01248-CJB (in the U.S. District Court for the District of Delaware).
Document STI-1248-004502-004545, filed with Document filed Jun. 30, 2023, "Specified Technologies Inc.'s Invalidity Contentions" in Case 1:22-cv-01248-CJB (in the U.S. District Court for the District of Delaware).
Document STI-1248-000078-000080, filed with Document filed Jun. 30, 2023, "Specified Technologies Inc.'s Invalidity Contentions" in Case 1:22-cv-01248-CJB (in the U.S. District Court for the District of Delaware).
Document STI-1248-000759 filed, with Document filed Jun. 30, 2023, "Specified Technologies Inc.'s Invalidity Contentions" in Case 1:22-cv-01248-CJB (in the U.S. District Court for the District of Delaware).
Document STI-1248-000839-000842, filed with Document filed Jun. 30, 2023, "Specified Technologies Inc.'s Invalidity Contentions" in Case 1:22-cv-01248-CJB (in the U.S. District Court for the District of Delaware).
Document STI-1248-000843-000852, filed with Document filed Jun. 30, 2023, "Specified Technologies Inc.'s Invalidity Contentions" in Case 1:22-cv-01248-CJB (in the U.S. District Court for the District of Delaware).
Document STI-1248-000987, filed with Document filed Jun. 30, 2023, "Specified Technologies Inc.'s Invalidity Contentions" in Case 1:22-cv-01248-CJB (in the U.S. District Court for the District of Delaware).
Document STI-1248-001780, filed with Document filed Jun. 30, 2023, "Specified Technologies Inc.'s Invalidity Contentions" in Case 1:22-cv-01248-CJB (in the U.S. District Court for the District of Delaware).
Document STI-1248-001781, filed with Document filed Jun. 30, 2023, "Specified Technologies Inc.'s Invalidity Contentions" in Case 1:22-cv-01248-CJB (in the U.S. District Court for the District of Delaware).
Document STI-1248-001782, filed with Document filed Jun. 30, 2023, "Specified Technologies Inc.'s Invalidity Contentions" in Case 1:22-cv-01248-CJB (in the U.S. District Court for the District of Delaware).
Document STI-1248-001804, filed with Document filed Jun. 30, 2023, "Specified Technologies Inc.'s Invalidity Contentions" in Case 1:22-cv-01248-CJB (in the U.S. District Court for the District of Delaware).

(56) References Cited

OTHER PUBLICATIONS

Document STI-1248-003735, filed with Document filed Jun. 30, 2023, "Specified Technologies Inc.'s Invalidity Contentions" in Case 1:22-cv-01248-CJB (in the U.S. District Court for the District of Delaware).
Document STI-1248-4148-4159, filed with Document filed Jun. 30, 2023, "Specified Technologies Inc.'s Invalidity Contentions" in Case 1:22-cv-01248-CJB (in the U.S. District Court for the District of Delaware).
Document STI-1248-4201, filed with Document filed Jun. 30, 2023, "Specified Technologies Inc.'s Invalidity Contentions" in Case 1:22-cv-01248-CJB (in the U.S. District Court for the District of Delaware).
Document STI-1248-4202, filed with Document filed Jun. 30, 2023, "Specified Technologies Inc.'s Invalidity Contentions" in Case 1:22-cv-01248-CJB (in the U.S. District Court for the District of Delaware).
Document STI-1248-4203, filed with Document filed Jun. 30, 2023, "Specified Technologies Inc.'s Invalidity Contentions" in Case 1:22-cv-01248-CJB (in the U.S. District Court for the District of Delaware).
Document STI-1248-4207, filed with Document filed Jun. 30, 2023, "Specified Technologies Inc.'s Invalidity Contentions" in Case 1:22-cv-01248-CJB (in the U.S. District Court for the District of Delaware).
Document STI-1248-4211, filed with Document filed Jun. 30, 2023, "Specified Technologies Inc.'s Invalidity Contentions" in Case 1:22-cv-01248-CJB (in the U.S. District Court for the District of Delaware).
Document STI-1248-4215, filed with Document filed Jun. 30, 2023, "Specified Technologies Inc.'s Invalidity Contentions" in Case 1:22-cv-01248-CJB (in the U.S. District Court for the District of Delaware).
Document STI-1248-4218, filed with Document filed Jun. 30, 2023, "Specified Technologies Inc.'s Invalidity Contentions" in Case 1:22-cv-01248-CJB (in the U.S. District Court for the District of Delaware).
Document STI-1248-4219, filed with Document filed Jun. 30, 2023, "Specified Technologies Inc.'s Invalidity Contentions" in Case 1:22-cv-01248-CJB (in the U.S. District Court for the District of Delaware).
Document STI-1248-4229, filed with Document filed Jun. 30, 2023, "Specified Technologies Inc.'s Invalidity Contentions" in Case 1:22-cv-01248-CJB (in the U.S. District Court for the District of Delaware).
Document STI-1248-4233, filed with Document filed Jun. 30, 2023, "Specified Technologies Inc.'s Invalidity Contentions" in Case 1:22-cv-01248-CJB (in the U.S. District Court for the District of Delaware).
Document STI-1248-4236, filed with Document filed Jun. 30, 2023, "Specified Technologies Inc.'s Invalidity Contentions" in Case 1:22-cv-01248-CJB (in the U.S. District Court for the District of Delaware).
Document STI-1248-4260, filed with Document filed Jun. 30, 2023, "Specified Technologies Inc.'s Invalidity Contentions" in Case 1:22-cv-01248-CJB (in the U.S. District Court for the District of Delaware).
Transcript and screen shots from document STI-1248-005599, filed with Document filed Jun. 30, 2023, "Specified Technologies Inc.'s Invalidity Contentions" in Case 1:22-cv-01248-CJB (in the U.S. District Court for the District of Delaware).
Transcript and screen shots from document STI-1248-005600, filed with Document filed Jun. 30, 2023, "Specified Technologies Inc.'s Invalidity Contentions" in Case 1:22-cv-01248-CJB (in the U.S. District Court for the District of Delaware).
Transcript and screen shots from document STI-1248-005601, filed with Document filed Jun. 30, 2023, "Specified Technologies Inc.'s Invalidity Contentions" in Case 1:22-cv-01248-CJB (in the U.S. District Court for the District of Delaware).
Screen shots from document STI-1248-005602, filed with Document filed Jun. 30, 2023, "Specified Technologies Inc.'s Invalidity Contentions" in Case 1:22-cv-01248-CJB (in the U.S. District Court for the District of Delaware).
Transcript and screen shots from document STI-1248-005603, filed with Document filed Jun. 30, 2023, "Specified Technologies Inc.'s Invalidity Contentions" in Case 1:22-cv-01248-CJB (in the U.S. District Court for the District of Delaware).
Transcript and screen shots from document STI-1248-005604, filed with Document filed Jun. 30, 2023, "Specified Technologies Inc.'s Invalidity Contentions" in Case 1:22-cv-01248-CJB (in the U.S. District Court for the District of Delaware).
Transcript and screen shots from document STI-1248-005605, filed with Document filed Jun. 30, 2023, "Specified Technologies Inc.'s Invalidity Contentions" in Case 1:22-cv-01248-CJB (in the U.S. District Court for the District of Delaware).
Transcript and screen shots from document STI-1248-005606, filed with Document filed Jun. 30, 2023, "Specified Technologies Inc.'s Invalidity Contentions" in Case 1:22-cv-01248-CJB (in the U.S. District Court for the District of Delaware).
Screen shots from document STI-1248-005607, filed with Document filed Jun. 30, 2023, "Specified Technologies Inc.'s Invalidity Contentions" in Case 1:22-cv-01248-CJB (in the U.S. District Court for the District of Delaware).
Screen shots from document STI-1248-005608, filed with Document filed Jun. 30, 2023, "Specified Technologies Inc.'s Invalidity Contentions" in Case 1:22-cv-01248-CJB (in the U.S. District Court for the District of Delaware).
Document STI-1248-5748, filed with Document filed Jun. 30, 2023, "Specified Technologies Inc.'s Invalidity Contentions" in Case 1:22-cv-01248-CJB (in the U.S. District Court for the District of Delaware).
Document STI-1248-5749, filed with Document filed Jun. 30, 2023, "Specified Technologies Inc.'s Invalidity Contentions" in Case 1:22-cv-01248-CJB (in the U.S. District Court for the District of Delaware).
Document STI-1248-5750, filed with Document filed Jun. 30, 2023, "Specified Technologies Inc.'s Invalidity Contentions" in Case 1:22-cv-01248-CJB (in the U.S. District Court for the District of Delaware).
Document STI-1248-5751, filed with Document filed Jun. 30, 2023, "Specified Technologies Inc.'s Invalidity Contentions" in Case 1:22-cv-01248-CJB (in the U.S. District Court for the District of Delaware).
Document STI-1248-5752, filed with Document filed Jun. 30, 2023, "Specified Technologies Inc.'s Invalidity Contentions" in Case 1:22-cv-01248-CJB (in the U.S. District Court for the District of Delaware).
Document STI-1248-5753, filed with Document filed Jun. 30, 2023, "Specified Technologies Inc.'s Invalidity Contentions" in Case 1:22-cv-01248-CJB (in the U.S. District Court for the District of Delaware).
Document STI-1248-5754, filed with Document filed Jun. 30, 2023, "Specified Technologies Inc.'s Invalidity Contentions" in Case 1:22-cv-01248-CJB (in the U.S. District Court for the District of Delaware).
Document STI-1248-5756, filed with Document filed Jun. 30, 2023, "Specified Technologies Inc.'s Invalidity Contentions" in Case 1:22-cv-01248-CJB (in the U.S. District Court for the District of Delaware).
Document STI-1248-5757, filed with Document filed Jun. 30, 2023, "Specified Technologies Inc.'s Invalidity Contentions" in Case 1:22-cv-01248-CJB (in the U.S. District Court for the District of Delaware).
Document STI-1248-5758, filed with Document filed Jun. 30, 2023, "Specified Technologies Inc.'s Invalidity Contentions" in Case 1:22-cv-01248-CJB (in the U.S. District Court for the District of Delaware).
Document STI-1248-000040, filed with Document filed Jun. 30, 2023, "Specified Technologies Inc.'s Invalidity Contentions" in Case 1:22-cv-01248-CJB (in the U.S. District Court for the District of Delaware).

(56) References Cited

OTHER PUBLICATIONS

Document STI-1248-000041, filed with Document filed Jun. 30, 2023, "Specified Technologies Inc.'s Invalidity Contentions" in Case 1:22-cv-01248-CJB (in the U.S. District Court for the District of Delaware).
Document STI-1248-000054, filed with Document filed Jun. 30, 2023, "Specified Technologies Inc.'s Invalidity Contentions" in Case 1:22-cv-01248-CJB (in the U.S. District Court for the District of Delaware).
Document STI-1248-000055, filed with Document filed Jun. 30, 2023, "Specified Technologies Inc.'s Invalidity Contentions" in Case 1:22-cv-01248-CJB (in the U.S. District Court for the District of Delaware).
Document STI-1248-000056, filed with Document filed Jun. 30, 2023, "Specified Technologies Inc.'s Invalidity Contentions" in Case 1:22-cv-01248-CJB (in the U.S. District Court for the District of Delaware).
Document STI-1248-000071, filed with Document filed Jun. 30, 2023, "Specified Technologies Inc.'s Invalidity Contentions" in Case 1:22-cv-01248-CJB (in the U.S. District Court for the District of Delaware).
Document STI-1248-000720, filed with Document filed Jun. 30, 2023, "Specified Technologies Inc.'s Invalidity Contentions" in Case 1:22-cv-01248-CJB (in the U.S. District Court for the District of Delaware).
Document STI-1248-000760, filed with Document filed Jun. 30, 2023, "Specified Technologies Inc.'s Invalidity Contentions" in Case 1:22-cv-01248-CJB (in the U.S. District Court for the District of Delaware).
Document STI-1248-000786, filed with Document filed Jun. 30, 2023, "Specified Technologies Inc.'s Invalidity Contentions" in Case 1:22-cv-01248-CJB (in the U.S. District Court for the District of Delaware).
Document STI-1248-000810, filed with Document filed Jun. 30, 2023, "Specified Technologies Inc.'s Invalidity Contentions" in Case 1:22-cv-01248-CJB (in the U.S. District Court for the District of Delaware).
Document STI-1248-000826, filed with Document filed Jun. 30, 2023, "Specified Technologies Inc.'s Invalidity Contentions" in Case 1:22-cv-01248-CJB (in the U.S. District Court for the District of Delaware).
Document STI-1248-000864, filed with Document filed Jun. 30, 2023, "Specified Technologies Inc.'s Invalidity Contentions" in Case 1:22-cv-01248-CJB (in the U.S. District Court for the District of Delaware).
Document STI-1248-000889, filed with Document filed Jun. 30, 2023, "Specified Technologies Inc.'s Invalidity Contentions" in Case 1:22-cv-01248-CJB (in the U.S. District Court for the District of Delaware).
Document STI-1248-000913, filed with Document filed Jun. 30, 2023, "Specified Technologies Inc.'s Invalidity Contentions" in Case 1:22-cv-01248-CJB (in the U.S. District Court for the District of Delaware).
Document STI-1248-000960, filed with Document filed Jun. 30, 2023, "Specified Technologies Inc.'s Invalidity Contentions" in Case 1:22-cv-01248-CJB (in the U.S. District Court for the District of Delaware).
Document STI-1248-000974, filed with Document filed Jun. 30, 2023, "Specified Technologies Inc.'s Invalidity Contentions" in Case 1:22-cv-01248-CJB (in the U.S. District Court for the District of Delaware).
Document STI-1248-000975, filed with Document filed Jun. 30, 2023, "Specified Technologies Inc.'s Invalidity Contentions" in Case 1:22-cv-01248-CJB (in the U.S. District Court for the District of Delaware).
Document STI-1248-000988, filed with Document filed Jun. 30, 2023, "Specified Technologies Inc.'s Invalidity Contentions" in Case 1:22-cv-01248-CJB (in the U.S. District Court for the District of Delaware).
Document STI-1248-000989, filed with Document filed Jun. 30, 2023, "Specified Technologies Inc.'s Invalidity Contentions" in Case 1:22-cv-01248-CJB (in the U.S. District Court for the District of Delaware).
Document STI-1248-000990, filed with Document filed Jun. 30, 2023, "Specified Technologies Inc.'s Invalidity Contentions" in Case 1:22-cv-01248-CJB (in the U.S. District Court for the District of Delaware).
Document STI-1248-000991, filed with Document filed Jun. 30, 2023, "Specified Technologies Inc.'s Invalidity Contentions" in Case 1:22-cv-01248-CJB (in the U.S. District Court for the District of Delaware).
Document STI-1248-000992, filed with Document filed Jun. 30, 2023, "Specified Technologies Inc.'s Invalidity Contentions" in Case 1:22-cv-01248-CJB (in the U.S. District Court for the District of Delaware).
Document STI-1248-000993, filed with Document filed Jun. 30, 2023, "Specified Technologies Inc.'s Invalidity Contentions" in Case 1:22-cv-01248-CJB (in the U.S. District Court for the District of Delaware).
Document STI-1248-000994, filed with Document filed Jun. 30, 2023, "Specified Technologies Inc.'s Invalidity Contentions" in Case 1:22-cv-01248-CJB (in the U.S. District Court for the District of Delaware).
Document STI-1248-000996, filed with Document filed Jun. 30, 2023, "Specified Technologies Inc.'s Invalidity Contentions" in Case 1:22-cv-01248-CJB (in the U.S. District Court for the District of Delaware).
Document STI-1248-001038, filed with Document filed Jun. 30, 2023, "Specified Technologies Inc.'s Invalidity Contentions" in Case 1:22-cv-01248-CJB (in the U.S. District Court for the District of Delaware).
Document STI-1248-001039, filed with Document filed Jun. 30, 2023, "Specified Technologies Inc.'s Invalidity Contentions" in Case 1:22-cv-01248-CJB (in the U.S. District Court for the District of Delaware).
Document STI-1248-001091, filed with Document filed Jun. 30, 2023, "Specified Technologies Inc.'s Invalidity Contentions" in Case 1:22-cv-01248-CJB (in the U.S. District Court for the District of Delaware).
Document STI-1248-001701, filed with Document filed Jun. 30, 2023, "Specified Technologies Inc.'s Invalidity Contentions" in Case 1:22-cv-01248-CJB (in the U.S. District Court for the District of Delaware).
Document STI-1248-001702, filed with Document filed Jun. 30, 2023, "Specified Technologies Inc.'s Invalidity Contentions" in Case 1:22-cv-01248-CJB (in the U.S. District Court for the District of Delaware).
Document STI-1248-001703, filed with Document filed Jun. 30, 2023, "Specified Technologies Inc.'s Invalidity Contentions" in Case 1:22-cv-01248-CJB (in the U.S. District Court for the District of Delaware).
Document STI-1248-001704, filed with Document filed Jun. 30, 2023, "Specified Technologies Inc.'s Invalidity Contentions" in Case 1:22-cv-01248-CJB (in the U.S. District Court for the District of Delaware).
Document STI-1248-001705, filed with Document filed Jun. 30, 2023, "Specified Technologies Inc.'s Invalidity Contentions" in Case 1:22-cv-01248-CJB (in the U.S. District Court for the District of Delaware).
Document STI-1248-001805, filed with Document filed Jun. 30, 2023, "Specified Technologies Inc.'s Invalidity Contentions" in Case 1:22-cv-01248-CJB (in the U.S. District Court for the District of Delaware).
Document STI-1248-001806, filed with Document filed Jun. 30, 2023, "Specified Technologies Inc.'s Invalidity Contentions" in Case 1:22-cv-01248-CJB (in the U.S. District Court for the District of Delaware).
Document STI-1248-003725, filed with Document filed Jun. 30, 2023, "Specified Technologies Inc.'s Invalidity Contentions" in Case 1:22-cv-01248-CJB (in the U.S. District Court for the District of Delaware).

(56) References Cited

OTHER PUBLICATIONS

Document STI-1248-003736, filed with Document filed Jun. 30, 2023, "Specified Technologies Inc.'s Invalidity Contentions" in Case 1:22-cv-01248-CJB (in the U.S. District Court for the District of Delaware).
Document STI-1248-003737, filed with Document filed Jun. 30, 2023, "Specified Technologies Inc.'s Invalidity Contentions" in Case 1:22-cv-01248-CJB (in the U.S. District Court for the District of Delaware).
Document STI-1248-003738, filed with Document filed Jun. 30, 2023, "Specified Technologies Inc.'s Invalidity Contentions" in Case 1:22-cv-01248-CJB (in the U.S. District Court for the District of Delaware).
Document STI-1248-003739, filed with Document filed Jun. 30, 2023, "Specified Technologies Inc.'s Invalidity Contentions" in Case 1:22-cv-01248-CJB (in the U.S. District Court for the District of Delaware).
Document STI-1248-003766, filed with Document filed Jun. 30, 2023, "Specified Technologies Inc.'s Invalidity Contentions" in Case 1:22-cv-01248-CJB (in the U.S. District Court for the District of Delaware).
Document STI-1248-003767, filed with Document filed Jun. 30, 2023, "Specified Technologies Inc.'s Invalidity Contentions" in Case 1:22-cv-01248-CJB (in the U.S. District Court for the District of Delaware).
Document STI-1248-003768, filed with Document filed Jun. 30, 2023, "Specified Technologies Inc.'s Invalidity Contentions" in Case 1:22-cv-01248-CJB (in the U.S. District Court for the District of Delaware).
Document STI-1248-003769, filed with Document filed Jun. 30, 2023, "Specified Technologies Inc.'s Invalidity Contentions" in Case 1:22-cv-01248-CJB (in the U.S. District Court for the District of Delaware).
Document STI-1248-003770, filed with Document filed Jun. 30, 2023, "Specified Technologies Inc.'s Invalidity Contentions" in Case 1:22-cv-01248-CJB (in the U.S. District Court for the District of Delaware).
Document STI-1248-003771, filed with Document filed Jun. 30, 2023, "Specified Technologies Inc.'s Invalidity Contentions" in Case 1:22-cv-01248-CJB (in the U.S. District Court for the District of Delaware).
Document STI-1248-003772, filed with Document filed Jun. 30, 2023, "Specified Technologies Inc.'s Invalidity Contentions" in Case 1:22-cv-01248-CJB (in the U.S. District Court for the District of Delaware).
Document STI-1248-003773, filed with Document filed Jun. 30, 2023, "Specified Technologies Inc.'s Invalidity Contentions" in Case 1:22-cv-01248-CJB (in the U.S. District Court for the District of Delaware).
Document STI-1248-003774, filed with Document filed Jun. 30, 2023, "Specified Technologies Inc.'s Invalidity Contentions" in Case 1:22-cv-01248-CJB (in the U.S. District Court for the District of Delaware).
Document STI-1248-003775, filed with Document filed Jun. 30, 2023, "Specified Technologies Inc.'s Invalidity Contentions" in Case 1:22-cv-01248-CJB (in the U.S. District Court for the District of Delaware).
Document STI-1248-003776, filed with Document filed Jun. 30, 2023, "Specified Technologies Inc.'s Invalidity Contentions" in Case 1:22-cv-01248-CJB (in the U.S. District Court for the District of Delaware).
Document STI-1248-003777, filed with Document filed Jun. 30, 2023, "Specified Technologies Inc.'s Invalidity Contentions" in Case 1:22-cv-01248-CJB (in the U.S. District Court for the District of Delaware).
Document STI-1248-003778, filed with Document filed Jun. 30, 2023, "Specified Technologies Inc.'s Invalidity Contentions" in Case 1:22-cv-01248-CJB (in the U.S. District Court for the District of Delaware).
Document STI-1248-003779, filed with Document filed Jun. 30, 2023, "Specified Technologies Inc.'s Invalidity Contentions" in Case 1:22-cv-01248-CJB (in the U.S. District Court for the District of Delaware).
Document STI-1248-003780, filed with Document filed Jun. 30, 2023, "Specified Technologies Inc.'s Invalidity Contentions" in Case 1:22-cv-01248-CJB (in the U.S. District Court for the District of Delaware).
Document STI-1248-003781, filed with Document filed Jun. 30, 2023, "Specified Technologies Inc.'s Invalidity Contentions" in Case 1:22-cv-01248-CJB (in the U.S. District Court for the District of Delaware).
Document STI-1248-003782, filed with Document filed Jun. 30, 2023, "Specified Technologies Inc.'s Invalidity Contentions" in Case 1:22-cv-01248-CJB (in the U.S. District Court for the District of Delaware).
Document STI-1248-003783, filed with Document filed Jun. 30, 2023, "Specified Technologies Inc.'s Invalidity Contentions" in Case 1:22-cv-01248-CJB (in the U.S. District Court for the District of Delaware).
Document STI-1248-003787, filed with Document filed Jun. 30, 2023, "Specified Technologies Inc.'s Invalidity Contentions" in Case 1:22-cv-01248-CJB (in the U.S. District Court for the District of Delaware).
Document STI-1248-003791, filed with Document filed Jun. 30, 2023, "Specified Technologies Inc.'s Invalidity Contentions" in Case 1:22-cv-01248-CJB (in the U.S. District Court for the District of Delaware).
Document STI-1248-003792, filed with Document filed Jun. 30, 2023, "Specified Technologies Inc.'s Invalidity Contentions" in Case 1:22-cv-01248-CJB (in the U.S. District Court for the District of Delaware).
Document STI-1248-003806, filed with Document filed Jun. 30, 2023, "Specified Technologies Inc.'s Invalidity Contentions" in Case 1:22-cv-01248-CJB (in the U.S. District Court for the District of Delaware).
Document STI-1248-003808, filed with Document filed Jun. 30, 2023, "Specified Technologies Inc.'s Invalidity Contentions" in Case 1:22-cv-01248-CJB (in the U.S. District Court for the District of Delaware).
Document STI-1248-003812, filed with Document filed Jun. 30, 2023, "Specified Technologies Inc.'s Invalidity Contentions" in Case 1:22-cv-01248-CJB (in the U.S. District Court for the District of Delaware).
Document STI-1248-003816, filed with Document filed Jun. 30, 2023, "Specified Technologies Inc.'s Invalidity Contentions" in Case 1:22-cv-01248-CJB (in the U.S. District Court for the District of Delaware).
Document STI-1248-003820, filed with Document filed Jun. 30, 2023, "Specified Technologies Inc.'s Invalidity Contentions" in Case 1:22-cv-01248-CJB (in the U.S. District Court for the District of Delaware).
Document STI-1248-003824, filed with Document filed Jun. 30, 2023, "Specified Technologies Inc.'s Invalidity Contentions" in Case 1:22-cv-01248-CJB (in the U.S. District Court for the District of Delaware).
Document STI-1248-003827, filed with Document filed Jun. 30, 2023, "Specified Technologies Inc.'s Invalidity Contentions" in Case 1:22-cv-01248-CJB (in the U.S. District Court for the District of Delaware).
Document STI-1248-003828, filed with Document filed Jun. 30, 2023, "Specified Technologies Inc.'s Invalidity Contentions" in Case 1:22-cv-01248-CJB (in the U.S. District Court for the District of Delaware).
Document STI-1248-003829, filed with Document filed Jun. 30, 2023, "Specified Technologies Inc.'s Invalidity Contentions" in Case 1:22-cv-01248-CJB (in the U.S. District Court for the District of Delaware).
Document STI-1248-003830, filed with Document filed Jun. 30, 2023, "Specified Technologies Inc.'s Invalidity Contentions" in Case 1:22-cv-01248-CJB (in the U.S. District Court for the District of Delaware).

(56) References Cited

OTHER PUBLICATIONS

Document STI-1248-003837, filed with Document filed Jun. 30, 2023, "Specified Technologies Inc.'s Invalidity Contentions" in Case 1:22-cv-01248-CJB (in the U.S. District Court for the District of Delaware).
Document STI-1248-003838, filed with Document filed Jun. 30, 2023, "Specified Technologies Inc.'s Invalidity Contentions" in Case 1:22-cv-01248-CJB (in the U.S. District Court for the District of Delaware).
Document STI-1248-003839, filed with Document filed Jun. 30, 2023, "Specified Technologies Inc.'s Invalidity Contentions" in Case 1:22-cv-01248-CJB (in the U.S. District Court for the District of Delaware).
Document STI-1248-003840, filed with Document filed Jun. 30, 2023, "Specified Technologies Inc.'s Invalidity Contentions" in Case 1:22-cv-01248-CJB (in the U.S. District Court for the District of Delaware).
Document STI-1248-003841, filed with Document filed Jun. 30, 2023, "Specified Technologies Inc.'s Invalidity Contentions" in Case 1:22-cv-01248-CJB (in the U.S. District Court for the District of Delaware).
Document STI-1248-003842, filed with Document filed Jun. 30, 2023, "Specified Technologies Inc.'s Invalidity Contentions" in Case 1:22-cv-01248-CJB (in the U.S. District Court for the District of Delaware).
Document STI-1248-003843, filed with Document filed Jun. 30, 2023, "Specified Technologies Inc.'s Invalidity Contentions" in Case 1:22-cv-01248-CJB (in the U.S. District Court for the District of Delaware).
Document STI-1248-003844, filed with Document filed Jun. 30, 2023, "Specified Technologies Inc.'s Invalidity Contentions" in Case 1:22-cv-01248-CJB (in the U.S. District Court for the District of Delaware).
Document STI-1248-003845, filed with Document filed Jun. 30, 2023, "Specified Technologies Inc.'s Invalidity Contentions" in Case 1:22-cv-01248-CJB (in the U.S. District Court for the District of Delaware).
Document STI-1248-003847, filed with Document filed Jun. 30, 2023, "Specified Technologies Inc.'s Invalidity Contentions" in Case 1:22-cv-01248-CJB (in the U.S. District Court for the District of Delaware).
Document STI-1248-003848, filed with Document filed Jun. 30, 2023, "Specified Technologies Inc.'s Invalidity Contentions" in Case 1:22-cv-01248-CJB (in the U.S. District Court for the District of Delaware).
Document STI-1248-003849, filed with Document filed Jun. 30, 2023, "Specified Technologies Inc.'s Invalidity Contentions" in Case 1:22-cv-01248-CJB (in the U.S. District Court for the District of Delaware).
Document STI-1248-003850, filed with Document filed Jun. 30, 2023, "Specified Technologies Inc.'s Invalidity Contentions" in Case 1:22-cv-01248-CJB (in the U.S. District Court for the District of Delaware).
Document STI-1248-003851, filed with Document filed Jun. 30, 2023, "Specified Technologies Inc.'s Invalidity Contentions" in Case 1:22-cv-01248-CJB (in the U.S. District Court for the District of Delaware).
Document STI-1248-003855, filed with Document filed Jun. 30, 2023, "Specified Technologies Inc.'s Invalidity Contentions" in Case 1:22-cv-01248-CJB (in the U.S. District Court for the District of Delaware).
Document STI-1248-003856, filed with Document filed Jun. 30, 2023, "Specified Technologies Inc.'s Invalidity Contentions" in Case 1:22-cv-01248-CJB (in the U.S. District Court for the District of Delaware).
Document STI-1248-003857, filed with Document filed Jun. 30, 2023, "Specified Technologies Inc.'s Invalidity Contentions" in Case 1:22-cv-01248-CJB (in the U.S. District Court for the District of Delaware).
Document STI-1248-003859, filed with Document filed Jun. 30, 2023, "Specified Technologies Inc.'s Invalidity Contentions" in Case 1:22-cv-01248-CJB (in the U.S. District Court for the District of Delaware).
Document STI-1248-003892, filed with Document filed Jun. 30, 2023, "Specified Technologies Inc.'s Invalidity Contentions" in Case 1:22-cv-01248-CJB (in the U.S. District Court for the District of Delaware).
Document STI-1248-003903, filed with Document filed Jun. 30, 2023, "Specified Technologies Inc.'s Invalidity Contentions" in Case 1:22-cv-01248-CJB (in the U.S. District Court for the District of Delaware).
Document STI-1248-004139, filed with Document filed Jun. 30, 2023, "Specified Technologies Inc.'s Invalidity Contentions" in Case 1:22-cv-01248-CJB (in the U.S. District Court for the District of Delaware).
Document STI-1248-004140, filed with Document filed Jun. 30, 2023, "Specified Technologies Inc.'s Invalidity Contentions" in Case 1:22-cv-01248-CJB (in the U.S. District Court for the District of Delaware).
Document STI-1248-004141, filed with Document filed Jun. 30, 2023, "Specified Technologies Inc.'s Invalidity Contentions" in Case 1:22-cv-01248-CJB (in the U.S. District Court for the District of Delaware).
Document STI-1248-004146, filed with Document filed Jun. 30, 2023, "Specified Technologies Inc.'s Invalidity Contentions" in Case 1:22-cv-01248-CJB (in the U.S. District Court for the District of Delaware).
Document STI-1248-005457, filed with Document filed Jun. 30, 2023, "Specified Technologies Inc.'s Invalidity Contentions" in Case 1:22-cv-01248-CJB (in the U.S. District Court for the District of Delaware).
Document STI-1248-005458, filed with Document filed Jun. 30, 2023, "Specified Technologies Inc.'s Invalidity Contentions" in Case 1:22-cv-01248-CJB (in the U.S. District Court for the District of Delaware).
Document STI-1248-005459, filed with Document filed Jun. 30, 2023, "Specified Technologies Inc.'s Invalidity Contentions" in Case 1:22-cv-01248-CJB (in the U.S. District Court for the District of Delaware).
Document STI-1248-005460, filed with Document filed Jun. 30, 2023, "Specified Technologies Inc.'s Invalidity Contentions" in Case 1:22-cv-01248-CJB (in the U.S. District Court for the District of Delaware).
Document STI-1248-005461, filed with Document filed Jun. 30, 2023, "Specified Technologies Inc.'s Invalidity Contentions" in Case 1:22-cv-01248-CJB (in the U.S. District Court for the District of Delaware).
Document STI-1248-005462, filed with Document filed Jun. 30, 2023, "Specified Technologies Inc.'s Invalidity Contentions" in Case 1:22-cv-01248-CJB (in the U.S. District Court for the District of Delaware).
Document STI-1248-005463, filed with Document filed Jun. 30, 2023, "Specified Technologies Inc.'s Invalidity Contentions" in Case 1:22-cv-01248-CJB (in the U.S. District Court for the District of Delaware).
Document STI-1248-005485, filed with Document filed Jun. 30, 2023, "Specified Technologies Inc.'s Invalidity Contentions" in Case 1:22-cv-01248-CJB (in the U.S. District Court for the District of Delaware).
Document STI-1248-005487, filed with Document filed Jun. 30, 2023, "Specified Technologies Inc.'s Invalidity Contentions" in Case 1:22-cv-01248-CJB (in the U.S. District Court for the District of Delaware).
Document STI-1248-005488, filed with Document filed Jun. 30, 2023, "Specified Technologies Inc.'s Invalidity Contentions" in Case 1:22-cv-01248-CJB (in the U.S. District Court for the District of Delaware).
Document STI-1248-005489, filed with Document filed Jun. 30, 2023, "Specified Technologies Inc.'s Invalidity Contentions" in Case 1:22-cv-01248-CJB (in the U.S. District Court for the District of Delaware).

(56) References Cited

OTHER PUBLICATIONS

Document STI-1248-005491, filed with Document filed Jun. 30, 2023, "Specified Technologies Inc.'s Invalidity Contentions" in Case 1:22-cv-01248-CJB (in the U.S. District Court for the District of Delaware).
Document STI-1248-005492, filed with Document filed Jun. 30, 2023, "Specified Technologies Inc.'s Invalidity Contentions" in Case 1:22-cv-01248-CJB (in the U.S. District Court for the District of Delaware).
Document STI-1248-005493, filed with Document filed Jun. 30, 2023, "Specified Technologies Inc.'s Invalidity Contentions" in Case 1:22-cv-01248-CJB (in the U.S. District Court for the District of Delaware).
Document STI-1248-005494, filed with Document filed Jun. 30, 2023, "Specified Technologies Inc.'s Invalidity Contentions" in Case 1:22-cv-01248-CJB (in the U.S. District Court for the District of Delaware).
Document STI-1248-005523, filed with Document filed Jun. 30, 2023, "Specified Technologies Inc.'s Invalidity Contentions" in Case 1:22-cv-01248-CJB (in the U.S. District Court for the District of Delaware).
Document STI-1248-005524, filed with Document filed Jun. 30, 2023, "Specified Technologies Inc.'s Invalidity Contentions" in Case 1:22-cv-01248-CJB (in the U.S. District Court for the District of Delaware).
Document STI-1248-005525, filed with Document filed Jun. 30, 2023, "Specified Technologies Inc.'s Invalidity Contentions" in Case 1:22-cv-01248-CJB (in the U.S. District Court for the District of Delaware).
Document STI-1248-005526, filed with Document filed Jun. 30, 2023, "Specified Technologies Inc.'s Invalidity Contentions" in Case 1:22-cv-01248-CJB (in the U.S. District Court for the District of Delaware).
Document STI-1248-005527, filed with Document filed Jun. 30, 2023, "Specified Technologies Inc.'s Invalidity Contentions" in Case 1:22-cv-01248-CJB (in the U.S. District Court for the District of Delaware).
Document STI-1248-005528, filed with Document filed Jun. 30, 2023, "Specified Technologies Inc.'s Invalidity Contentions" in Case 1:22-cv-01248-CJB (in the U.S. District Court for the District of Delaware).
Document STI-1248-000050, filed with Document filed Jun. 30, 2023, "Specified Technologies Inc.'s Invalidity Contentions" in Case 1:22-cv-01248-CJB (in the U.S. District Court for the District of Delaware).
Document STI-1248-000072, filed with Document filed Jun. 30, 2023, "Specified Technologies Inc.'s Invalidity Contentions" in Case 1:22-cv-01248-CJB (in the U.S. District Court for the District of Delaware).
Document STI-1248-000853, filed with Document filed Jun. 30, 2023, "Specified Technologies Inc.'s Invalidity Contentions" in Case 1:22-cv-01248-CJB (in the U.S. District Court for the District of Delaware).
Document STI-1248-000854, filed with Document filed Jun. 30, 2023, "Specified Technologies Inc.'s Invalidity Contentions" in Case 1:22-cv-01248-CJB (in the U.S. District Court for the District of Delaware).
Document STI-1248-000855, filed with Document filed Jun. 30, 2023, "Specified Technologies Inc.'s Invalidity Contentions" in Case 1:22-cv-01248-CJB (in the U.S. District Court for the District of Delaware).
Document STI-1248-000863, filed with Document filed Jun. 30, 2023, "Specified Technologies Inc.'s Invalidity Contentions" in Case 1:22-cv-01248-CJB (in the U.S. District Court for the District of Delaware).
Document STI-1248-000937, filed with Document filed Jun. 30, 2023, "Specified Technologies Inc.'s Invalidity Contentions" in Case 1:22-cv-01248-CJB (in the U.S. District Court for the District of Delaware).
Document STI-1248-000973, filed with Document filed Jun. 30, 2023, "Specified Technologies Inc.'s Invalidity Contentions" in Case 1:22-cv-01248-CJB (in the U.S. District Court for the District of Delaware).
Document STI-1248-000976, filed with Document filed Jun. 30, 2023, "Specified Technologies Inc.'s Invalidity Contentions" in Case 1:22-cv-01248-CJB (in the U.S. District Court for the District of Delaware).
Document STI-1248-001000, filed with Document filed Jun. 30, 2023, "Specified Technologies Inc.'s Invalidity Contentions" in Case 1:22-cv-01248-CJB (in the U.S. District Court for the District of Delaware).
Document STI-1248-001001, filed with Document filed Jun. 30, 2023, "Specified Technologies Inc.'s Invalidity Contentions" in Case 1:22-cv-01248-CJB (in the U.S. District Court for the District of Delaware).
Document STI-1248-001070, filed with Document filed Jun. 30, 2023, "Specified Technologies Inc.'s Invalidity Contentions" in Case 1:22-cv-01248-CJB (in the U.S. District Court for the District of Delaware).
Document STI-1248-001084, filed with Document filed Jun. 30, 2023, "Specified Technologies Inc.'s Invalidity Contentions" in Case 1:22-cv-01248-CJB (in the U.S. District Court for the District of Delaware).
Document STI-1248-001086, filed with Document filed Jun. 30, 2023, "Specified Technologies Inc.'s Invalidity Contentions" in Case 1:22-cv-01248-CJB (in the U.S. District Court for the District of Delaware).
Document STI-1248-001107, filed with Document filed Jun. 30, 2023, "Specified Technologies Inc.'s Invalidity Contentions" in Case 1:22-cv-01248-CJB (in the U.S. District Court for the District of Delaware).
Document STI-1248-001670, filed with Document filed Jun. 30, 2023, "Specified Technologies Inc.'s Invalidity Contentions" in Case 1:22-cv-01248-CJB (in the U.S. District Court for the District of Delaware).
Document STI-1248-001671, filed with Document filed Jun. 30, 2023, "Specified Technologies Inc.'s Invalidity Contentions" in Case 1:22-cv-01248-CJB (in the U.S. District Court for the District of Delaware).
Document STI-1248-001672, filed with Document filed Jun. 30, 2023, "Specified Technologies Inc.'s Invalidity Contentions" in Case 1:22-cv-01248-CJB (in the U.S. District Court for the District of Delaware).
Document STI-1248-001673, filed with Document filed Jun. 30, 2023, "Specified Technologies Inc.'s Invalidity Contentions" in Case 1:22-cv-01248-CJB (in the U.S. District Court for the District of Delaware).
Document STI-1248-001674, filed with Document filed Jun. 30, 2023, "Specified Technologies Inc.'s Invalidity Contentions" in Case 1:22-cv-01248-CJB (in the U.S. District Court for the District of Delaware).
Document STI-1248-001675, filed with Document filed Jun. 30, 2023, "Specified Technologies Inc.'s Invalidity Contentions" In Case 1:22-cv-01248-CJB (in the U.S. District Court for the District of Delaware).
Document STI-1248-001676, filed with Document filed Jun. 30, 2023, "Specified Technologies Inc.'s Invalidity Contentions" in Case 1:22-cv-01248-CJB (in the U.S. District Court for the District of Delaware).
Document STI-1248-001677, filed with Document filed Jun. 30, 2023, "Specified Technologies Inc.'s Invalidity Contentions" in Case 1:22-cv-01248-CJB (in the U.S. District Court for the District of Delaware).
Document STI-1248-001678, filed with Document filed Jun. 30, 2023, "Specified Technologies Inc.'s Invalidity Contentions" in Case 1:22-cv-01248-CJB (in the U.S. District Court for the District of Delaware).
Document STI-1248-001679, filed with Document filed Jun. 30, 2023, "Specified Technologies Inc.'s Invalidity Contentions" in Case 1:22-cv-01248-CJB (in the U.S. District Court for the District of Delaware).

(56) References Cited

OTHER PUBLICATIONS

Document STI-1248-001680, filed with Document filed Jun. 30, 2023, "Specified Technologies Inc.'s Invalidity Contentions" in Case 1:22-cv-01248-CJB (in the U.S. District Court for the District of Delaware).
Document STI-1248-001681, filed with Document filed Jun. 30, 2023, "Specified Technologies Inc.'s Invalidity Contentions" in Case 1:22-cv-01248-CJB (in the U.S. District Court for the District of Delaware).
Document STI-1248-001682, filed with Document filed Jun. 30, 2023, "Specified Technologies Inc.'s Invalidity Contentions" in Case 1:22-cv-01248-CJB (in the U.S. District Court for the District of Delaware).
Document STI-1248-001683, filed with Document filed Jun. 30, 2023, "Specified Technologies Inc.'s Invalidity Contentions" in Case 1:22-cv-01248-CJB (in the U.S. District Court for the District of Delaware).
Document STI-1248-001684, filed with Document filed Jun. 30, 2023, "Specified Technologies Inc.'s Invalidity Contentions" in Case 1:22-cv-01248-CJB (in the U.S. District Court for the District of Delaware).
Document STI-1248-001685, filed with Document filed Jun. 30, 2023, "Specified Technologies Inc.'s Invalidity Contentions" in Case 1:22-cv-01248-CJB (in the U.S. District Court for the District of Delaware).
Document STI-1248-001686, filed with Document filed Jun. 30, 2023, "Specified Technologies Inc.'s Invalidity Contentions" in Case 1:22-cv-01248-CJB (in the U.S. District Court for the District of Delaware).
Document STI-1248-001687, filed with Document filed Jun. 30, 2023, "Specified Technologies Inc.'s Invalidity Contentions" in Case 1:22-cv-01248-CJB (in the U.S. District Court for the District of Delaware).
Document STI-1248-001688, filed with Document filed Jun. 30, 2023, "Specified Technologies Inc.'s Invalidity Contentions" in Case 1:22-cv-01248-CJB (in the U.S. District Court for the District of Delaware).
Document STI-1248-001689, filed with Document filed Jun. 30, 2023, "Specified Technologies Inc.'s Invalidity Contentions" in Case 1:22-cv-01248-CJB (in the U.S. District Court for the District of Delaware).
Document STI-1248-001690, filed with Document filed Jun. 30, 2023, "Specified Technologies Inc.'s Invalidity Contentions" in Case 1:22-cv-01248-CJB (in the U.S. District Court for the District of Delaware).
Document STI-1248-001691, filed with Document filed Jun. 30, 2023, "Specified Technologies Inc.'s Invalidity Contentions" in Case 1:22-cv-01248-CJB (in the U.S. District Court for the District of Delaware).
Document STI-1248-001692, filed with Document filed Jun. 30, 2023, "Specified Technologies Inc.'s Invalidity Contentions" in Case 1:22-cv-01248-CJB (in the U.S. District Court for the District of Delaware).
Document STI-1248-001693, filed with Document filed Jun. 30, 2023, "Specified Technologies Inc.'s Invalidity Contentions" in Case 1:22-cv-01248-CJB (in the U.S. District Court for the District of Delaware).
Document STI-1248-001694, filed with Document filed Jun. 30, 2023, "Specified Technologies Inc.'s Invalidity Contentions" in Case 1:22-cv-01248-CJB (in the U.S. District Court for the District of Delaware).
Document STI-1248-001695, filed with Document filed Jun. 30, 2023, "Specified Technologies Inc.'s Invalidity Contentions" in Case 1:22-cv-01248-CJB (in the U.S. District Court for the District of Delaware).
Document STI-1248-001696, filed with Document filed Jun. 30, 2023, "Specified Technologies Inc.'s Invalidity Contentions" in Case 1:22-cv-01248-CJB (in the U.S. District Court for the District of Delaware).
Document STI-1248-001697, filed with Document filed Jun. 30, 2023, "Specified Technologies Inc.'s Invalidity Contentions" in Case 1:22-cv-01248-CJB (in the U.S. District Court for the District of Delaware).
Document STI-1248-001698, filed with Document filed Jun. 30, 2023, "Specified Technologies Inc.'s Invalidity Contentions" in Case 1:22-cv-01248-CJB (in the U.S. District Court for the District of Delaware).
Document STI-1248-001699, filed with Document filed Jun. 30, 2023, "Specified Technologies Inc.'s Invalidity Contentions" in Case 1:22-cv-01248-CJB (in the U.S. District Court for the District of Delaware).
Document STI-1248-001700, filed with Document filed Jun. 30, 2023, "Specified Technologies Inc.'s Invalidity Contentions" in Case 1:22-cv-01248-CJB (in the U.S. District Court for the District of Delaware).
Document STI-1248-001706, filed with Document filed Jun. 30, 2023, "Specified Technologies Inc.'s Invalidity Contentions" in Case 1:22-cv-01248-CJB (in the U.S. District Court for the District of Delaware).
Document STI-1248-001707, filed with Document filed Jun. 30, 2023, "Specified Technologies Inc.'s Invalidity Contentions" in Case 1:22-cv-01248-CJB (in the U.S. District Court for the District of Delaware).
Document STI-1248-001708, filed with Document filed Jun. 30, 2023, "Specified Technologies Inc.'s Invalidity Contentions" in Case 1:22-cv-01248-CJB (in the U.S. District Court for the District of Delaware).
Document STI-1248-001709, filed with Document filed Jun. 30, 2023, "Specified Technologies Inc.'s Invalidity Contentions" in Case 1:22-cv-01248-CJB (in the U.S. District Court for the District of Delaware).
Document STI-1248-001710, filed with Document filed Jun. 30, 2023, "Specified Technologies Inc.'s Invalidity Contentions" in Case 1:22-cv-01248-CJB (in the U.S. District Court for the District of Delaware).
Document STI-1248-001711, filed with Document filed Jun. 30, 2023, "Specified Technologies Inc.'s Invalidity Contentions" in Case 1:22-cv-01248-CJB (in the U.S. District Court for the District of Delaware).
Document STI-1248-001712, filed with Document filed Jun. 30, 2023, "Specified Technologies Inc.'s Invalidity Contentions" in Case 1:22-cv-01248-CJB (in the U.S. District Court for the District of Delaware).
Document STI-1248-001713, filed with Document filed Jun. 30, 2023, "Specified Technologies Inc.'s Invalidity Contentions" in Case 1:22-cv-01248-CJB (in the U.S. District Court for the District of Delaware).
Document STI-1248-001714, filed with Document filed Jun. 30, 2023, "Specified Technologies Inc.'s Invalidity Contentions" in Case 1:22-cv-01248-CJB (in the U.S. District Court for the District of Delaware).
Document STI-1248-001715, filed with Document filed Jun. 30, 2023, "Specified Technologies Inc.'s Invalidity Contentions" in Case 1:22-cv-01248-CJB (in the U.S. District Court for the District of Delaware).
Document STI-1248-001716, filed with Document filed Jun. 30, 2023, "Specified Technologies Inc.'s Invalidity Contentions" in Case 1:22-cv-01248-CJB (in the U.S. District Court for the District of Delaware).
Document STI-1248-001717, filed with Document filed Jun. 30, 2023, "Specified Technologies Inc.'s Invalidity Contentions" in Case 1:22-cv-01248-CJB (in the U.S. District Court for the District of Delaware).
Document STI-1248-001718, filed with Document filed Jun. 30, 2023, "Specified Technologies Inc.'s Invalidity Contentions" in Case 1:22-cv-01248-CJB (in the U.S. District Court for the District of Delaware).
Document STI-1248-001719, filed with Document filed Jun. 30, 2023, "Specified Technologies Inc.'s Invalidity Contentions" in Case 1:22-cv-01248-CJB (in the U.S. District Court for the District of Delaware).

(56) References Cited

OTHER PUBLICATIONS

Document STI-1248-001720, filed with Document filed Jun. 30, 2023, "Specified Technologies Inc.'s Invalidity Contentions" in Case 1:22-cv-01248-CJB (in the U.S. District Court for the District of Delaware).
Document STI-1248-001722, filed with Document filed Jun. 30, 2023, "Specified Technologies Inc.'s Invalidity Contentions" in Case 1:22-cv-01248-CJB (in the U.S. District Court for the District of Delaware).
Document STI-1248-001723, filed with Document filed Jun. 30, 2023, "Specified Technologies Inc.'s Invalidity Contentions" in Case 1:22-cv-01248-CJB (in the U.S. District Court for the District of Delaware).
Document STI-1248-001724, filed with Document filed Jun. 30, 2023, "Specified Technologies Inc.'s Invalidity Contentions" in Case 1:22-cv-01248-CJB (in the U.S. District Court for the District of Delaware).
Document STI-1248-001725, filed with Document filed Jun. 30, 2023, "Specified Technologies Inc.'s Invalidity Contentions" in Case 1:22-cv-01248-CJB (in the U.S. District Court for the District of Delaware).
Document STI-1248-001726, filed with Document filed Jun. 30, 2023, "Specified Technologies Inc.'s Invalidity Contentions" in Case 1:22-cv-01248-CJB (in the U.S. District Court for the District of Delaware).
Document STI-1248-001727, filed with Document filed Jun. 30, 2023, "Specified Technologies Inc.'s Invalidity Contentions" in Case 1:22-cv-01248-CJB (in the U.S. District Court for the District of Delaware).
Document STI-1248-001728, filed with Document filed Jun. 30, 2023, "Specified Technologies Inc.'s Invalidity Contentions" in Case 1:22-cv-01248-CJB (in the U.S. District Court for the District of Delaware).
Document STI-1248-001729, filed with Document filed Jun. 30, 2023, "Specified Technologies Inc.'s Invalidity Contentions" in Case 1:22-cv-01248-CJB (in the U.S. District Court for the District of Delaware).
Document STI-1248-001730, filed with Document filed Jun. 30, 2023, "Specified Technologies Inc.'s Invalidity Contentions" in Case 1:22-cv-01248-CJB (in the U.S. District Court for the District of Delaware).
Document STI-1248-001731, filed with Document filed Jun. 30, 2023, "Specified Technologies Inc.'s Invalidity Contentions" in Case 1:22-cv-01248-CJB (in the U.S. District Court for the District of Delaware).
Document STI-1248-001732, filed with Document filed Jun. 30, 2023, "Specified Technologies Inc.'s Invalidity Contentions" in Case 1:22-cv-01248-CJB (in the U.S. District Court for the District of Delaware).
Document STI-1248-001733, filed with Document filed Jun. 30, 2023, "Specified Technologies Inc.'s Invalidity Contentions" in Case 1:22-cv-01248-CJB (in the U.S. District Court for the District of Delaware).
Document STI-1248-001734, filed with Document filed Jun. 30, 2023, "Specified Technologies Inc.'s Invalidity Contentions" in Case 1:22-cv-01248-CJB (in the U.S. District Court for the District of Delaware).
Document STI-1248-001735, filed with Document filed Jun. 30, 2023, "Specified Technologies Inc.'s Invalidity Contentions" in Case 1:22-cv-01248-CJB (in the U.S. District Court for the District of Delaware).
Document STI-1248-001736, filed with Document filed Jun. 30, 2023, "Specified Technologies Inc.'s Invalidity Contentions" in Case 1:22-cv-01248-CJB (in the U.S. District Court for the District of Delaware).
Document STI-1248-001737, filed with Document filed Jun. 30, 2023, "Specified Technologies Inc.'s Invalidity Contentions" in Case 1:22-cv-01248-CJB (in the U.S. District Court for the District of Delaware).
Document STI-1248-001738 filed with Document filed Jun. 30, 2023, "Specified Technologies Inc.'s Invalidity Contentions" in Case 1:22-cv-01248-CJB (in the U.S. District Court for the District of Delaware).
Document STI-1248-001739 filed with Document filed Jun. 30, 2023, "Specified Technologies Inc.'s Invalidity Contentions" in Case 1:22-cv-01248-CJB (in the U.S. District Court for the District of Delaware).
Document STI-1248-001740, filed with Document filed Jun. 30, 2023, "Specified Technologies Inc.'s Invalidity Contentions" in Case 1:22-cv-01248-CJB (in the U.S. District Court for the District of Delaware).
Document STI-1248-001741, filed with Document filed Jun. 30, 2023, "Specified Technologies Inc.'s Invalidity Contentions" in Case 1:22-cv-01248-CJB (in the U.S. District Court for the District of Delaware).
Document STI-1248-001742, filed with Document filed Jun. 30, 2023, "Specified Technologies Inc.'s Invalidity Contentions" in Case 1:22-cv-01248-CJB (in the U.S. District Court for the District of Delaware).
Document STI-1248-001743, filed with Document filed Jun. 30, 2023, "Specified Technologies Inc.'s Invalidity Contentions" in Case 1:22-cv-01248-CJB (in the U.S. District Court for the District of Delaware).
Document STI-1248-001744, filed with Document filed Jun. 30, 2023, "Specified Technologies Inc.'s Invalidity Contentions" in Case 1:22-cv-01248-CJB (in the U.S. District Court for the District of Delaware).
Document STI-1248-001745, filed with Document filed Jun. 30, 2023, "Specified Technologies Inc.'s Invalidity Contentions" in Case 1:22-cv-01248-CJB (in the U.S. District Court for the District of Delaware).
Document STI-1248-001746, filed with Document filed Jun. 30, 2023, "Specified Technologies Inc.'s Invalidity Contentions" in Case 1:22-cv-01248-CJB (in the U.S. District Court for the District of Delaware).
Document STI-1248-001747, filed with Document filed Jun. 30, 2023, "Specified Technologies Inc.'s Invalidity Contentions" in Case 1:22-cv-01248-CJB (in the U.S. District Court for the District of Delaware).
Document STI-1248-001748, filed with Document filed Jun. 30, 2023, "Specified Technologies Inc.'s Invalidity Contentions" in Case 1:22-cv-01248-CJB (in the U.S. District Court for the District of Delaware).
Document STI-1248-001749, filed with Document filed Jun. 30, 2023, "Specified Technologies Inc.'s Invalidity Contentions" in Case 1:22-cv-01248-CJB (in the U.S. District Court for the District of Delaware).
Document STI-1248-001750, filed with Document filed Jun. 30, 2023, "Specified Technologies Inc.'s Invalidity Contentions" in Case 1:22-cv-01248-CJB (in the U.S. District Court for the District of Delaware).
Document STI-1248-001751, filed with Document filed Jun. 30, 2023, "Specified Technologies Inc.'s Invalidity Contentions" in Case 1:22-cv-01248-CJB (in the U.S. District Court for the District of Delaware).
Document STI-1248-001752, filed with Document filed Jun. 30, 2023, "Specified Technologies Inc.'s Invalidity Contentions" in Case 1:22-cv-01248-CJB (in the U.S. District Court for the District of Delaware).
Document STI-1248-001753, filed with Document filed Jun. 30, 2023, "Specified Technologies Inc.'s Invalidity Contentions" in Case 1:22-cv-01248-CJB (in the U.S. District Court for the District of Delaware).
Document STI-1248-001754, filed with Document filed Jun. 30, 2023, "Specified Technologies Inc.'s Invalidity Contentions" in Case 1:22-cv-01248-CJB (in the U.S. District Court for the District of Delaware).
Document STI-1248-001755, filed with Document filed Jun. 30, 2023, "Specified Technologies Inc.'s Invalidity Contentions" in Case 1:22-cv-01248-CJB (in the U.S. District Court for the District of Delaware).

(56) References Cited

OTHER PUBLICATIONS

Document STI-1248-001756, filed with Document filed Jun. 30, 2023, "Specified Technologies Inc.'s Invalidity Contentions" in Case 1:22-cv-01248-CJB (in the U.S. District Court for the District of Delaware).
Document STI-1248-001757, filed with Document filed Jun. 30, 2023, "Specified Technologies Inc.'s Invalidity Contentions" in Case 1:22-cv-01248-CJB (in the U.S. District Court for the District of Delaware).
Document STI-1248-001758, filed with Document filed Jun. 30, 2023, "Specified Technologies Inc.'s Invalidity Contentions" in Case 1:22-cv-01248-CJB (in the U.S. District Court for the District of Delaware).
Document STI-1248-001759, filed with Document filed Jun. 30, 2023, "Specified Technologies Inc.'s Invalidity Contentions" in Case 1:22-cv-01248-CJB (in the U.S. District Court for the District of Delaware).
Document STI-1248-001760, filed with Document filed Jun. 30, 2023, "Specified Technologies Inc.'s Invalidity Contentions" in Case 1:22-cv-01248-CJB (in the U.S. District Court for the District of Delaware).
Document STI-1248-001761, filed with Document filed Jun. 30, 2023, "Specified Technologies Inc.'s Invalidity Contentions" in Case 1:22-cv-01248-CJB (in the U.S. District Court for the District of Delaware).
Document STI-1248-001762, filed with Document filed Jun. 30, 2023, "Specified Technologies Inc.'s Invalidity Contentions" in Case 1:22-cv-01248-CJB (in the U.S. District Court for the District of Delaware).
Document STI-1248-001763, filed with Document filed Jun. 30, 2023, "Specified Technologies Inc.'s Invalidity Contentions" in Case 1:22-cv-01248-CJB (in the U.S. District Court for the District of Delaware).
Document STI-1248-001764, filed with Document filed Jun. 30, 2023, "Specified Technologies Inc.'s Invalidity Contentions" in Case 1:22-cv-01248-CJB (in the U.S. District Court for the District of Delaware).
Document STI-1248-001765, filed with Document filed Jun. 30, 2023, "Specified Technologies Inc.'s Invalidity Contentions" in Case 1:22-cv-01248-CJB (in the U.S. District Court for the District of Delaware).
Document STI-1248-001766, filed with Document filed Jun. 30, 2023, "Specified Technologies Inc.'s Invalidity Contentions" in Case 1:22-cv-01248-CJB (in the U.S. District Court for the District of Delaware).
Document STI-1248-001767, filed with Document filed Jun. 30, 2023, "Specified Technologies Inc.'s Invalidity Contentions" in Case 1:22-cv-01248-CJB (in the U.S. District Court for the District of Delaware).
Document STI-1248-001768, filed with Document filed Jun. 30, 2023, "Specified Technologies Inc.'s Invalidity Contentions" in Case 1:22-cv-01248-CJB (in the U.S. District Court for the District of Delaware).
Document STI-1248-001769, filed with Document filed Jun. 30, 2023, "Specified Technologies Inc.'s Invalidity Contentions" in Case 1:22-cv-01248-CJB (in the U.S. District Court for the District of Delaware).
Document STI-1248-001770, filed with Document filed Jun. 30, 2023, "Specified Technologies Inc.'s Invalidity Contentions" in Case 1:22-cv-01248-CJB (in the U.S. District Court for the District of Delaware).
Document STI-1248-001771, filed with Document filed Jun. 30, 2023, "Specified Technologies Inc.'s Invalidity Contentions" in Case 1:22-cv-01248-CJB (in the U.S. District Court for the District of Delaware).
Document STI-1248-001772, filed with Document filed Jun. 30, 2023, "Specified Technologies Inc.'s Invalidity Contentions" in Case 1:22-cv-01248-CJB (in the U.S. District Court for the District of Delaware).
Document STI-1248-001773, filed with Document filed Jun. 30, 2023, "Specified Technologies Inc.'s Invalidity Contentions" in Case 1:22-cv-01248-CJB (in the U.S. District Court for the District of Delaware).
Document STI-1248-001774, filed with Document filed Jun. 30, 2023, "Specified Technologies Inc.'s Invalidity Contentions" in Case 1:22-cv-01248-CJB (in the U.S. District Court for the District of Delaware).
Document STI-1248-001775, filed with Document filed Jun. 30, 2023, "Specified Technologies Inc.'s Invalidity Contentions" in Case 1:22-cv-01248-CJB (in the U.S. District Court for the District of Delaware).
Document STI-1248-001776, filed with Document filed Jun. 30, 2023, "Specified Technologies Inc.'s Invalidity Contentions" in Case 1:22-cv-01248-CJB (in the U.S. District Court for the District of Delaware).
Document STI-1248-001777, filed with Document filed Jun. 30, 2023, "Specified Technologies Inc.'s Invalidity Contentions" in Case 1:22-cv-01248-CJB (in the U.S. District Court for the District of Delaware).
Document STI-1248-001778, filed with Document filed Jun. 30, 2023, "Specified Technologies Inc.'s Invalidity Contentions" in Case 1:22-cv-01248-CJB (in the U.S. District Court for the District of Delaware).
Document STI-1248-001783, filed with Document filed Jun. 30, 2023, "Specified Technologies Inc.'s Invalidity Contentions" in Case 1:22-cv-01248-CJB (in the U.S. District Court for the District of Delaware).
Document STI-1248-001784, filed with Document filed Jun. 30, 2023, "Specified Technologies Inc.'s Invalidity Contentions" in Case 1:22-cv-01248-CJB (in the U.S. District Court for the District of Delaware).
Document STI-1248-001785, filed with Document filed Jun. 30, 2023, "Specified Technologies Inc.'s Invalidity Contentions" in Case 1:22-cv-01248-CJB (in the U.S. District Court for the District of Delaware)
Document STI-1248-001786, filed with Document filed Jun. 30, 2023, "Specified Technologies Inc.'s Invalidity Contentions" in Case 1:22-cv-01248-CJB (in the U.S. District Court for the District of Delaware).
Document STI-1248-001787, filed with Document filed Jun. 30, 2023, "Specified Technologies Inc.'s Invalidity Contentions" in Case 1:22-cv-01248-CJB (in the U.S. District Court for the District of Delaware).
Document STI-1248-001788, filed with Document filed Jun. 30, 2023, "Specified Technologies Inc.'s Invalidity Contentions" in Case 1:22-cv-01248-CJB (in the U.S. District Court for the District of Delaware).
Document STI-1248-001789, filed with Document filed Jun. 30, 2023, "Specified Technologies Inc.'s Invalidity Contentions" in Case 1:22-cv-01248-CJB (in the U.S. District Court for the District of Delaware).
Document STI-1248-001790, filed with Document filed Jun. 30, 2023, "Specified Technologies Inc.'s Invalidity Contentions" in Case 1:22-cv-01248-CJB (in the U.S. District Court for the District of Delaware).
Document STI-1248-001791, filed with Document filed Jun. 30, 2023, "Specified Technologies Inc.'s Invalidity Contentions" in Case 1:22-cv-01248-CJB (in the U.S. District Court for the District of Delaware).
Document STI-1248-001792, filed with Document filed Jun. 30, 2023, "Specified Technologies Inc.'s Invalidity Contentions" in Case 1:22-cv-01248-CJB (in the U.S. District Court for the District of Delaware).
Document STI-1248-001793, filed with Document filed Jun. 30, 2023, "Specified Technologies Inc.'s Invalidity Contentions" in Case 1:22-cv-01248-CJB (in the U.S. District Court for the District of Delaware).
Document STI-1248-001794, filed with Document filed Jun. 30, 2023, "Specified Technologies Inc.'s Invalidity Contentions" in Case 1:22-cv-01248-CJB (in the U.S. District Court for the District of Delaware).

(56) References Cited

OTHER PUBLICATIONS

Document STI-1248-001795, filed with Document filed Jun. 30, 2023, "Specified Technologies Inc.'s Invalidity Contentions" in Case 1:22-cv-01248-CJB (in the U.S. District Court for the District of Delaware).
Document STI-1248-001796, filed with Document filed Jun. 30, 2023, "Specified Technologies Inc.'s Invalidity Contentions" in Case 1:22-cv-01248-CJB (in the U.S. District Court for the District of Delaware).
Document STI-1248-001797, filed with Document filed Jun. 30, 2023, "Specified Technologies Inc.'s Invalidity Contentions" in Case 1:22-cv-01248-CJB (in the U.S. District Court for the District of Delaware).
Document STI-1248-001801, filed with Document filed Jun. 30, 2023, "Specified Technologies Inc.'s Invalidity Contentions" in Case 1:22-cv-01248-CJB (in the U.S. District Court for the District of Delaware).
Document STI-1248-001807, filed with Document filed Jun. 30, 2023, "Specified Technologies Inc.'s Invalidity Contentions" in Case 1:22-cv-01248-CJB (in the U.S. District Court for the District of Delaware).
Document STI-1248-001808, filed with Document filed Jun. 30, 2023, "Specified Technologies Inc.'s Invalidity Contentions" in Case 1:22-cv-01248-CJB (in the U.S. District Court for the District of Delaware).
Document STI-1248-001809, filed with Document filed Jun. 30, 2023, "Specified Technologies Inc.'s Invalidity Contentions" in Case 1:22-cv-01248-CJB (in the U.S. District Court for the District of Delaware).
Document STI-1248-001810, filed with Document filed Jun. 30, 2023, "Specified Technologies Inc.'s Invalidity Contentions" in Case 1:22-cv-01248-CJB (in the U.S. District Court for the District of Delaware).
Document STI-1248-001811, filed with Document filed Jun. 30, 2023, "Specified Technologies Inc.'s Invalidity Contentions" in Case 1:22-cv-01248-CJB (in the U.S. District Court for the District of Delaware).
Document STI-1248-001812, filed with Document filed Jun. 30, 2023, "Specified Technologies Inc.'s Invalidity Contentions" in Case 1:22-cv-01248-CJB (in the U.S. District Court for the District of Delaware).
Document STI-1248-001813, filed with Document filed Jun. 30, 2023, "Specified Technologies Inc.'s Invalidity Contentions" in Case 1:22-cv-01248-CJB (in the U.S. District Court for the District of Delaware).
Document STI-1248-001814, filed with Document filed Jun. 30, 2023, "Specified Technologies Inc.'s Invalidity Contentions" in Case 1:22-cv-01248-CJB (in the U.S. District Court for the District of Delaware).
Document STI-1248-001815, filed with Document filed Jun. 30, 2023, "Specified Technologies Inc.'s Invalidity Contentions" in Case 1:22-cv-01248-CJB (in the U.S. District Court for the District of Delaware).
Document STI-1248-001816, filed with Document filed Jun. 30, 2023, "Specified Technologies Inc.'s Invalidity Contentions" in Case 1:22-cv-01248-CJB (in the U.S. District Court for the District of Delaware).
Document STI-1248-001817, filed with Document filed Jun. 30, 2023, "Specified Technologies Inc.'s Invalidity Contentions" in Case 1:22-cv-01248-CJB (in the U.S. District Court for the District of Delaware).
Document STI-1248-001818, filed with Document filed Jun. 30, 2023, "Specified Technologies Inc.'s Invalidity Contentions" in Case 1:22-cv-01248-CJB (in the U.S. District Court for the District of Delaware).
Document STI-1248-001819, filed with Document filed Jun. 30, 2023, "Specified Technologies Inc.'s Invalidity Contentions" in Case 1:22-cv-01248-CJB (in the U.S. District Court for the District of Delaware).
Document STI-1248-001820, filed with Document filed Jun. 30, 2023, "Specified Technologies Inc.'s Invalidity Contentions" in Case 1:22-cv-01248-CJB (in the U.S. District Court for the District of Delaware).
Document STI-1248-001821, filed with Document filed Jun. 30, 2023, "Specified Technologies Inc.'s Invalidity Contentions" in Case 1:22-cv-01248-CJB (in the U.S. District Court for the District of Delaware).
Document STI-1248-001822, filed with Document filed Jun. 30, 2023, "Specified Technologies Inc.'s Invalidity Contentions" in Case 1:22-cv-01248-CJB (in the U.S. District Court for the District of Delaware).
Document STI-1248-001823, filed with Document filed Jun. 30, 2023, "Specified Technologies Inc.'s Invalidity Contentions" in Case 1:22-cv-01248-CJB (in the U.S. District Court for the District of Delaware).
Document STI-1248-001825, filed with Document filed Jun. 30, 2023, "Specified Technologies Inc.'s Invalidity Contentions" in Case 1:22-cv-01248-CJB (in the U.S. District Court for the District of Delaware).
Document STI-1248-001826, filed with Document filed Jun. 30, 2023, "Specified Technologies Inc.'s Invalidity Contentions" in Case 1:22-cv-01248-CJB (in the U.S. District Court for the District of Delaware).
Document STI-1248-001827, filed with Document filed Jun. 30, 2023, "Specified Technologies Inc.'s Invalidity Contentions" in Case 1:22-cv-01248-CJB (in the U.S. District Court for the District of Delaware).
Document STI-1248-001828, filed with Document filed Jun. 30, 2023, "Specified Technologies Inc.'s Invalidity Contentions" in Case 1:22-cv-01248-CJB (in the U.S. District Court for the District of Delaware).
Document STI-1248-001829, filed with Document filed Jun. 30, 2023, "Specified Technologies Inc.'s Invalidity Contentions" in Case 1:22-cv-01248-CJB (in the U.S. District Court for the District of Delaware).
Document STI-1248-001830, filed with Document filed Jun. 30, 2023, "Specified Technologies Inc.'s Invalidity Contentions" in Case 1:22-cv-01248-CJB (in the U.S. District Court for the District of Delaware).
Document STI-1248-001831, filed with Document filed Jun. 30, 2023, "Specified Technologies Inc.'s Invalidity Contentions" in Case 1:22-cv-01248-CJB (in the U.S. District Court for the District of Delaware).
Document STI-1248-001832, filed with Document filed Jun. 30, 2023, "Specified Technologies Inc.'s Invalidity Contentions" in Case 1:22-cv-01248-CJB (in the U.S. District Court for the District of Delaware).
Document STI-1248-001833, filed with Document filed Jun. 30, 2023, "Specified Technologies Inc.'s Invalidity Contentions" in Case 1:22-cv-01248-CJB (in the U.S. District Court for the District of Delaware).
Document STI-1248-001834, filed with Document filed Jun. 30, 2023, "Specified Technologies Inc.'s Invalidity Contentions" in Case 1:22-cv-01248-CJB (in the U.S. District Court for the District of Delaware).
Document STI-1248-001835, filed with Document filed Jun. 30, 2023, "Specified Technologies Inc.'s Invalidity Contentions" in Case 1:22-cv-01248-CJB (in the U.S. District Court for the District of Delaware).
Document STI-1248-001836, filed with Document filed Jun. 30, 2023, "Specified Technologies Inc.'s Invalidity Contentions" in Case 1:22-cv-01248-CJB (in the U.S. District Court for the District of Delaware).
Document STI-1248-001837, filed with Document filed Jun. 30, 2023, "Specified Technologies Inc.'s Invalidity Contentions" in Case 1:22-cv-01248-CJB (in the U.S. District Court for the District of Delaware).
Document STI-1248-001838, filed with Document filed Jun. 30, 2023, "Specified Technologies Inc.'s Invalidity Contentions" in Case 1:22-cv-01248-CJB (in the U.S. District Court for the District of Delaware).

(56) References Cited

OTHER PUBLICATIONS

Document STI-1248-001839, filed with Document filed Jun. 30, 2023, "Specified Technologies Inc.'s Invalidity Contentions" in Case 1:22-cv-01248-CJB (in the U.S. District Court for the District of Delaware).
Document STI-1248-001840, filed with Document filed Jun. 30, 2023, "Specified Technologies Inc.'s Invalidity Contentions" in Case 1:22-cv-01248-CJB (in the U.S. District Court for the District of Delaware).
Document STI-1248-001841, filed with Document filed Jun. 30, 2023, "Specified Technologies Inc.'s Invalidity Contentions" in Case 1:22-cv-01248-CJB (in the U.S. District Court for the District of Delaware).
Document STI-1248-001842, filed with Document filed Jun. 30, 2023, "Specified Technologies Inc.'s Invalidity Contentions" in Case 1:22-cv-01248-CJB (in the U.S. District Court for the District of Delaware).
Document STI-1248-001843, filed with Document filed Jun. 30, 2023, "Specified Technologies Inc.'s Invalidity Contentions" in Case 1:22-cv-01248-CJB (in the U.S. District Court for the District of Delaware).
Document STI-1248-001844, filed with Document filed Jun. 30, 2023, "Specified Technologies Inc.'s Invalidity Contentions" in Case 1:22-cv-01248-CJB (in the U.S. District Court for the District of Delaware).
Document STI-1248-001845, filed with Document filed Jun. 30, 2023, "Specified Technologies Inc.'s Invalidity Contentions" in Case 1:22-cv-01248-CJB (in the U.S. District Court for the District of Delaware).
Document STI-1248-001846, filed with Document filed Jun. 30, 2023, "Specified Technologies Inc.'s Invalidity Contentions" in Case 1:22-cv-01248-CJB (in the U.S. District Court for the District of Delaware).
Document STI-1248-001847, filed with Document filed Jun. 30, 2023, "Specified Technologies Inc.'s Invalidity Contentions" in Case 1:22-cv-01248-CJB (in the U.S. District Court for the District of Delaware).
Document STI-1248-001848, filed with Document filed Jun. 30, 2023, "Specified Technologies Inc.'s Invalidity Contentions" in Case 1:22-cv-01248-CJB (in the U.S. District Court for the District of Delaware).
Document STI-1248-001849, filed with Document filed Jun. 30, 2023, "Specified Technologies Inc.'s Invalidity Contentions" in Case 1:22-cv-01248-CJB (in the U.S. District Court for the District of Delaware).
Document STI-1248-001850, filed with Document filed Jun. 30, 2023, "Specified Technologies Inc.'s Invalidity Contentions" in Case 1:22-cv-01248-CJB (in the U.S. District Court for the District of Delaware).
Document STI-1248-001851, filed with Document filed Jun. 30, 2023, "Specified Technologies Inc.'s Invalidity Contentions" in Case 1:22-cv-01248-CJB (in the U.S. District Court for the District of Delaware).
Document STI-1248-001852, filed with Document filed Jun. 30, 2023, "Specified Technologies Inc.'s Invalidity Contentions" in Case 1:22-cv-01248-CJB (in the U.S. District Court for the District of Delaware).
Document STI-1248-001853, filed with Document filed Jun. 30, 2023, "Specified Technologies Inc.'s Invalidity Contentions" in Case 1:22-cv-01248-CJB (in the U.S. District Court for the District of Delaware).
Document STI-1248-001854, filed with Document filed Jun. 30, 2023, "Specified Technologies Inc.'s Invalidity Contentions" in Case 1:22-cv-01248-CJB (in the U.S. District Court for the District of Delaware).
Document STI-1248-001855, filed with Document filed Jun. 30, 2023, "Specified Technologies Inc.'s Invalidity Contentions" in Case 1:22-cv-01248-CJB (in the U.S. District Court for the District of Delaware).
Document STI-1248-001856, filed with Document filed Jun. 30, 2023, "Specified Technologies Inc.'s Invalidity Contentions" in Case 1:22-cv-01248-CJB (in the U.S. District Court for the District of Delaware).
Document STI-1248-001857, filed with Document filed Jun. 30, 2023, "Specified Technologies Inc.'s Invalidity Contentions" in Case 1:22-cv-01248-CJB (in the U.S. District Court for the District of Delaware).
Document STI-1248-001858, filed with Document filed Jun. 30, 2023, "Specified Technologies Inc.'s Invalidity Contentions" in Case 1:22-cv-01248-CJB (in the U.S. District Court for the District of Delaware).
Document STI-1248-001859, filed with Document filed Jun. 30, 2023, "Specified Technologies Inc.'s Invalidity Contentions" In Case 1:22-cv-01248-CJB (in the U.S. District Court for the District of Delaware).
Document STI-1248-001860, filed with Document filed Jun. 30, 2023, "Specified Technologies Inc.'s Invalidity Contentions" in Case 1:22-cv-01248-CJB (in the U.S. District Court for the District of Delaware).
Document STI-1248-001861, filed with Document filed Jun. 30, 2023, "Specified Technologies Inc.'s Invalidity Contentions" in Case 1:22-cv-01248-CJB (in the U.S. District Court for the District of Delaware).
Document STI-1248-001864, filed with Document filed Jun. 30, 2023, "Specified Technologies Inc.'s Invalidity Contentions" in Case 1:22-cv-01248-CJB (in the U.S. District Court for the District of Delaware).
Document STI-1248-001872, filed with Document filed Jun. 30, 2023, "Specified Technologies Inc.'s Invalidity Contentions" in Case 1:22-cv-01248-CJB (in the U.S. District Court for the District of Delaware).
Document STI-1248-001873, filed with Document filed Jun. 30, 2023, "Specified Technologies Inc.'s Invalidity Contentions" in Case 1:22-cv-01248-CJB (in the U.S. District Court for the District of Delaware).
Document STI-1248-001874, filed with Document filed Jun. 30, 2023, "Specified Technologies Inc.'s Invalidity Contentions" in Case 1:22-cv-01248-CJB (in the U.S. District Court for the District of Delaware).
Document STI-1248-001875, filed with Document filed Jun. 30, 2023, "Specified Technologies Inc.'s Invalidity Contentions" in Case 1:22-cv-01248-CJB (in the U.S. District Court for the District of Delaware).
Document STI-1248-001876, filed with Document filed Jun. 30, 2023, "Specified Technologies Inc.'s Invalidity Contentions" in Case 1:22-cv-01248-CJB (in the U.S. District Court for the District of Delaware).
Document STI-1248-001877, filed with Document filed Jun. 30, 2023, "Specified Technologies Inc.'s Invalidity Contentions" in Case 1:22-cv-01248-CJB (in the U.S. District Court for the District of Delaware).
Document STI-1248-001878, filed with Document filed Jun. 30, 2023, "Specified Technologies Inc.'s Invalidity Contentions" in Case 1:22-cv-01248-CJB (in the U.S. District Court for the District of Delaware).
Document STI-1248-001879, filed with Document filed Jun. 30, 2023, "Specified Technologies Inc.'s Invalidity Contentions" in Case 1:22-cv-01248-CJB (in the U.S. District Court for the District of Delaware).
Document STI-1248-001880, filed with Document filed Jun. 30, 2023, "Specified Technologies Inc.'s Invalidity Contentions" in Case 1:22-cv-01248-CJB (in the U.S. District Court for the District of Delaware).
Document STI-1248-001881, filed with Document filed Jun. 30, 2023, "Specified Technologies Inc.'s Invalidity Contentions" in Case 1:22-cv-01248-CJB (in the U.S. District Court for the District of Delaware).
Document STI-1248-001882, filed with Document filed Jun. 30, 2023, "Specified Technologies Inc.'s Invalidity Contentions" in Case 1:22-cv-01248-CJB (in the U.S. District Court for the District of Delaware).

(56) References Cited

OTHER PUBLICATIONS

Document STI-1248-001883, filed with Document filed Jun. 30, 2023, "Specified Technologies Inc.'s Invalidity Contentions" in Case 1:22-cv-01248-CJB (in the U.S. District Court for the District of Delaware).
Document STI-1248-001884, filed with Document filed Jun. 30, 2023, "Specified Technologies Inc.'s Invalidity Contentions" in Case 1:22-cv-01248-CJB (in the U.S. District Court for the District of Delaware).
Document STI-1248-003874, filed with Document filed Jun. 30, 2023, "Specified Technologies Inc.'s Invalidity Contentions" in Case 1:22-cv-01248-CJB (in the U.S. District Court for the District of Delaware).
Document STI-1248-003875, filed with Document filed Jun. 30, 2023, "Specified Technologies Inc.'s Invalidity Contentions" in Case 1:22-cv-01248-CJB (in the U.S. District Court for the District of Delaware).
Document STI-1248-003876, filed with Document filed Jun. 30, 2023, "Specified Technologies Inc.'s Invalidity Contentions" in Case 1:22-cv-01248-CJB (in the U.S. District Court for the District of Delaware).
Document STI-1248-003877, filed with Document filed Jun. 30, 2023, "Specified Technologies Inc.'s Invalidity Contentions" in Case 1:22-cv-01248-CJB (in the U.S. District Court for the District of Delaware).
Document STI-1248-003886, filed with Document filed Jun. 30, 2023, "Specified Technologies Inc.'s Invalidity Contentions" in Case 1:22-cv-01248-CJB (in the U.S. District Court for the District of Delaware).
Document STI-1248-003887, filed with Document filed Jun. 30, 2023, "Specified Technologies Inc.'s Invalidity Contentions" in Case 1:22-cv-01248-CJB (in the U.S. District Court for the District of Delaware).
Document STI-1248-003891, filed with Document filed Jun. 30, 2023, "Specified Technologies Inc.'s Invalidity Contentions" in Case 1:22-cv-01248-CJB (in the U.S. District Court for the District of Delaware).
Document STI-1248-003904, filed with Document filed Jun. 30, 2023, "Specified Technologies Inc.'s Invalidity Contentions" in Case 1:22-cv-01248-CJB (in the U.S. District Court for the District of Delaware).
Document STI-1248-003905, filed with Document filed Jun. 30, 2023, "Specified Technologies Inc.'s Invalidity Contentions" in Case 1:22-cv-01248-CJB (in the U.S. District Court for the District of Delaware).
Document STI-1248-003906, filed with Document filed Jun. 30, 2023, "Specified Technologies Inc.'s Invalidity Contentions" in Case 1:22-cv-01248-CJB (in the U.S. District Court for the District of Delaware).
Document STI-1248-003907, filed with Document filed Jun. 30, 2023, "Specified Technologies Inc.'s Invalidity Contentions" in Case 1:22-cv-01248-CJB (in the U.S. District Court for the District of Delaware).
Document STI-1248-003908, filed with Document filed Jun. 30, 2023, "Specified Technologies Inc.'s Invalidity Contentions" in Case 1:22-cv-01248-CJB (in the U.S. District Court for the District of Delaware).
Document STI-1248-003909, filed with Document filed Jun. 30, 2023, "Specified Technologies Inc.'s Invalidity Contentions" in Case 1:22-cv-01248-CJB (in the U.S. District Court for the District of Delaware).
Document STI-1248-003910, filed with Document filed Jun. 30, 2023, "Specified Technologies Inc.'s Invalidity Contentions" in Case 1:22-cv-01248-CJB (in the U.S. District Court for the District of Delaware).
Document STI-1248-003911, filed with Document filed Jun. 30, 2023, "Specified Technologies Inc.'s Invalidity Contentions" in Case 1:22-cv-01248-CJB (in the U.S. District Court for the District of Delaware).
Document STI-1248-003912, filed with Document filed Jun. 30, 2023, "Specified Technologies Inc.'s Invalidity Contentions" in Case 1:22-cv-01248-CJB (in the U.S. District Court for the District of Delaware).
Document STI-1248-003913, filed with Document filed Jun. 30, 2023, "Specified Technologies Inc.'s Invalidity Contentions" in Case 1:22-cv-01248-CJB (in the U.S. District Court for the District of Delaware).
Document STI-1248-003914, filed with Document filed Jun. 30, 2023, "Specified Technologies Inc.'s Invalidity Contentions" in Case 1:22-cv-01248-CJB (in the U.S. District Court for the District of Delaware).
Document STI-1248-003915, filed with Document filed Jun. 30, 2023, "Specified Technologies Inc.'s Invalidity Contentions" in Case 1:22-cv-01248-CJB (in the U.S. District Court for the District of Delaware).
Document STI-1248-003916, filed with Document filed Jun. 30, 2023, "Specified Technologies Inc.'s Invalidity Contentions" in Case 1:22-cv-01248-CJB (in the U.S. District Court for the District of Delaware).
Document STI-1248-003917, filed with Document filed Jun. 30, 2023, "Specified Technologies Inc.'s Invalidity Contentions" in Case 1:22-cv-01248-CJB (in the U.S. District Court for the District of Delaware).
Document STI-1248-003918, filed with Document filed Jun. 30, 2023, "Specified Technologies Inc.'s Invalidity Contentions" in Case 1:22-cv-01248-CJB (in the U.S. District Court for the District of Delaware).
Document STI-1248-003919, filed with Document filed Jun. 30, 2023, "Specified Technologies Inc.'s Invalidity Contentions" in Case 1:22-cv-01248-CJB (in the U.S. District Court for the District of Delaware).
Document STI-1248-003920, filed with Document filed Jun. 30, 2023, "Specified Technologies Inc.'s Invalidity Contentions" in Case 1:22-cv-01248-CJB (in the U.S. District Court for the District of Delaware).
Document STI-1248-003921, filed with Document filed Jun. 30, 2023, "Specified Technologies Inc.'s Invalidity Contentions" in Case 1:22-cv-01248-CJB (in the U.S. District Court for the District of Delaware).
Document STI-1248-003922, filed with Document filed Jun. 30, 2023, "Specified Technologies Inc.'s Invalidity Contentions" in Case 1:22-cv-01248-CJB (in the U.S. District Court for the District of Delaware).
Document STI-1248-005440, filed with Document filed Jun. 30, 2023, "Specified Technologies Inc.'s Invalidity Contentions" in Case 1:22-cv-01248-CJB (in the U.S. District Court for the District of Delaware).
Document STI-1248-005441, filed with Document filed Jun. 30, 2023, "Specified Technologies Inc.'s Invalidity Contentions" in Case 1:22-cv-01248-CJB (in the U.S. District Court for the District of Delaware).
Document STI-1248-005480, filed with Document filed Jun. 30, 2023, "Specified Technologies Inc.'s Invalidity Contentions" in Case 1:22-cv-01248-CJB (in the U.S. District Court for the District of Delaware).
Document STI-1248-005481, filed with Document filed Jun. 30, 2023, "Specified Technologies Inc.'s Invalidity Contentions" in Case 1:22-cv-01248-CJB (in the U.S. District Court for the District of Delaware).
Document STI-1248-005482, filed with Document filed Jun. 30, 2023, "Specified Technologies Inc.'s Invalidity Contentions" in Case 1:22-cv-01248-CJB (in the U.S. District Court for the District of Delaware).
Document STI-1248-005483, filed with Document filed Jun. 30, 2023, "Specified Technologies Inc.'s Invalidity Contentions" in Case 1:22-cv-01248-CJB (in the U.S. District Court for the District of Delaware).
Document STI-1248-005484, filed with Document filed Jun. 30, 2023, "Specified Technologies Inc.'s Invalidity Contentions" in Case 1:22-cv-01248-CJB (in the U.S. District Court for the District of Delaware).

(56) References Cited

OTHER PUBLICATIONS

Document STI-1248-005486, filed with Document filed Jun. 30, 2023, "Specified Technologies Inc.'s Invalidity Contentions" in Case 1:22-cv-01248-CJB (in the U.S. District Court for the District of Delaware).
Document STI-1248-005495, filed with Document filed Jun. 30, 2023, "Specified Technologies Inc.'s Invalidity Contentions" in Case 1:22-cv-01248-CJB (in the U.S. District Court for the District of Delaware).
Document STI-1248-001779 filed with Document filed Jun. 30, 2023, "Specified Technologies Inc.'s Invalidity Contentions" in Case 1:22-cv-01248-CJB (in the U.S. District Court for the District of Delaware).
Document STI-1248-003734 filed with Document filed Jun. 30, 2023, "Specified Technologies Inc.'s Invalidity Contentions" in Case 1:22-cv-01248-CJB (in the U.S. District Court for the District of Delaware).
Document STI-1248-005362 filed with Document filed Jun. 30, 2023, "Specified Technologies Inc.'s Invalidity Contentions" in Case 1:22-cv-01248-CJB (in the U.S. District Court for the District of Delaware).
Document STI-1248-005372 filed with Document filed Jun. 30, 2023, "Specified Technologies Inc.'s Invalidity Contentions" in Case 1:22-cv-01248-CJB (in the U.S. District Court for the District of Delaware).
Document STI-1248-005420 filed with Document filed Jun. 30, 2023, "Specified Technologies Inc.'s Invalidity Contentions" in Case 1:22-cv-01248-CJB (in the U.S. District Court for the District of Delaware).
Document STI-1248-005442 filed with Document filed Jun. 30, 2023, "Specified Technologies Inc.'s Invalidity Contentions" in Case 1:22-cv-01248-CJB (in the U.S. District Court for the District of Delaware).
Document STI-1248-005443 filed with Document filed Jun. 30, 2023, "Specified Technologies Inc.'s Invalidity Contentions" in Case 1:22-cv-01248-CJB (in the U.S. District Court for the District of Delaware).
Document STI-1248-005444 filed with Document filed Jun. 30, 2023, "Specified Technologies Inc.'s Invalidity Contentions" in Case 1:22-cv-01248-CJB (in the U.S. District Court for the District of Delaware).
Document STI-1248-005453 filed with Document filed Jun. 30, 2023, "Specified Technologies Inc.'s Invalidity Contentions" in Case 1:22-cv-01248-CJB (in the U.S. District Court for the District of Delaware).
Document STI-1248-005455 filed with Document filed Jun. 30, 2023, "Specified Technologies Inc.'s Invalidity Contentions" in Case 1:22-cv-01248-CJB (in the U.S. District Court for the District of Delaware).
Document STI-1248-005464 filed with Document filed Jun. 30, 2023, "Specified Technologies Inc.'s Invalidity Contentions" in Case 1:22-cv-01248-CJB (in the U.S. District Court for the District of Delaware).
Document STI-1248-005465 filed with Document filed Jun. 30, 2023, "Specified Technologies Inc.'s Invalidity Contentions" in Case 1:22-cv-01248-CJB (in the U.S. District Court for the District of Delaware).
Document STI-1248-005466 filed with Document filed Jun. 30, 2023, "Specified Technologies Inc.'s Invalidity Contentions" in Case 1:22-cv-01248-CJB (in the U.S. District Court for the District of Delaware).
Document STI-1248-005467 filed with Document filed Jun. 30, 2023, "Specified Technologies Inc.'s Invalidity Contentions" in Case 1:22-cv-01248-CJB (in the U.S. District Court for the District of Delaware).
Document STI-1248-005468 filed with Document filed Jun. 30, 2023, "Specified Technologies Inc.'s Invalidity Contentions" in Case 1:22-cv-01248-CJB (in the U.S. District Court for the District of Delaware).
Document STI-1248-005469 filed with Document filed Jun. 30, 2023, "Specified Technologies Inc.'s Invalidity Contentions" in Case 1:22-cv-01248-CJB (in the U.S. District Court for the District of Delaware).
Document STI-1248-005470 filed with Document filed Jun. 30, 2023, "Specified Technologies Inc.'s Invalidity Contentions" in Case 1:22-cv-01248-CJB (in the U.S. District Court for the District of Delaware).
Document STI-1248-005471 filed with Document filed Jun. 30, 2023, "Specified Technologies Inc.'s Invalidity Contentions" in Case 1:22-cv-01248-CJB (in the U.S. District Court for the District of Delaware).
Document STI-1248-005472 filed with Document filed Jun. 30, 2023, "Specified Technologies Inc.'s Invalidity Contentions" in Case 1:22-cv-01248-CJB (in the U.S. District Court for the District of Delaware).
Document STI-1248-005473 filed with Document filed Jun. 30, 2023, "Specified Technologies Inc.'s Invalidity Contentions" in Case 1:22-cv-01248-CJB (in the U.S. District Court for the District of Delaware).
Document STI-1248-005474 filed with Document filed Jun. 30, 2023, "Specified Technologies Inc.'s Invalidity Contentions" in Case 1:22-cv-01248-CJB (in the U.S. District Court for the District of Delaware).
Document STI-1248-005475 filed with Document filed Jun. 30, 2023, "Specified Technologies Inc.'s Invalidity Contentions" In Case 1:22-cv-01248-CJB (in the U.S. District Court for the District of Delaware).
Document STI-1248-005476 filed with Document filed Jun. 30, 2023, "Specified Technologies Inc.'s Invalidity Contentions" in Case 1:22-cv-01248-CJB (in the U.S. District Court for the District of Delaware).
Document STI-1248-005477 filed with Document filed Jun. 30, 2023, "Specified Technologies Inc.'s Invalidity Contentions" in Case 1:22-cv-01248-CJB (in the U.S. District Court for the District of Delaware).
Document STI-1248-005478 filed with Document filed Jun. 30, 2023, "Specified Technologies Inc.'s Invalidity Contentions" in Case 1:22-cv-01248-CJB (in the U.S. District Court for the District of Delaware).
Document STI-1248-005479 filed with Document filed Jun. 30, 2023, "Specified Technologies Inc.'s Invalidity Contentions" in Case 1:22-cv-01248-CJB (in the U.S. District Court for the District of Delaware).
Document STI-1248-005497 filed with Document filed Jun. 30, 2023, "Specified Technologies Inc.'s Invalidity Contentions" in Case 1:22-cv-01248-CJB (in the U.S. District Court for the District of Delaware).
Document STI-1248-005498 filed with Document filed Jun. 30, 2023, "Specified Technologies Inc.'s Invalidity Contentions" in Case 1:22-cv-01248-CJB (in the U.S. District Court for the District of Delaware).
Document STI-1248-005535 filed with Document filed Jun. 30, 2023, "Specified Technologies Inc.'s Invalidity Contentions" in Case 1:22-cv-01248-CJB (in the U.S. District Court for the District of Delaware).
Document STI-1248-005536 filed with Document filed Jun. 30, 2023, "Specified Technologies Inc.'s Invalidity Contentions" in Case 1:22-cv-01248-CJB (in the U.S. District Court for the District of Delaware).
Document STI-1248-005538 filed with Document filed Jun. 30, 2023, "Specified Technologies Inc.'s Invalidity Contentions" in Case 1:22-cv-01248-CJB (in the U.S. District Court for the District of Delaware).
Document STI-1248-005584 filed with Document filed Jun. 30, 2023, "Specified Technologies Inc.'s Invalidity Contentions" in Case 1:22-cv-01248-CJB (in the U.S. District Court for the District of Delaware).
Document STI-1248-005758 filed with Document filed Jun. 30, 2023, "Specified Technologies Inc.'s Invalidity Contentions" in Case 1:22-cv-01248-CJB (in the U.S. District Court for the District of Delaware).

(56) References Cited

OTHER PUBLICATIONS

Document STI-1248-003713, filed with Document filed Jun. 30, 2023, "Specified Technologies Inc.'s Invalidity Contentions" in Case 1:22-cv-01248-CJB (in the U.S. District Court for the District of Delaware).
Document STI-1248-003714, filed with Document filed Jun. 30, 2023, "Specified Technologies Inc.'s Invalidity Contentions" in Case 1:22-cv-01248-CJB (in the U.S. District Court for the District of Delaware).
Document STI-1248-003715, filed with Document filed Jun. 30, 2023, "Specified Technologies Inc.'s Invalidity Contentions" in Case1:22-cv-01248-CJB (in the U.S. District Court for the District of Delaware).
Document STI-1248-003717, filed with Document filed Jun. 30, 2023, "Specified Technologies Inc.'s Invalidity Contentions" in Case 1:22-cv-01248-CJB (in the U.S. District Court for the District of Delaware).
Document STI-1248-003719, filed with Document filed Jun. 30, 2023, "Specified Technologies Inc.'s Invalidity Contentions" in Case 1:22-cv-01248-CJB (in the U.S. District Court for the District of Delaware).
Document STI-1248-003720, filed with Document filed Jun. 30, 2023, "Specified Technologies Inc.'s Invalidity Contentions" in Case 1:22-cv-01248-CJB (in the U.S. District Court for the District of Delaware).
Document STI-1248-003721, filed with Document filed Jun. 30, 2023, "Specified Technologies Inc.'s Invalidity Contentions" in Case 1:22-cv-01248-CJB (in the U.S. District Court for the District of Delaware).
Document STI-1248-003726, filed with Document filed Jun. 30, 2023, "Specified Technologies Inc.'s Invalidity Contentions" in Case 1:22-cv-01248-CJB (in the U.S. District Court for the District of Delaware).
Document STI-1248-004495, filed with Document filed Jun. 30, 2023, "Specified Technologies Inc.'s Invalidity Contentions" in Case 1:22-cv-01248-CJB (in the U.S. District Court for the District of Delaware).
Document STI-1248-004496, filed with Document filed Jun. 30, 2023, "Specified Technologies Inc.'s Invalidity Contentions" in Case 1:22-cv-01248-CJB (in the U.S. District Court for the District of Delaware).
Document STI-1248-004497, filed with Document filed Jun. 30, 2023, "Specified Technologies Inc.'s Invalidity Contentions" in Case 1:22-cv-01248-CJB (in the U.S. District Court for the District of Delaware).
Document STI-1248-005407, filed with Document filed Jun. 30, 2023, "Specified Technologies Inc.'s Invalidity Contentions" in Case 1:22-cv-01248-CJB (in the U.S. District Court for the District of Delaware).
Document STI-1248-005421 filed with Document filed Jun. 30, 2023, "Specified Technologies Inc.'s Invalidity Contentions" in Case 1:22-cv-01248-CJB (in the U.S. District Court for the District of Delaware).
Document STI-1248-005505 filed with Document filed Jun. 30, 2023, "Specified Technologies Inc.'s Invalidity Contentions" in Case 1:22-cv-01248-CJB (in the U.S. District Court for the District of Delaware).
Document STI-1248-005506 filed with Document filed Jun. 30, 2023, "Specified Technologies Inc.'s Invalidity Contentions" in Case 1:22-cv-01248-CJB (in the U.S. District Court for the District of Delaware).
Document STI-1248-005511 filed with Document filed Jun. 30, 2023, "Specified Technologies Inc.'s Invalidity Contentions" in Case 1:22-cv-01248-CJB (in the U.S. District Court for the District of Delaware).
Document STI-1248-005512 filed with Document filed Jun. 30, 2023, "Specified Technologies Inc.'s Invalidity Contentions" in Case 1:22-cv-01248-CJB (in the U.S. District Court for the District of Delaware).
Document STI-1248-005515 filed with Document filed Jun. 30, 2023, "Specified Technologies Inc.'s Invalidity Contentions" in Case 1:22-cv-01248-CJB (in the U.S. District Court for the District of Delaware).
Document STI-1248-005516 filed with Document filed Jun. 30, 2023, "Specified Technologies Inc.'s Invalidity Contentions" in Case 1:22-cv-01248-CJB (in the U.S. District Court for the District of Delaware).
Document STI-1248-005517 filed with Document filed Jun. 30, 2023, "Specified Technologies Inc.'s Invalidity Contentions" in Case 1:22-cv-01248-CJB (in the U.S. District Court for the District of Delaware).
Document STI-1248-005519 filed with Document filed Jun. 30, 2023, "Specified Technologies Inc.'s Invalidity Contentions" in Case 1:22-cv-01248-CJB (in the U.S. District Court for the District of Delaware).
Document STI-1248-005534 filed with Document filed Jun. 30, 2023, "Specified Technologies Inc.'s Invalidity Contentions" in Case 1:22-cv-01248-CJB (in the U.S. District Court for the District of Delaware).
Document STI-1248-005560 filed with Document filed Jun. 30, 2023, "Specified Technologies Inc.'s Invalidity Contentions" in Case 1:22-cv-01248-CJB (in the U.S. District Court for the District of Delaware).
Document STI-1248-005576 filed with Document filed Jun. 30, 2023, "Specified Technologies Inc.'s Invalidity Contentions" in Case 1:22-cv-01248-CJB (in the U.S. District Court for the District of Delaware).
Document STI-1248-004498 filed with Document filed Jun. 30, 2023, "Specified Technologies Inc.'s Invalidity Contentions" in Case 1:22-cv-01248-CJB (in the U.S. District Court for the District of Delaware).
Document STI-1248-004499, filed with Document filed Jun. 30, 2023, "Specified Technologies Inc.'s Invalidity Contentions" in Case 1:22-cv-01248-CJB (in the U.S. District Court for the District of Delaware).
Document STI-1248-004500, filed with Document filed Jun. 30, 2023, "Specified Technologies Inc.'s Invalidity Contentions" in Case 1:22-cv-01248-CJB (in the U.S. District Court for the District of Delaware).
Document STI-1248-004501, filed with Document filed Jun. 30, 2023, "Specified Technologies Inc.'s Invalidity Contentions" in Case 1:22-cv-01248-CJB (in the U.S. District Court for the District of Delaware).
Document STI-1248-005382, filed with Document filed Jun. 30, 2023, "Specified Technologies Inc.'s Invalidity Contentions" in Case 1:22-cv-01248-CJB (in the U.S. District Court for the District of Delaware).
Document STI-1248-005393, filed with Document filed Jun. 30, 2023, "Specified Technologies Inc.'s Invalidity Contentions" in Case 1:22-cv-01248-CJB (in the U.S. District Court for the District of Delaware).
Document STI-1248-005408, filed with Document filed Jun. 30, 2023, "Specified Technologies Inc.'s Invalidity Contentions" in Case 1:22-cv-01248-CJB (in the U.S. District Court for the District of Delaware).
Document STI-1248-005409, filed with Document filed Jun. 30, 2023, "Specified Technologies Inc.'s Invalidity Contentions" in Case 1:22-cv-01248-CJB (in the U.S. District Court for the District of Delaware).
Document STI-1248-005418, filed with Document filed Jun. 30, 2023, "Specified Technologies Inc.'s Invalidity Contentions" in Case 1:22-cv-01248-CJB (in the U.S. District Court for the District of Delaware).
Document STI-1248-005445, filed with Document filed Jun. 30, 2023, "Specified Technologies Inc.'s Invalidity Contentions" in Case 1:22-cv-01248-CJB (in the U.S. District Court for the District of Delaware).
Document STI-1248-005449, filed with Document filed Jun. 30, 2023, "Specified Technologies Inc.'s Invalidity Contentions" in Case 1:22-cv-01248-CJB (in the U.S. District Court for the District of Delaware).

(56) References Cited

OTHER PUBLICATIONS

Document STI-1248-005451, filed with Document filed Jun. 30, 2023, "Specified Technologies Inc.'s Invalidity Contentions" in Case 1:22-cv-01248-CJB (in the U.S. District Court for the District of Delaware).
Document STI-1248-005490, filed with Document filed Jun. 30, 2023, "Specified Technologies Inc.'s Invalidity Contentions" in Case 1:22-cv-01248-CJB (in the U.S. District Court for the District of Delaware).
Document STI-1248-005496, filed with Document filed Jun. 30, 2023, "Specified Technologies Inc.'s Invalidity Contentions" in Case 1:22-cv-01248-CJB (in the U.S. District Court for the District of Delaware).
Document STI-1248-005503, filed with Document filed Jun. 30, 2023, "Specified Technologies Inc.'s Invalidity Contentions" in Case 1:22-cv-01248-CJB (in the U.S. District Court for the District of Delaware).
Document STI-1248-005504, filed with Document filed Jun. 30, 2023, "Specified Technologies Inc.'s Invalidity Contentions" in Case 1:22-cv-01248-CJB (in the U.S. District Court for the District of Delaware).
Document STI-1248-005507, filed with Document filed Jun. 30, 2023, "Specified Technologies Inc.'s Invalidity Contentions" in Case 1:22-cv-01248-CJB (in the U.S. District Court for the District of Delaware).
Document STI-1248-005508, filed with Document filed Jun. 30, 2023, "Specified Technologies Inc.'s Invalidity Contentions" in Case 1:22-cv-01248-CJB (in the U.S. District Court for the District of Delaware).
Document STI-1248-005509, filed with Document filed Jun. 30, 2023, "Specified Technologies Inc.'s Invalidity Contentions" in Case 1:22-cv-01248-CJB (in the U.S. District Court for the District of Delaware).
Document STI-1248-005510, filed with Document filed Jun. 30, 2023, "Specified Technologies Inc.'s Invalidity Contentions" in Case 1:22-cv-01248-CJB (in the U.S. District Court for the District of Delaware).
Document STI-1248-005513, filed with Document filed Jun. 30, 2023, "Specified Technologies Inc.'s Invalidity Contentions" in Case 1:22-cv-01248-CJB (in the U.S. District Court for the District of Delaware).
Document STI-1248-005514, filed with Document filed Jun. 30, 2023, "Specified Technologies Inc.'s Invalidity Contentions" in Case 1:22-cv-01248-CJB (in the U.S. District Court for the District of Delaware).
Document STI-1248-005518, filed with Document filed Jun. 30, 2023, "Specified Technologies Inc.'s Invalidity Contentions" in Case 1:22-cv-01248-CJB (in the U.S. District Court for the District of Delaware).
Document STI-1248-005520, filed with Document filed Jun. 30, 2023, "Specified Technologies Inc.'s Invalidity Contentions" in Case 1:22-cv-01248-CJB (in the U.S. District Court for the District of Delaware).
Document STI-1248-005521, filed with Document filed Jun. 30, 2023, "Specified Technologies Inc.'s Invalidity Contentions" in Case 1:22-cv-01248-CJB (in the U.S. District Court for the District of Delaware).
Document STI-1248-005522, filed with Document filed Jun. 30, 2023, "Specified Technologies Inc.'s Invalidity Contentions" in Case 1:22-cv-01248-CJB (in the U.S. District Court for the District of Delaware).
Document STI-1248-005529, filed with Document filed Jun. 30, 2023, "Specified Technologies Inc.'s Invalidity Contentions" in Case 1:22-cv-01248-CJB (in the U.S. District Court for the District of Delaware).
Document STI-1248-005530, filed with Document filed Jun. 30, 2023, "Specified Technologies Inc.'s Invalidity Contentions" in Case 1:22-cv-01248-CJB (in the U.S. District Court for the District of Delaware).
Document STI-1248-005531, filed with Document filed Jun. 30, 2023, "Specified Technologies Inc.'s Invalidity Contentions" in Case 1:22-cv-01248-CJB (in the U.S. District Court for the District of Delaware).
Document STI-1248-005532, filed with Document filed Jun. 30, 2023, "Specified Technologies Inc.'s Invalidity Contentions" in Case 1:22-cv-01248-CJB (in the U.S. District Court for the District of Delaware).
Document STI-1248-005533, filed with Document filed Jun. 30, 2023, "Specified Technologies Inc.'s Invalidity Contentions" in Case 1:22-cv-01248-CJB (in the U.S. District Court for the District of Delaware).
Document STI-1248-005539, filed with Document filed Jun. 30, 2023, "Specified Technologies Inc.'s Invalidity Contentions" in Case 1:22-cv-01248-CJB (in the U.S. District Court for the District of Delaware).
Document STI-1248-005551, filed with Document filed Jun. 30, 2023, "Specified Technologies Inc.'s Invalidity Contentions" in Case 1:22-cv-01248-CJB (in the U.S. District Court for the District of Delaware).
Document STI-1248-005568, filed with Document filed Jun. 30, 2023, "Specified Technologies Inc.'s Invalidity Contentions" in Case 1:22-cv-01248-CJB (in the U.S. District Court for the District of Delaware).
Document STI-1248-005591, filed with Document filed Jun. 30, 2023, "Specified Technologies Inc.'s Invalidity Contentions" in Case 1:22-cv-01248-CJB (in the U.S. District Court for the District of Delaware).
Document STI-1248-005609, filed with Document filed Jun. 30, 2023, "Specified Technologies Inc.'s Invalidity Contentions" in Case 1:22-cv-01248-CJB (in the U.S. District Court for the District of Delaware).
Document STI-1248-005419 filed with Document filed Jun. 30, 2023, "Specified Technologies Inc.'s Invalidity Contentions" in Case 1:22-cv-01248-CJB (in the U.S. District Court for the District of Delaware).
Document STI-1248-005431 filed with Document filed Jun. 30, 2023, "Specified Technologies Inc.'s Invalidity Contentions" in Case 1:22-cv-01248-CJB (in the U.S. District Court for the District of Delaware).
Document STI-1248-005438 filed with Document filed Jun. 30, 2023, "Specified Technologies Inc.'s Invalidity Contentions" in Case 1:22-cv-01248-CJB (in the U.S. District Court for the District of Delaware).
Document STI-1248-005447 filed with Document filed Jun. 30, 2023, "Specified Technologies Inc.'s Invalidity Contentions" in Case 1:22-cv-01248-CJB (in the U.S. District Court for the District of Delaware).
Document STI-1248-005499 filed with Document filed Jun. 30, 2023, "Specified Technologies Inc.'s Invalidity Contentions" in Case 1:22-cv-01248-CJB (in the U.S. District Court for the District of Delaware).
Document STI-1248-005500 filed with Document filed Jun. 30, 2023, "Specified Technologies Inc.'s Invalidity Contentions" in Case 1:22-cv-01248-CJB (in the U.S. District Court for the District of Delaware).
Document STI-1248-005501 filed with Document filed Jun. 30, 2023, "Specified Technologies Inc.'s Invalidity Contentions" in Case 1:22-cv-01248-CJB (in the U.S. District Court for the District of Delaware).
Document STI-1248-005502 filed with Document filed Jun. 30, 2023, "Specified Technologies Inc.'s Invalidity Contentions" in Case 1:22-cv-01248-CJB (in the U.S. District Court for the District of Delaware).
Document STI-1248-005537 filed with Document filed Jun. 30, 2023, "Specified Technologies Inc.'s Invalidity Contentions" in Case 1:22-cv-01248-CJB (in the U.S. District Court for the District of Delaware).
Document STI-1248-000075, filed with Document filed Jun. 30, 2023, "Specified Technologies Inc.'s Invalidity Contentions" in Case 1:22-cv-01248-CJB (in the U.S. District Court for the District of Delaware).

(56) References Cited

OTHER PUBLICATIONS

Document STI-1248-000082, filed with Document filed Jun. 30, 2023, "Specified Technologies Inc.'s Invalidity Contentions" in Case 1:22-cv-01248-CJB (in the U.S. District Court for the District of Delaware).
Document STI-1248-001721, filed with Document filed Jun. 30, 2023, "Specified Technologies Inc.'s Invalidity Contentions" in Case 1:22-cv-01248-CJB (in the U.S. District Court for the District of Delaware).
Document STI-1248-003584, filed with Document filed Jun. 30, 2023, "Specified Technologies Inc.'s Invalidity Contentions" in Case 1:22-cv-01248-CJB (in the U.S. District Court for the District of Delaware).
Document STI-1248-003590, filed with Document filed Jun. 30, 2023, "Specified Technologies Inc.'s Invalidity Contentions" in Case 1:22-cv-01248-CJB (in the U.S. District Court for the District of Delaware).
Document STI-1248-003591, filed with Document filed Jun. 30, 2023, "Specified Technologies Inc.'s Invalidity Contentions" in Case 1:22-cv-01248-CJB (in the U.S. District Court for the District of Delaware).
Document STI-1248-003592, filed with Document filed Jun. 30, 2023, "Specified Technologies Inc.'s Invalidity Contentions" in Case 1:22-cv-01248-CJB (in the U.S. District Court for the District of Delaware).
Document STI-1248-003593, filed with Document filed Jun. 30, 2023, "Specified Technologies Inc.'s Invalidity Contentions" in Case 1:22-cv-01248-CJB (in the U.S. District Court for the District of Delaware).
Document STI-1248-003594, filed with Document filed Jun. 30, 2023, "Specified Technologies Inc.'s Invalidity Contentions" in Case 1:22-cv-01248-CJB (in the U.S. District Court for the District of Delaware).
Document STI-1248-003595, filed with Document filed Jun. 30, 2023, "Specified Technologies Inc.'s Invalidity Contentions" in Case 1:22-cv-01248-CJB (in the U.S. District Court for the District of Delaware).
Document STI-1248-003596, filed with Document filed Jun. 30, 2023, "Specified Technologies Inc.'s Invalidity Contentions" in Case 1:22-cv-01248-CJB (in the U.S. District Court for the District of Delaware).
Document STI-1248-003647, filed with Document filed Jun. 30, 2023, "Specified Technologies Inc.'s Invalidity Contentions" in Case 1:22-cv-01248-CJB (in the U.S. District Court for the District of Delaware).
Document filed Sep. 14, 2023, "Specified Technologies Inc.'S Invalidity Contentions" in Case 1:23-cv-00244-CJB (in the U.S. District Court for the District of Delaware).
Exhibit R-1 to Document filed Sep. 14, 2023, "Specified Technologies Inc.'S Invalidity Contentions" in Case 1:23-cv-00244-CJB (in the U.S. District Court for the District of Delaware).
Exhibit R-2 to Document filed Sep. 14, 2023, "Specified Technologies Inc.'S Invalidity Contentions" in Case 1:23-cv-00244-CJB (in the U.S. District Court for the District of Delaware).
Exhibit R-3 to Document filed Sep. 14, 2023, "Specified Technologies Inc.'S Invalidity Contentions" in Case 1:23-cv-00244-CJB (in the U.S. District Court for the District of Delaware).
Exhibit R-4 to Document filed Sep. 14, 2023, "Specified Technologies Inc.'S Invalidity Contentions" in Case 1:23-cv-00244-CJB (in the U.S. District Court for the District of Delaware).
Exhibit R-5 to Document filed Sep. 14, 2023, "Specified Technologies Inc.'S Invalidity Contentions" in Case 1:23-cv-00244-CJB (in the U.S. District Court for the District of Delaware).
Exhibit R-6 to Document filed Sep. 14, 2023, "Specified Technologies Inc.'S Invalidity Contentions" in Case 1:23-cv-00244-CJB (in the U.S. District Court for the District of Delaware).
Exhibit R-7 to Document filed Sep. 14, 2023, "Specified Technologies Inc.'S Invalidity Contentions" in Case 1:23-cv-00244-CJB (in the U.S. District Court for the District of Delaware).
Exhibit R-8 to Document filed Sep. 14, 2023, "Specified Technologies Inc.'S Invalidity Contentions" in Case 1:23-cv-00244-CJB (in the U.S. District Court for the District of Delaware).
Exhibit R-9 to Document filed Sep. 14, 2023, "Specified Technologies Inc.'S Invalidity Contentions" in Case 1:23-cv-00244-CJB (in the U.S. District Court for the District of Delaware).
Exhibit R-10 to Document filed Sep. 14, 2023, "Specified Technologies Inc.'S Invalidity Contentions" in Case 1:23-cv-00244-CJB (in the U.S. District Court for the District of Delaware).
Exhibit R-11 to Document filed Sep. 14, 2023, "Specified Technologies Inc.'S Invalidity Contentions" in Case 1:23-cv-00244-CJB (in the U.S. District Court for the District of Delaware).
Exhibit R-12 to Document filed Sep. 14, 2023, "Specified Technologies Inc.'S Invalidity Contentions" in Case 1:23-cv-00244-CJB (in the U.S. District Court for the District of Delaware).
Exhibit R-13 to Document filed Sep. 14, 2023, "Specified Technologies Inc.'S Invalidity Contentions" in Case 1:23-cv-00244-CJB (in the U.S. District Court for the District of Delaware).
Exhibit R-14 to Document filed Sep. 14, 2023, "Specified Technologies Inc.'S Invalidity Contentions" in Case 1:23-cv-00244-CJB (in the U.S. District Court for the District of Delaware).
Exhibit R-15 to Document filed Sep. 14, 2023, "Specified Technologies Inc.'S Invalidity Contentions" in Case 1:23-cv-00244-CJB (in the U.S. District Court for the District of Delaware).
Exhibit R-16 to Document filed Sep. 14, 2023, "Specified Technologies Inc.'S Invalidity Contentions" in Case 1:23-cv-00244-CJB (in the U.S. District Court for the District of Delaware).
Exhibit R-17 to Document filed Sep. 14, 2023, "Specified Technologies Inc.'S Invalidity Contentions" in Case 1:23-cv-00244-CJB (in the U.S. District Court for the District of Delaware).
Exhibit R-18 to Document filed Sep. 14, 2023, "Specified Technologies Inc.'S Invalidity Contentions" in Case 1:23-cv-00244-CJB (in the U.S. District Court for the District of Delaware).
Exhibit R-19 to Document filed Sep. 14, 2023, "Specified Technologies Inc.'S Invalidity Contentions" in Case 1:23-cv-00244-CJB (in the U.S. District Court for the District of Delaware).
Exhibit R-20 to Document filed Sep. 14, 2023, "Specified Technologies Inc.'S Invalidity Contentions" in Case 1:23-cv-00244-CJB (in the U.S. District Court for the District of Delaware).
Exhibit S to Document filed Sep. 14, 2023, "Specified Technologies Inc.'S Invalidity Contentions" in Case 1:23-cv-00244-CJB (in the U.S. District Court for the District of Delaware).

* cited by examiner

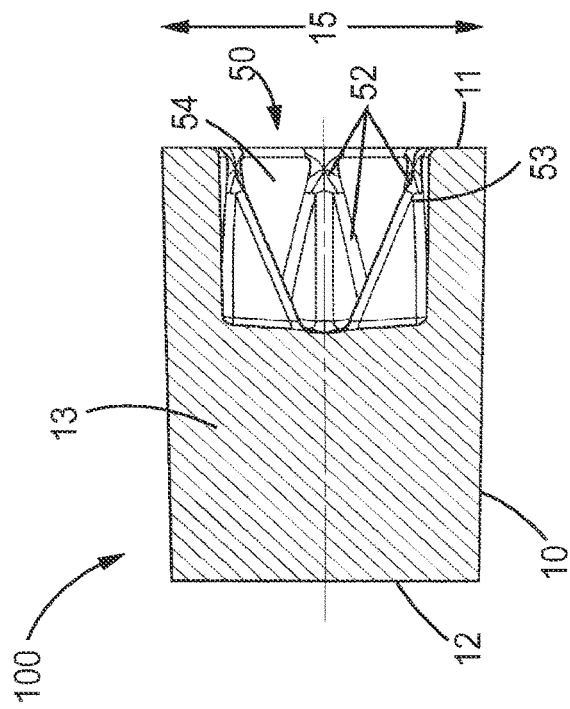
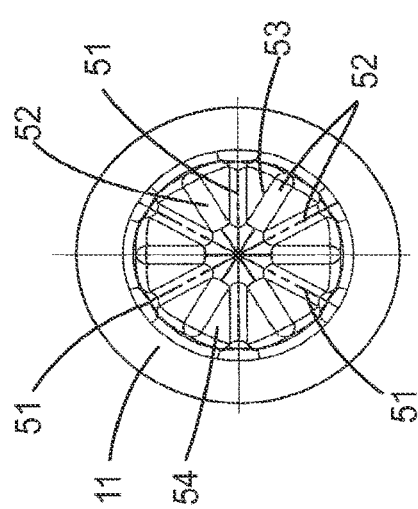
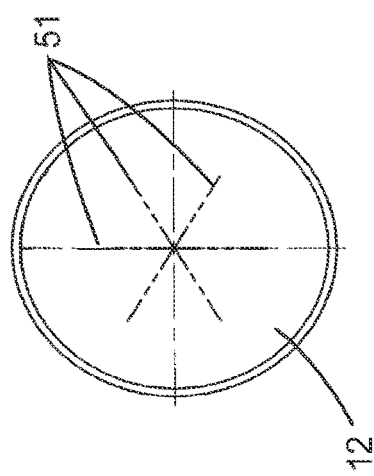
FIG. 2C
FIG. 2A
FIG. 2B

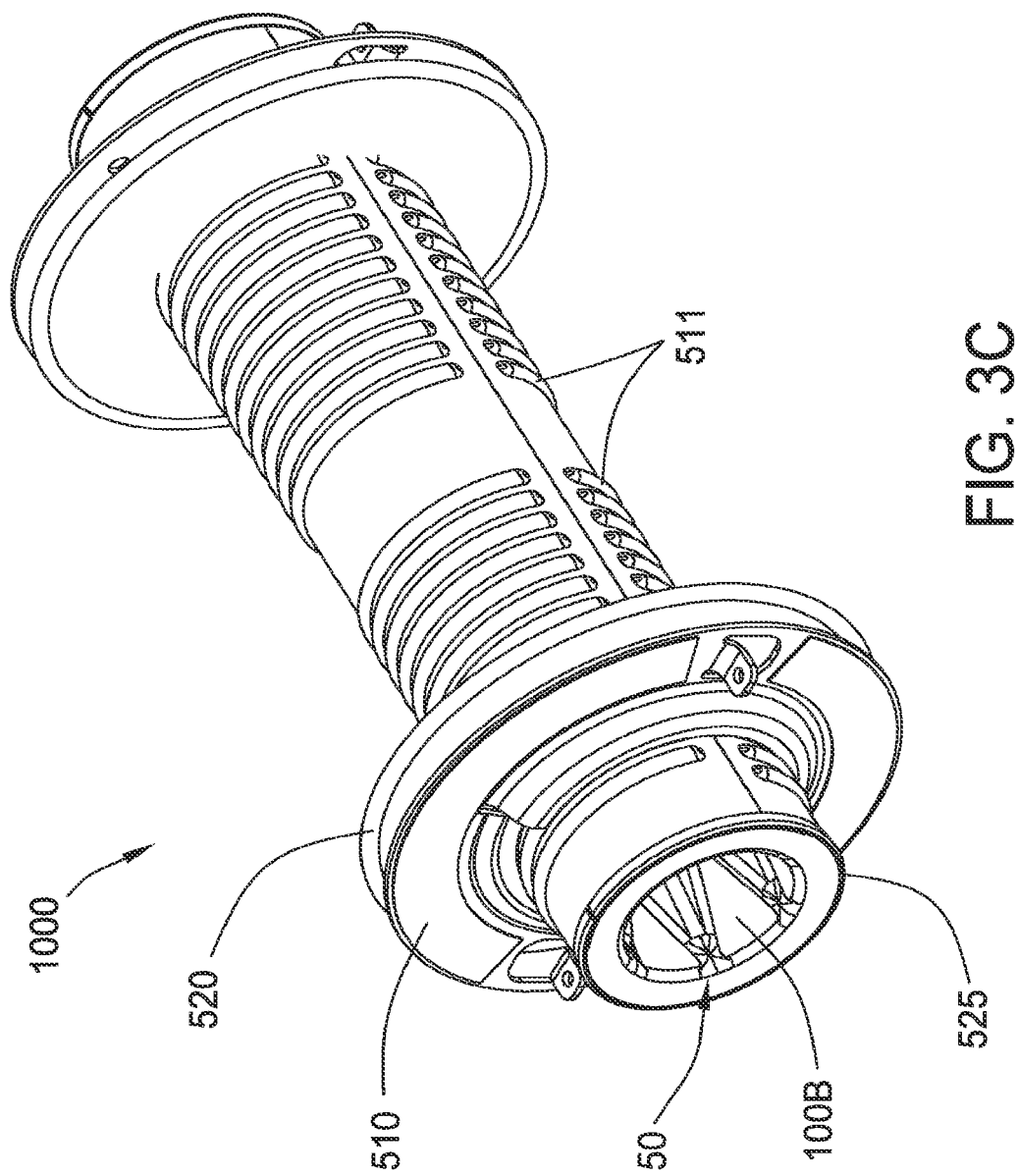

AIR, ACOUSTIC AND/OR FIRE SEALING SLEEVE INSERT AND AIR, ACOUSTIC AND/OR FIRE SEALING DEVICE

CROSS-REFERENCE TO RELATED APPLICATIONS

This application is a continuation of U.S. application Ser. No. 14/811,168, filed on Jul. 28, 2015; the content of which is hereby incorporated by reference in its entirety.

BACKGROUND OF THE INVENTION

Air, acoustic, and/or fire sealing devices, typically located in openings in walls, floors, and/or ceilings, and having pipes, fibers, and/or cables passing therethrough, generally prevent the spread of smoke throughout an area such as facility, thereby limiting damage to the area, and providing occupants more time to safely evacuate the area. Some devices also prevent the passage of sound, as the sound could frighten the occupants and therefore adversely impact the evacuation. If desired, the devices can be designed as fire stop devices, containing intumescent material that expands when exposed to extreme heat of the fire, sealing the openings to prevent the spread of flame and combustion through the openings.

However, there is a need for improvement of existing air, acoustic and/or fire sealing inserts and devices including the inserts. The present invention provides for ameliorating at least some of the disadvantages of the prior art. These and other advantages of the present invention will be apparent from the description as set forth below.

BRIEF SUMMARY OF THE INVENTION

An embodiment of the invention provides an air, acoustic and/or fire sealing sleeve insert comprising a body comprising molded foam material, the body having a first end and a second end and a bulk continuous with the first end and the second end; wherein at least the first end comprises a molded predetermined pattern.

In an embodiment, the molded predetermined pattern comprises a plurality of ribs and elevations. Alternatively, or additionally, in an embodiment, the molded predetermined pattern comprises a plurality of slits passing through the body in a direction longitudinal to the body.

In another embodiment, an air, acoustic and/or fire sealing device is provided, comprising (a) an embodiment of a first air, acoustic and/or fire sealing insert, wherein the body has an outer diameter, and the body is adapted to allow one or more fibers and/or cables to pass through the first and second ends and the bulk; and, (b) a hollow sleeve having an inner diameter, a first open end and a second open end, the ends being axially arranged; wherein the outer diameter of the first air, acoustic and/or fire sealing insert body is greater than, equal to, or less than, the inner diameter of the hollow sleeve; and, the first air, acoustic and/or fire sealing insert is arranged in the sleeve.

In a preferred embodiment, the air, acoustic and/or fire sealing device further comprises a second air, acoustic and/or fire sealing insert, arranged in the sleeve.

BRIEF DESCRIPTION OF THE SEVERAL VIEWS OF THE DRAWING(S)

FIG. 1 is a top view of an air, acoustic and/or fire sealing sleeve insert comprising a predetermined pattern of a plurality of slits according to an embodiment of the present invention.

FIG. 2A is a top view, FIG. 2B is a bottom view, and FIG. 2C is a cross-sectional view, of an air, acoustic and/or fire sealing sleeve insert comprising a predetermined pattern of a plurality of ribs, elevations, and slits, according to another embodiment of the present invention. FIG. 2D is a cross-sectional view, of an air, acoustic and/or fire sealing sleeve insert comprising a predetermined pattern of a plurality of ribs, elevations, and slits, according to another embodiment of the present invention.

FIG. 3A is a cross-sectional view, FIG. 3B is a side view, and FIG. 3C is a perspective view, of an embodiment of an air, acoustic and/or fire sealing device comprising first and second air, acoustic and/or fire sealing sleeve inserts according to FIGS. 2A-2C, wherein the sleeve inserts are arranged in the hollow sleeve of the device, and FIG. 3A shows the molded predetermined pattern of the air, acoustic and/or fire sealing inserts facing outwardly from the open ends of the sleeve.

FIG. 4A is a cross-sectional view, FIG. 4B is a side view, and FIG. 4C is a perspective view, of an embodiment of an air, acoustic and/or fire sealing device comprising first and second air, acoustic and/or fire sealing sleeve inserts according to FIG. 2D, wherein the sleeve inserts are arranged in the hollow sleeve of the device, and FIG. 4A shows the molded predetermined pattern of the air, acoustic and/or fire sealing inserts facing outwardly from the open ends of the sleeve.

DETAILED DESCRIPTION OF THE INVENTION

Figure 1:
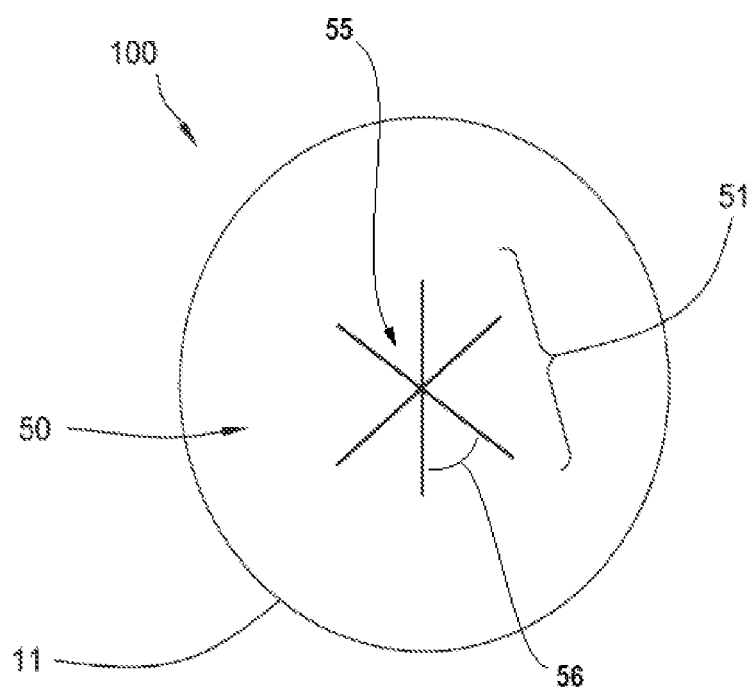

In accordance with an embodiment of the present invention, an air, acoustic and/or fire sealing sleeve insert comprising a body comprising molded foam material, the body having a first end and a second end and a bulk continuous with the first end and the second end; wherein at least the first end comprises a molded predetermined pattern.

In an embodiment, the molded predetermined pattern comprises a plurality of ribs and elevations. Alternatively, or additionally, in an embodiment, the molded predetermined pattern comprises a plurality of slits passing through the body in a direction longitudinal to the body.

The air, acoustic and/or fire sealing sleeve insert can have any desired shape, in one embodiment, comprising a generally cylindrical body, wherein the bulk has a generally cylindrical shape.

In one preferred embodiment, the molded foam material comprises polyurethane. In some embodiments, the molded foam material comprises an intumescent material.

In another embodiment, an air, acoustic and/or fire sealing device is provided, comprising (a) an embodiment of a first air, acoustic and/or fire sealing insert, wherein the body has an outer diameter, and the body is adapted to allow one or more fibers and/or cables to pass through the first and second ends and the bulk; and, (b) a hollow sleeve or housing having an inner diameter, a first open end and a second open end which may form a passage, the ends being axially arranged; wherein the outer diameter of the first air, acoustic and/or fire sealing insert body is greater than, equal to, or less than, the inner diameter of the hollow sleeve; and, the first air, acoustic and/or fire sealing insert is arranged in the sleeve.

Typically, the first air, acoustic and/or fire sealing insert is arranged in the first open end of the sleeve. In one embodiment of the air, acoustic and/or fire sealing device, the molded predetermined pattern of the first air, acoustic and/or fire sealing insert faces outwardly from the first open end of the sleeve. In another embodiment, the molded predetermined pattern of the first air, acoustic and/or fire sealing insert faces inwardly from the first open end of the sleeve.

In a preferred embodiment of the air, acoustic and/or fire sealing device, it further comprises a second air, acoustic and/or fire sealing insert, arranged in the sleeve, typically, wherein the second air, acoustic and/or fire sealing insert is arranged in the second open end of the sleeve. In one embodiment, the molded predetermined pattern of the second air, acoustic and/or fire sealing insert faces outwardly from the second open end of the sleeve, an another embodiment, the molded predetermined pattern of the second air, acoustic and/or fire sealing insert faces inwardly from the second open end of the sleeve.

Advantageously, one or more of any of the following are provided: (a) the foam material allows for any diameter pipe, cable and/or fiber and/or multiple pipe, cable and/or fiber bundle to be inserted and sealed as the foam expands or contracts around the cable(s), fiber(s), and/or pipe(s); (b) it is easy to penetrate the insert from either end for example through a hole in the insert; (c) high cable load is possible: (d) efficient air, acoustic and/or fire and tightness/blocking, as no visible openings around pipe(s), cable(s) and/or fiber(s); (e) long pipe(s), cable(s) and/or fiber(s) can be passed through without impacting the foam surface; (f) one step application, no opening is necessary, as the pipe(s), cable(s) and/or fiber(s) can easily slide through the foam (though, if desired, the inserts can have one or more slits, and a plurality of such slits may define a plurality of sections); and (g) cost-effective production and assembly. Accordingly, the insert may be, or may comprise, a flexible material or a plurality of flexible materials. If desired, e.g., wherein the insert comprises an intumescent material, the inserts and devices can be used in firestop applications. Alternatively, or additionally, inserts and/or devices can be retrofit into existing devices and applications.

Each of the components of the invention will now be described in more detail below, wherein like components have like reference numbers.

Figure 2D:
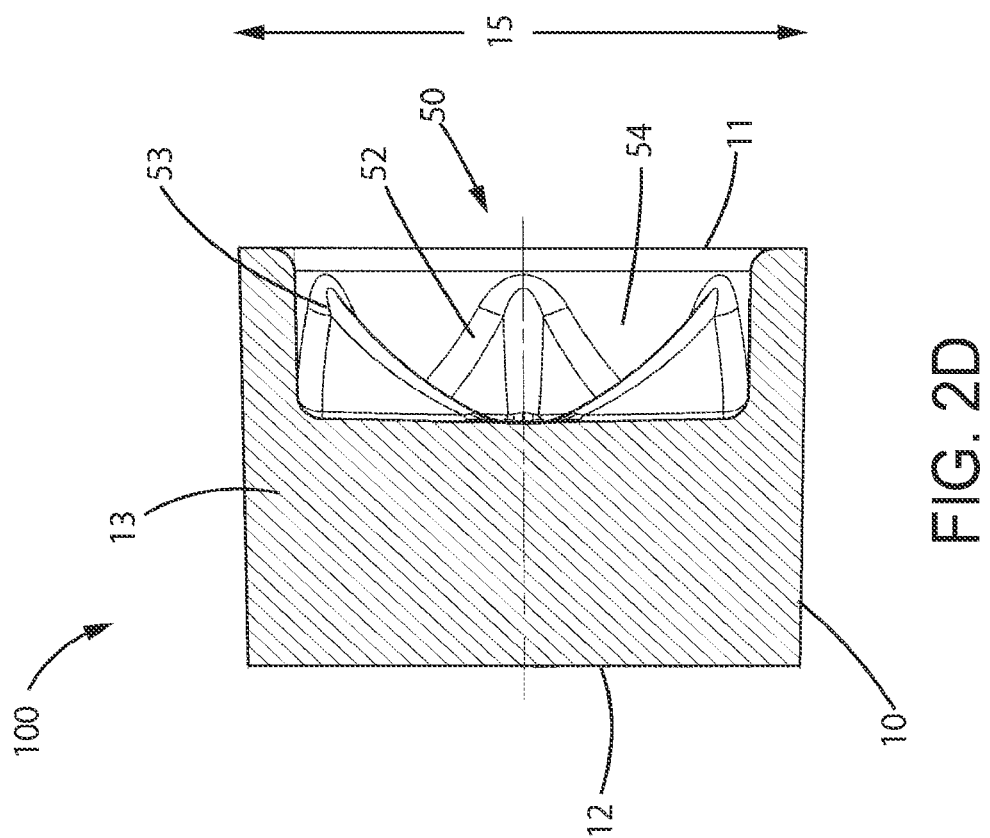
Figure 3A:
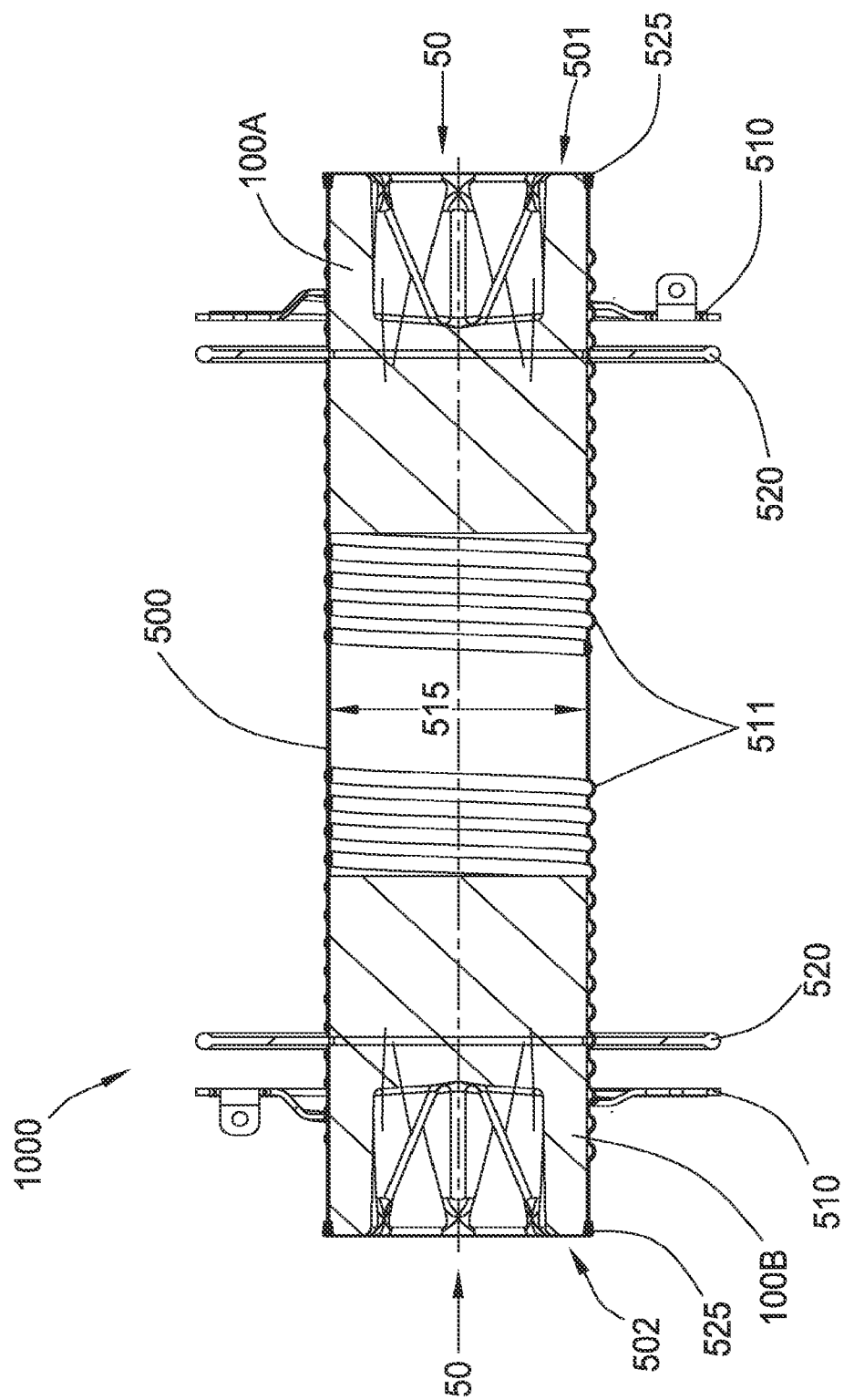
Figure 3B:
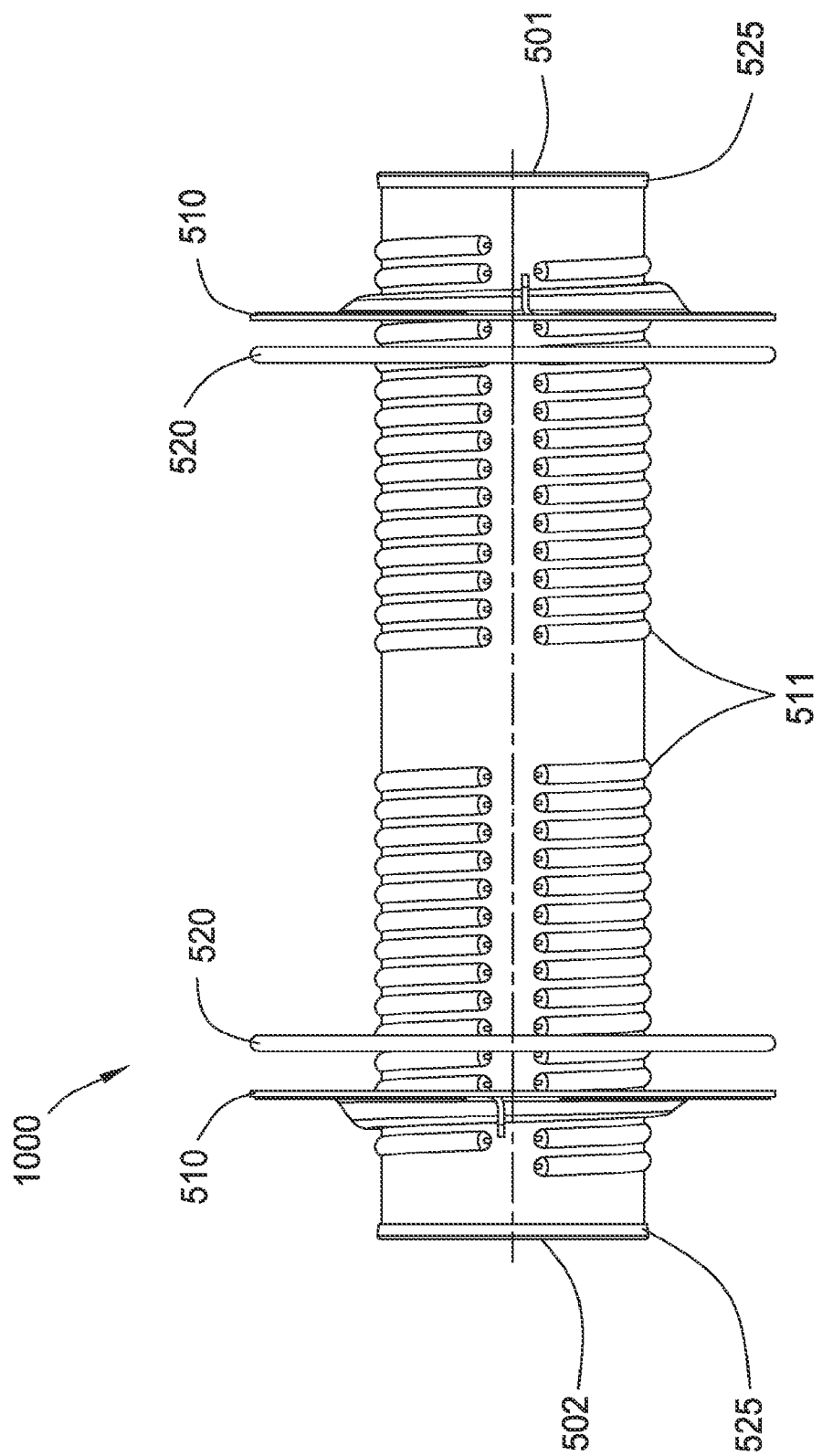
Figure 4A:
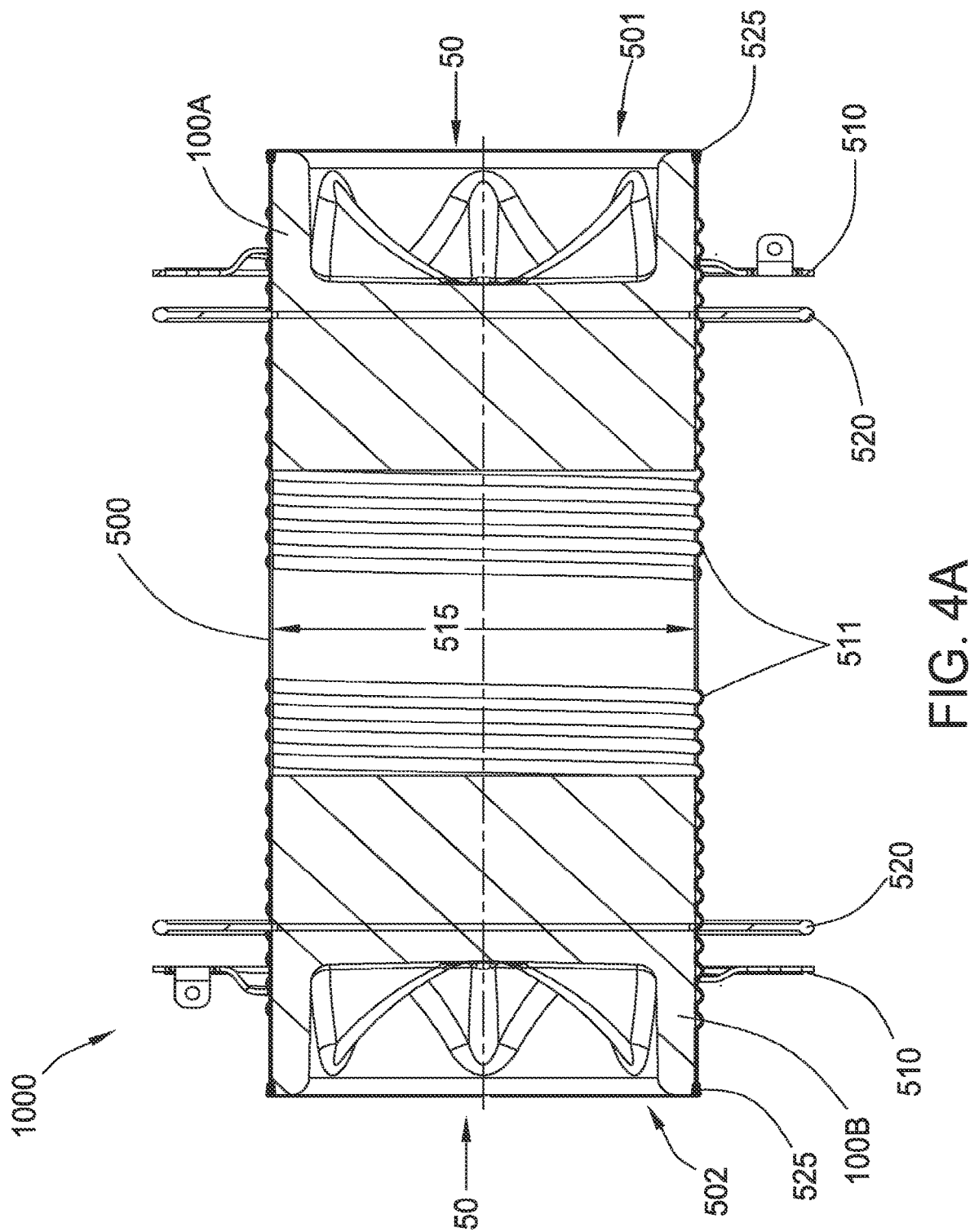
Figure 4B:
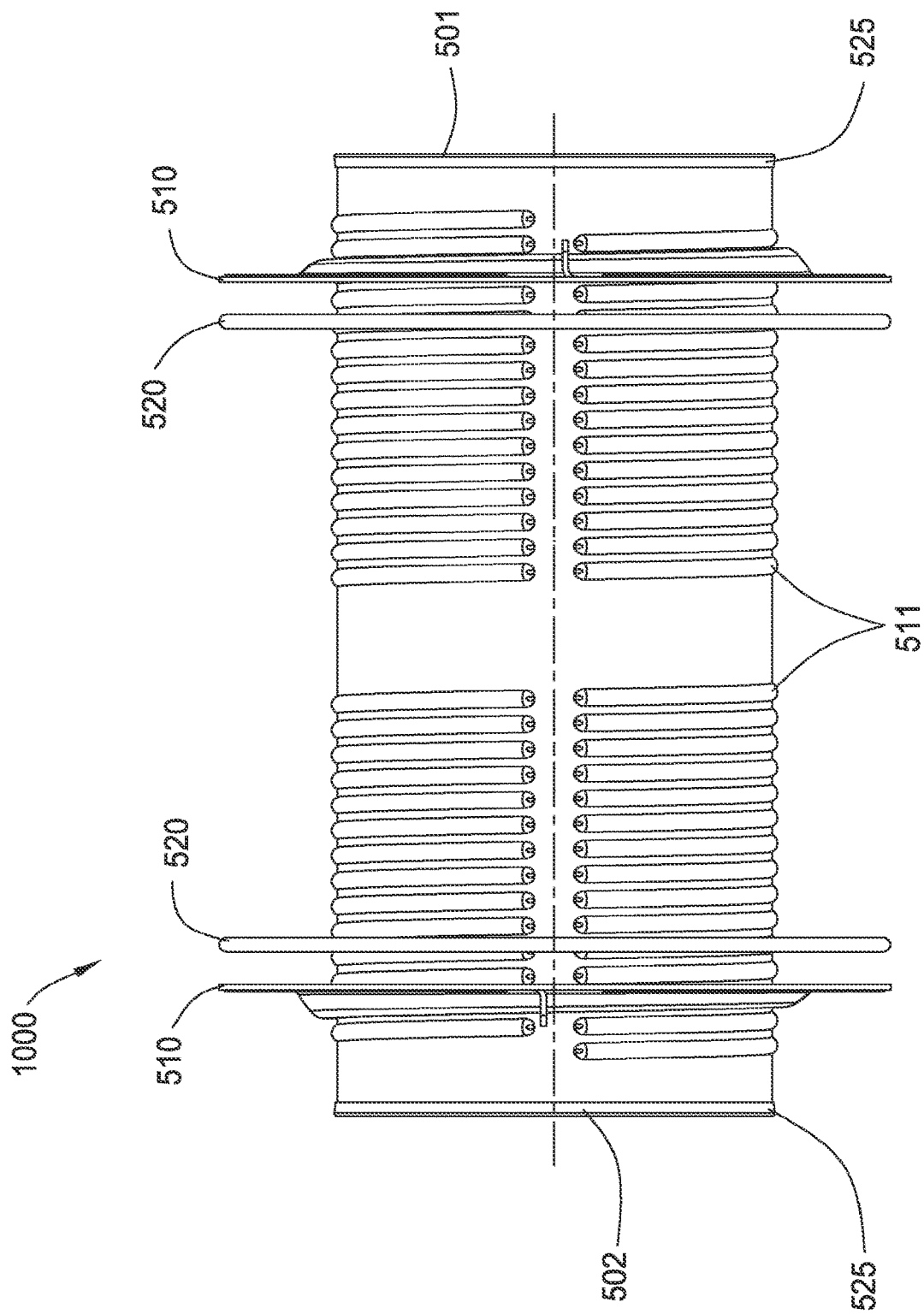
Figure 4C:
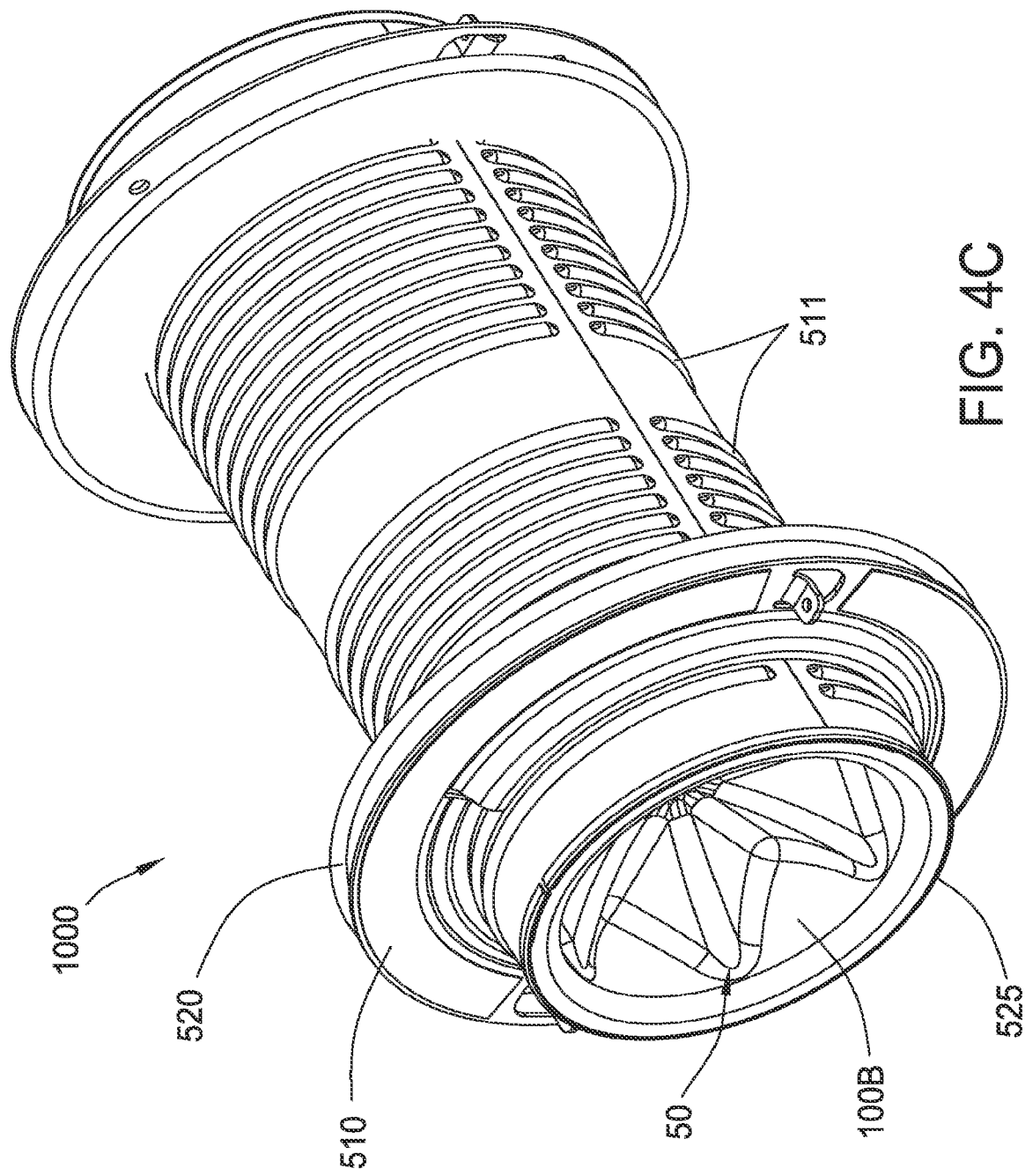

FIGS. 1 and 2A-2D show embodiments of air, acoustic and/or fire sealing sleeve inserts 100, comprising a body 10 comprising molded foam material, the body having a first end 11 and a second end 12 and a bulk 13 continuous with the first end and the second end; wherein at least the first end comprises a molded predetermined pattern 50. As shown in FIGS. 2C and 2D, the inserts have an outer diameter 15. The inserts comprise air-sealing (e.g., smoke-sealing) material, preferably also providing for sound-sealing, and in some embodiments, fire-sealing. As used herein "sealing" air, sound, and/or fire includes "blocking," air, sound, and/or fire, and "air" includes airflow, and airborne particles (including, for example, smoke, airborne pathogens, and odors).

In the embodiment shown in FIG. 1, the predetermined pattern 50 includes a plurality of slits 51. While not shown in the top view of FIG. 1, the slits pass through the body in a direction longitudinal to the body. The embodiment shown in FIG. 1 is an embodiment wherein outer ends of the slits are in an interior region of the insert, inwardly removed from an outer edge of the insert.

In the embodiment shown in FIGS. 2A-2D, the predetermined pattern 50 includes a plurality of ribs 52 and elevations 53 (and valleys 54), as well as a plurality of slits 51 (wherein the slits pass through the body in a direction longitudinal to the body).

The number of ribs and elevations, and the depth of the elevations, can be selected to ensure sufficient closure of the foam material around the pipe(s), cable(s) and/or fiber(s), e.g., to reduce or avoid gaps. Additionally, or alternatively, the length of the insert can be selected to provide, for example, desired air tightness and/or desired acoustic properties.

While the embodiments illustrated in FIGS. 1 and 2A-2D show the insert 100 comprising a generally cylindrical body, wherein the bulk has a generally cylindrical shape, other shapes are possible, e.g., wherein neither the sleeve, nor the sleeve insert, has a cylindrical form.

FIGS. 3A-3C and 4A-4C, show embodiments of air, acoustic and/or fire sealing devices 1000, each comprising a hollow sleeve 500 with a first open end 501, and a second open end 502 (the sleeve having an inner diameter 515), wherein the devices include first and second air, acoustic and/or fire sealing inserts (100A, 100B), arranged in the open ends of the sleeve, wherein the molded predetermined pattern of each insert faces outwardly from the open ends of the sleeve. However, in another embodiment, the device has a single insert, arranged in a location other than an open end. Alternatively, or additionally, the molded predetermined pattern the insert(s) can face inwardly from the open end(s) of the sleeve.

The sleeve 500 can be made of any suitable material, such as metal or plastic. Metal is preferred for applications wherein fire resistance is desired. The sleeve can be a one-piece continuous sleeve, e.g., as illustrated. Alternatively, however, the sleeve can comprise a multi-piece and/or slit sleeve, e.g., wherein the walls of the sleeve are joined together before installation.

The illustrated embodiments of the devices also include flanges 510 (also shown in FIGS. 5A, 5B, 6A, and 6B), e.g., for ease of installing or embedding the device into a constructional component (e.g., a concrete wall). If desired, and as shown, the flange(s) can include openings (and brackets with openings) for passing fastening elements such as nails, screws and/or bolts therethrough. If desired, and as shown in FIGS. 3B, 3C, 4B, and 4C, the sleeve 500 can include threads 511 so that the flanges can be threadably engaged with the sleeves (e.g., for ease in adjustment so that the device can be used with constructional components of different thicknesses).

Preferably, the device also includes gaskets 520. The use of an air, acoustic and/or fire-tight gasket can be desirable in providing extra sealing by sealing the wall penetration behind the flange. Other embodiments are embodiments wherein the fire-protection apparatus does not comprise a gasket outside of the hollow housing for sealing a wall penetration.

In some embodiments, the device includes an edge bushing 525. The use of an edge bushing can be desirable in providing extra protection to the pipe(s), cable(s) and/or fiber(s) when pulled through the insert/device.

Figure 5A:
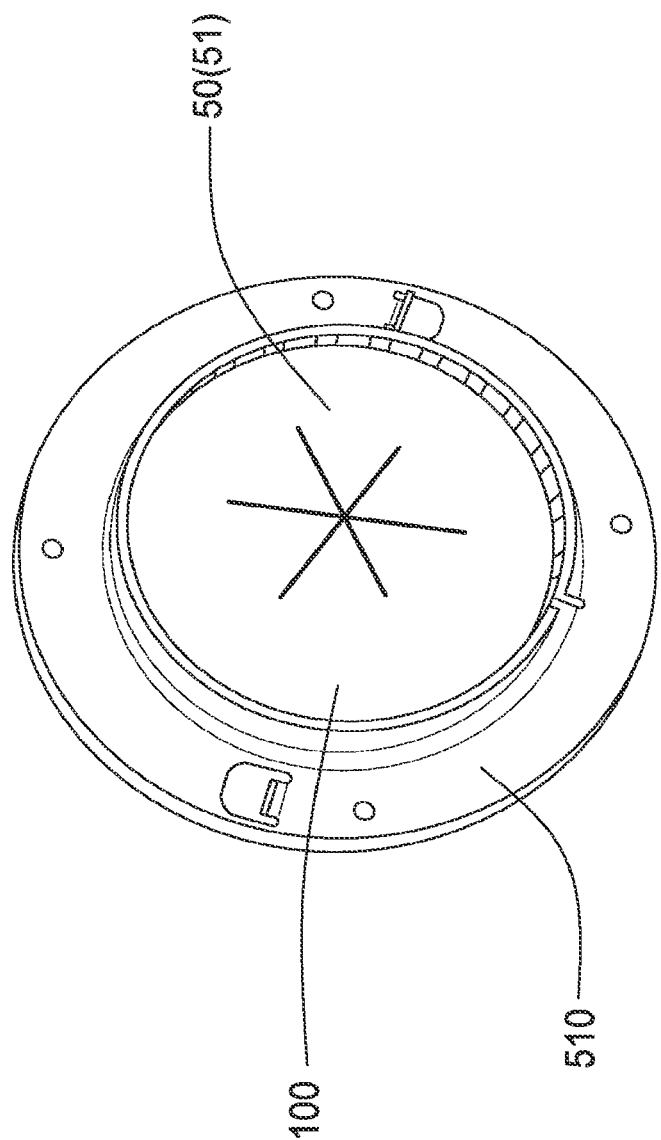
FIG. 5A shows an end view of an air, acoustic and/or fire sealing device including the insert shown in FIG. 1 and a flange.
Figure 5B:
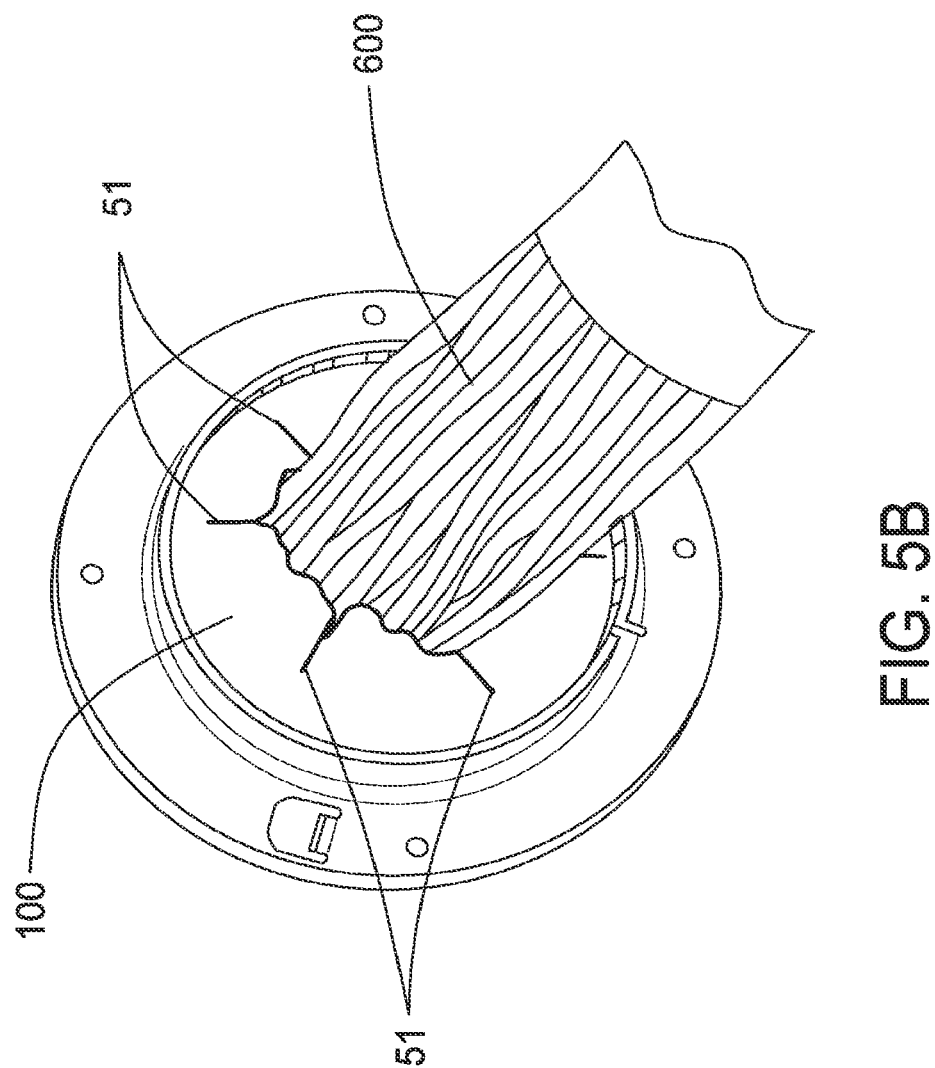
FIG. 5B shows pipes, cables and/or fibers passing through the air, acoustic and/or fire sealing insert.
Figure 6A:
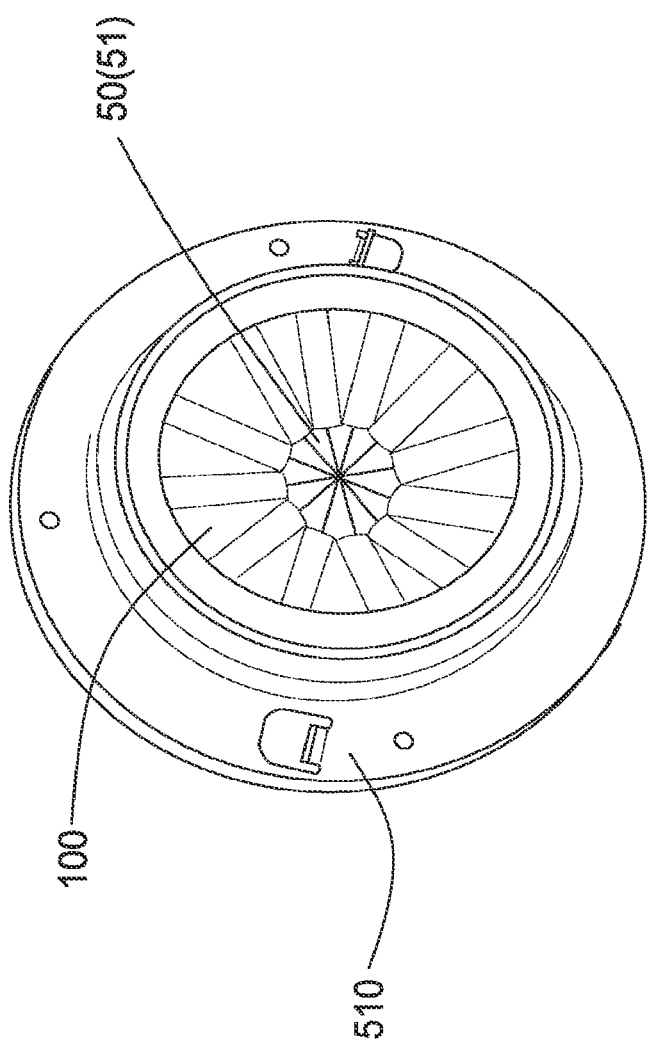
FIG. 6A shows an end view of an air, acoustic and/or fire sealing device including the insert shown in FIGS. 2A-2D and a flange, and FIG. 6B show pipes, cables and/or fibers passing through the air, acoustic and/or fire sealing insert.
Figure 6B:
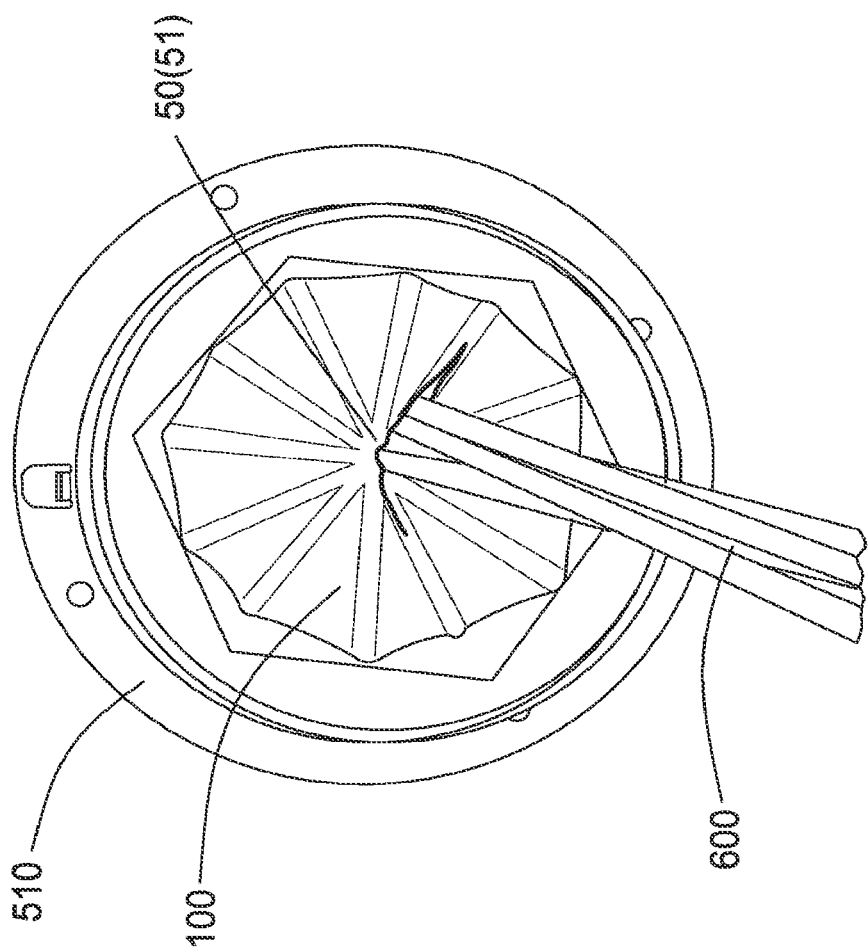

As shown in FIGS. 5A and 5B, as well as 6A and 6B, the foam material allows for any diameter multiple pipe, cable and/or fiber bundle 600 (and/or individual pipe, cable and/or fiber) or to be inserted and sealed as the foam expands or contracts around the pipe(s), cable(s) and/or fiber(s).

As noted above, the embodiments illustrated in FIGS. 1 and 2A-2D show the insert comprising a generally cylindrical body, wherein the bulk has a generally cylindrical shape.

A variety of foam materials are suitable. The foam material can be an open-cell foam material with very low air permeability, an almost closed-cell foam material with extreme low air permeability, and a closed-cell foam material; the foam material may also be impregnated to enhance the sealing properties; to provide sufficient tightness against air, acoustic and/or fire at least the outer surface of the foam insert should have closed pores.

Suitable materials include, for example, cellular rubber (e.g., closed-cell cellular rubber), foam materials such as polyethylene and polyurethane foam or natural or synthetic rubber, such as styrene butadiene rubber (SBR), ethylene propylene diene monomer rubber (EPDM), or polychloroprene rubber.

Other materials and processes suitable for producing the air, acoustic and/or fire sealing insert are disclosed in, for example, U.S. Patent Application Publication Number U.S. 2013/0161030. For example, the production of the molded foam body can be by mold foaming, such as reaction injection molding (RIM), according to DE 3917518, e.g., using Fomox® fire prevention foam or the material HILTI CP 65GN forming the insulation layer. Material which may be used for the purposes according to the invention are known from EP 0061024 A1, EP 0051106 A1. EP 0043952 A1, EP 0158165 A1. EP 0116846 A1, and U.S. Pat. No. 3,396,129 A, as well as EP 1347549 A1. Preferably, the molded body comprises a polyurethane foam capable of intumescence, such as known from EP 0061024 A1, DE 3025309 A1. DE 3041731 A1, DE 3302416 A. and DE 3411 327 A1.

In an embodiment, the insert is produced to have a slightly greater outer diameter than the inner diameter of the sleeve, such that the insert remains in place while the pipe(s)/fiber(s)/cable(s) are being passed therethrough. However, in other embodiments, the insert can have an outer diameter equal to, or less than, the inner diameter of the sleeve. For example, the sleeve can provide for air and/or acoustic sealing and have an outer diameter equal to, or less than, the inner diameter of the sleeve, and a separate intumescent material can be included (e.g., as a strip), such that the foam material is compressed with the sleeve and insert are inserted into the sleeve.

The insert can be produced as is known in the art. e.g., reaction injection molded into a form or template, and molded.

The molded body can comprise a foaming binder, which at least comprises an ash-forming and perhaps intumescent material mixture. Here, this binder serves as a compound-forming carrier for the ash-forming and perhaps intumescent material mixture. Preferably the material mixture is distributed homogeneously in the binder. The compound-forming carrier is preferably selected from a group comprising polyurethane, phenol-resins, polystyrene, polyolefin, such as polyethylene and/or polybutylene, melamine resin, melamine resin-foam, synthetic or natural rubber, cellulose, elastomers, and mixtures therefrom, with polyurethane being preferred.

The ash-forming and perhaps intumescent material mixture may comprise the fire prevention additives commonly used and known to one trained in the art, which in case of fire, thus under the impact of heat, foam and thus form a froth hindering the fire from spreading, such as an intumescent material based on an acid former, a compound yielding carbon, and a gas former. Preferably the intumescent material comprises a salt or an ester of an inorganic, non-volatile acid as the acid former, selected from sulfuric acid, phosphoric acid, and boric acid, a polyhydroxy-compound as the compound yielding carbon, and/or a thermoplastic or duroplastic polymer resin binder, and as a gas former a chloroparaffin, melamine, a melamine compound, particularly melamine cyanurate, melamine phosphate, melamine polyphosphate, tri(hydroxyl ethyl)-cyanurate, cyanamide, dicyanamide, dicyanadiamide, biguanidine, and/or a guanidine salt, particularly guanidine phosphate or guanidine sulfate.

The compound-forming carrier may further comprise an inorganic compound as an ablative additive, which comprises water, e.g., water of crystallization, tightly bonded and not evaporating at temperatures up to 100° C., however releases it in case of fire at 120° C. and thus is able to cool temperature-guiding parts, preferably an inorganic hydroxide or hydrate, particularly aluminum hydroxide, aluminum oxide hydrate, or partially hydrated aluminum hydroxides releasing water preferably at fire temperature and/or when subjected to flames. However, other inorganic hydroxides or hydrates releasing water when subjected to flames may also be used, such as described in EP 0 274 068 A2.

Such compounds, which may be used as mixtures of material in the fire prevention insert according to one or more embodiments of the invention, are known to one trained in the art and disclosed, for example, in the following publications, which are hereby included by of reference: DE 30 25 309 A1, DE 30 41 731 A1, DE 33 02 416 A1, DE 34 11 327 A1, EP 0 043 952 B1, EP 0 051 106 B1, EP 0 061 024 B1, EP 0 116 846 B1, EP 0 158 165 B1, EP 0 274 068 A2, EP 1 347 549 A1, EP 1 641 895 B1, and DE 196 53 503 A1.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A fire-protection apparatus, comprising:
a hollow housing comprising a passage;
at least one bracket having at least one opening, configured for receiving a fastener to fasten the apparatus to a wall, floor, or ceiling; and
an insert in or coupled to the hollow housing and comprising:
a plurality of sections,
wherein the plurality of sections are tapered and are separated from one another by a plurality of slits arranged in a radial pattern in a 360° arrangement around a hole in the insert in an installed state, and configured to move flexibly to accommodate one or more lines extending through the hole and the passage of the housing, the plurality of sections comprising a fire-resistant material configured to provide an air seal, an acoustic seal, a smoke seal, and/or a fire seal,
wherein the at least one bracket is configured so that the housing and the insert extend at least in part past the bracket and outside the surface of the wall, floor, or ceiling in the installed state,
wherein the fire-protection apparatus does not comprise a gasket outside of the hollow housing for sealing a wall penetration,
wherein the plurality of sections comprises a plurality of elevations and a plurality of valleys, and
wherein the elevations and the valleys extend along a longitudinal axis from a front to a back of each section, and along a radial axis from an outer portion toward a central portion of each section.

2. The fire-protection apparatus of claim 1, wherein the passage extends along the longitudinal axis passing through the hollow housing.

3. The fire-protection apparatus of claim 1, wherein the plurality of sections have substantially a same shape.

4. The fire protection apparatus of claim 1, wherein the fire-resistant material comprises an intumescent material.

5. The fire-protection apparatus of claim 1, wherein each of the plurality of sections extends in a radial direction relative to the hole in the insert in the installed state.

6. The fire-protection apparatus of claim 1, wherein an outer boundary of the insert has a shape that substantially corresponds to a shape of the housing.

7. The fire-protection apparatus of claim 1, wherein the hole is smaller than the passage.

8. The fire-protection apparatus of claim 1, wherein the hole is aligned with a central longitudinal axis of the passage.

9. The fire-protection apparatus of claim 1, further comprising:
the fastener,
wherein the fastener is configured to couple the hollow housing to a building structure through which the one or more lines pass in the installed state.

10. The fire-protection apparatus of claim 1, wherein the plurality of elevations and the plurality of valleys are arranged in an alternating pattern.

11. The fire-protection apparatus of claim 1, wherein at least one of the plurality of elevations or the plurality of valleys are configured to move around the one or more lines to seal the one or more lines.

12. The fire-protection apparatus of claim 1, wherein the insert is coupled to an open end of the hollow housing.

13. The fire-protection apparatus of claim 1, further comprising at least one second insert in or coupled to the hollow housing, the at least one second insert having a plurality of slits arranged in a second pattern configured to provide an air seal, an acoustic seal, a smoke seal, and/or a fire seal,
wherein the insert and/or the at least one second insert is configured to expand to seal the passage around the one or more lines in the presence of heat.

14. The fire-protection apparatus of claim 1, further comprising a screw as the at least one fastener.

15. The fire-protection apparatus of claim 1, wherein outer ends of the slits are in an interior region of the insert, inwardly removed from an outer edge of the insert, and wherein the plurality of sections that are tapered and are separated from one another by the plurality of slits comprise an intumescent material.

16. The fire-protection apparatus of claim 1, wherein the plurality of elevations and h plurality of valleys slope in an axial direction and/or in a radial direction.

17. A fire-protection apparatus, comprising:
a hollow housing comprising a passage;
at least one bracket having at least one opening, configured for receiving a fastener to fasten the apparatus to a wall, floor, or ceiling; and
an insert in or coupled to the hollow housing and comprising:
a plurality of sections,
wherein the plurality of sections are tapered and are separated from one another by a plurality of slits arranged in a radial pattern relative to a hole in the insert in an installed state, wherein adjacent slits in the plurality of slits extend along linear directions that intersect at an acute angle at the hole in the insert,
wherein the plurality of sections are configured to move flexibly to accommodate one or more lines extending through the hole and the passage of the housing, the plurality of sections comprising a fire-resistant material configured to provide an air seal, an acoustic seal, a smoke seal, and/or a fire seal,
wherein the at least one bracket is configured so that the housing and the insert extend at least in part past the bracket and outside the surface of the wall, floor, or ceiling in the installed state,
wherein the fire-protection apparatus does not comprise a gasket outside of the hollow housing for sealing a wall penetration,
wherein the plurality of sections comprises a plurality of elevations and a plurality of valleys, and
wherein the elevations and the valleys extend along a longitudinal axis from a front to a back of each section, and along a radial axis from an outer portion toward a central portion of each section.

18. A fire-protection apparatus, comprising:
a hollow housing comprising a passage;
at least one bracket having at least one opening, configured for receiving a fastener to fasten the apparatus to a wall, floor, or ceiling; and
an insert in or coupled to the hollow housing and comprising:
a plurality of sections,
wherein the plurality of sections are tapered and are separated from one another by a plurality of slits arranged in a radial pattern in a 360° arrangement around a hole in the insert in an installed state, and configured to move flexibly to accommodate one or more lines extending through the hole and the passage of the housing, the plurality of sections comprising a fire-resistant material configured to provide an air seal, an acoustic seal, a smoke seal, and/or a fire seal,
wherein the at least one bracket is configured so that the housing and the insert extend at least in part past the bracket and outside the surface of the wall, floor, or ceiling in the installed state,
wherein the plurality of sections comprises a plurality of elevations and a plurality of valleys, and
wherein the elevations and the valleys extend along a longitudinal axis from a front to a back of each section, and along a radial axis from an outer portion toward a central portion of each section.

19. The fire-protection apparatus of claim 18, wherein the plurality of elevations and the plurality of valleys slope in an axial direction and/or in a radial direction.

* * * * *